US012528206B2

(12) United States Patent
Asano et al.

(10) Patent No.: US 12,528,206 B2
(45) Date of Patent: Jan. 20, 2026

(54) TOOL STOCKER, INTERCHANGEABLE TOOL, ROBOT APPARATUS, ROBOT SYSTEM, CONTROL METHOD OF ROBOT SYSTEM, AND STORAGE MEDIUM

(71) Applicant: CANON KABUSHIKI KAISHA, Tokyo (JP)

(72) Inventors: Hidetada Asano, Yokohama (JP); Naonori Kayama, Yokohama (JP); Yoshiyuki Miyazaki, Hiratsuka (JP); Toshifumi Takahashi, Utsunomiya (JP); Hiroki Kanai, Tokyo (JP); Naoto Fukuda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 17/492,041

(22) Filed: Oct. 1, 2021

(65) Prior Publication Data

US 2022/0016789 A1    Jan. 20, 2022

Related U.S. Application Data

(63) Continuation of application No. 16/160,908, filed on Oct. 15, 2018, now abandoned.

(30) Foreign Application Priority Data

Oct. 18, 2017 (JP) .................. 2017-202137
Oct. 19, 2017 (JP) .................. 2017-202818
(Continued)

(51) Int. Cl.
*B25J 15/00* (2006.01)
*B25J 15/04* (2006.01)

(52) U.S. Cl.
CPC ....... *B25J 15/0491* (2013.01); *B25J 15/0009* (2013.01); *B25J 15/0066* (2013.01); *B25J 15/0475* (2013.01)

(58) Field of Classification Search
CPC ................ B25J 15/0491; B25J 15/0475; B25J 15/0006; B25J 15/0009; B25J 15/10; B25J 15/12; B25J 15/0066
(Continued)

(56) References Cited

U.S. PATENT DOCUMENTS 4,238,034 A    12/1980 Sipek et al.
4,486,928 A *  12/1984 Tucker ................. B25J 15/0491
                                                     901/41
(Continued)

FOREIGN PATENT DOCUMENTS

CH          447978 A    11/1967
CN         1880010 A    12/2006
(Continued)

OTHER PUBLICATIONS

Dictionary definition of "robot", Merriam-Webster's Collegiate Dictionary, 10th ed., p. 1013, copyright 1998.

*Primary Examiner* — Paul T Chin
(74) *Attorney, Agent, or Firm* — Canon U.S.A., Inc. IP Division

(57) ABSTRACT

A tool stocker for holding a tool is equipped with a stocker-inclining member that inclines the tool stocker and also equipped with a mechanism that adjusts an attaching/detaching position at which an interchangeable tool is attached to and detached from a robot arm. The attaching/detaching position can be adjusted by using the tool stocker so as to fit moving paths of the robot arm appropriately.

27 Claims, 41 Drawing Sheets

(30) Foreign Application Priority Data

Nov. 30, 2017 (JP) .................................. 2017-230993
May 21, 2018 (JP) .................................. 2018-097248

(58) Field of Classification Search
USPC ................................................ 294/86.4, 213
See application file for complete search history.

(56) References Cited

U.S. PATENT DOCUMENTS

| | | | |
|---|---|---|---|
| 4,512,709 A * | 4/1985 | Hennekes | B25J 15/0491 |
| | | | 901/41 |
| 4,545,723 A * | 10/1985 | Clark | B25J 15/04 |
| | | | 414/730 |
| 4,636,135 A * | 1/1987 | Bancon | B25J 15/0491 |
| | | | 483/901 |
| 4,699,414 A * | 10/1987 | Jones | B25J 15/026 |
| | | | 294/902 |
| 4,700,452 A | 10/1987 | Babel | |
| 4,759,114 A | 7/1988 | Babel | |
| 4,815,780 A * | 3/1989 | Obrist | B25J 15/04 |
| | | | 294/86.4 |
| 4,913,617 A * | 4/1990 | Nicholson | B25J 9/0084 |
| | | | 901/29 |
| 5,044,063 A * | 9/1991 | Voellmer | B23Q 3/15553 |
| | | | 483/902 |
| 5,256,128 A * | 10/1993 | Neumann | B23Q 1/0063 |
| | | | 901/41 |
| 5,342,161 A | 8/1994 | Shimoichi et al. | |
| 5,462,511 A | 10/1995 | Sheldon et al. | |
| 5,515,599 A * | 5/1996 | Best | B23Q 1/5481 |
| | | | 29/792 |
| 7,104,941 B2 | 9/2006 | Sakuragi et al. | |
| 7,156,795 B2 | 1/2007 | Nolte et al. | |
| 7,442,155 B2 | 10/2008 | Ou et al. | |
| 8,454,486 B2 | 6/2013 | Philippi et al. | |
| 8,684,790 B2 * | 4/2014 | Reinmoeller | B25J 15/0491 |
| | | | 451/8 |
| 9,656,395 B2 * | 5/2017 | Youngwerth | B23Q 7/04 |
| 9,757,863 B2 * | 9/2017 | Suzuki | B25J 15/0425 |
| 2004/0192524 A1 | 9/2004 | Nolte | |
| 2012/0298706 A1 | 11/2012 | Gordon | |
| 2016/0332309 A1 | 11/2016 | Harrach-Salazar | |
| 2019/0111575 A1 * | 4/2019 | Asano | B25J 15/0009 |

FOREIGN PATENT DOCUMENTS

| | | |
|---|---|---|
| CN | 101653953 A | 2/2010 |
| CN | 102202837 A | 9/2011 |
| CN | 102764166 A | 11/2012 |
| CN | 104051294 A | 9/2014 |
| CN | 104641735 A | 5/2015 |
| CN | 205129879 U | 4/2016 |
| CN | 106166736 A | 11/2016 |
| CN | 106514685 A | 3/2017 |
| CN | 107088888 A | 8/2017 |
| CN | 206550713 U | 10/2017 |
| DE | 19904775 A1 | 8/2000 |
| DE | 102013205171 A1 | 9/2014 |
| JP | 3-109784 U | 11/1991 |
| JP | 5-38690 A | 2/1993 |
| JP | 5-24285 U | 3/1993 |
| JP | 5-169382 A | 7/1993 |
| JP | 2001-62762 A | 3/2001 |
| JP | 2002-216096 A | 8/2002 |
| JP | 2011-255481 A | 12/2011 |
| JP | 5606423 B2 | 10/2014 |
| JP | 2017-154207 A | 9/2017 |
| JP | 2017185583 A | 10/2017 |

* cited by examiner

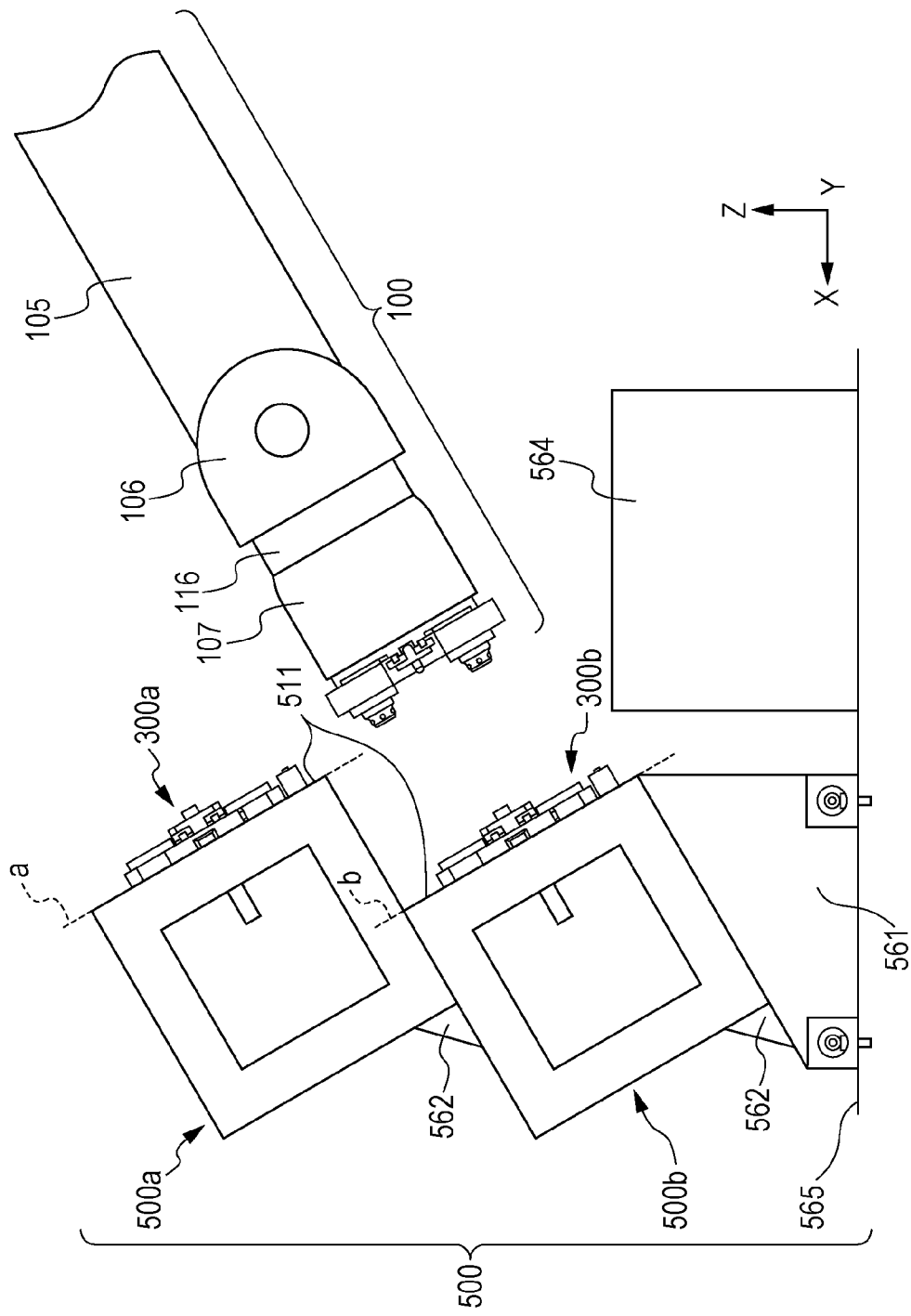

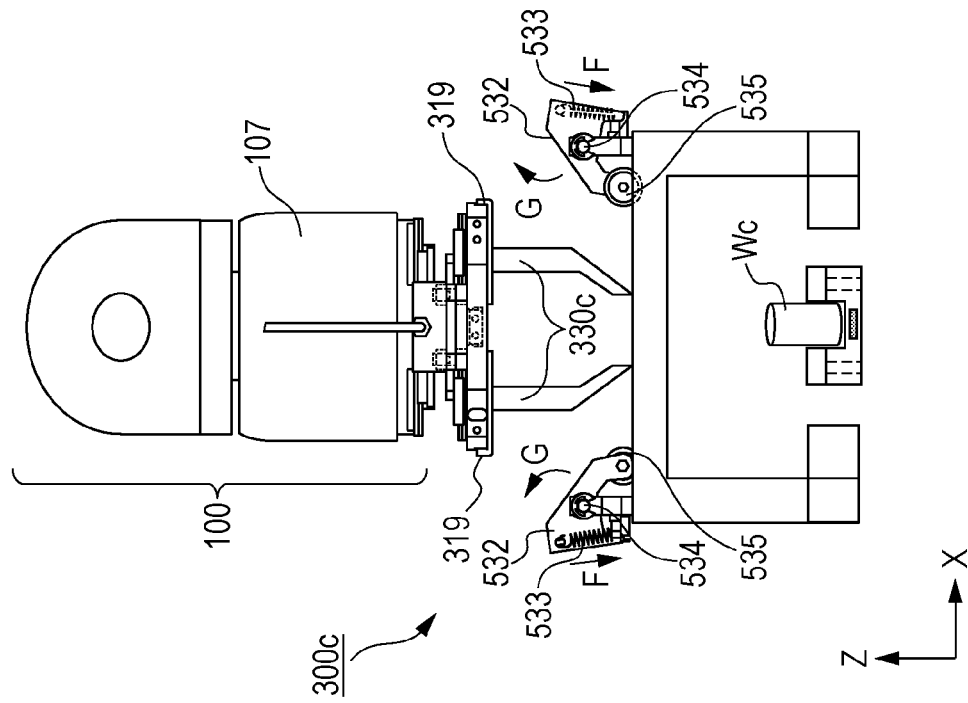
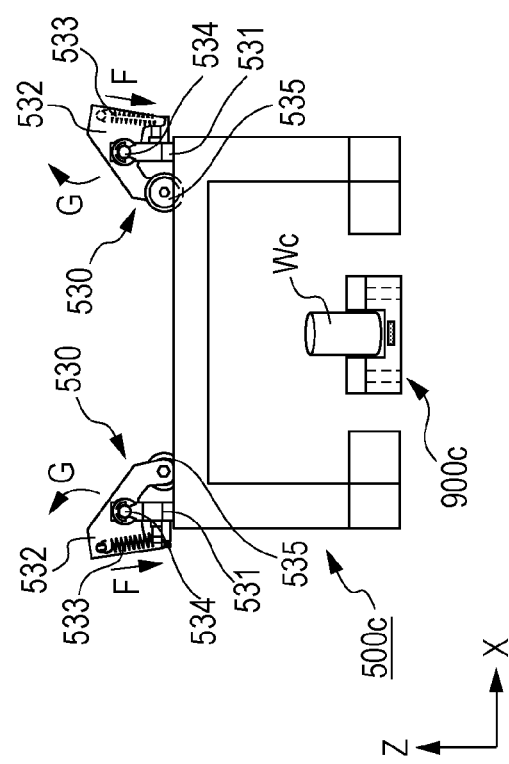

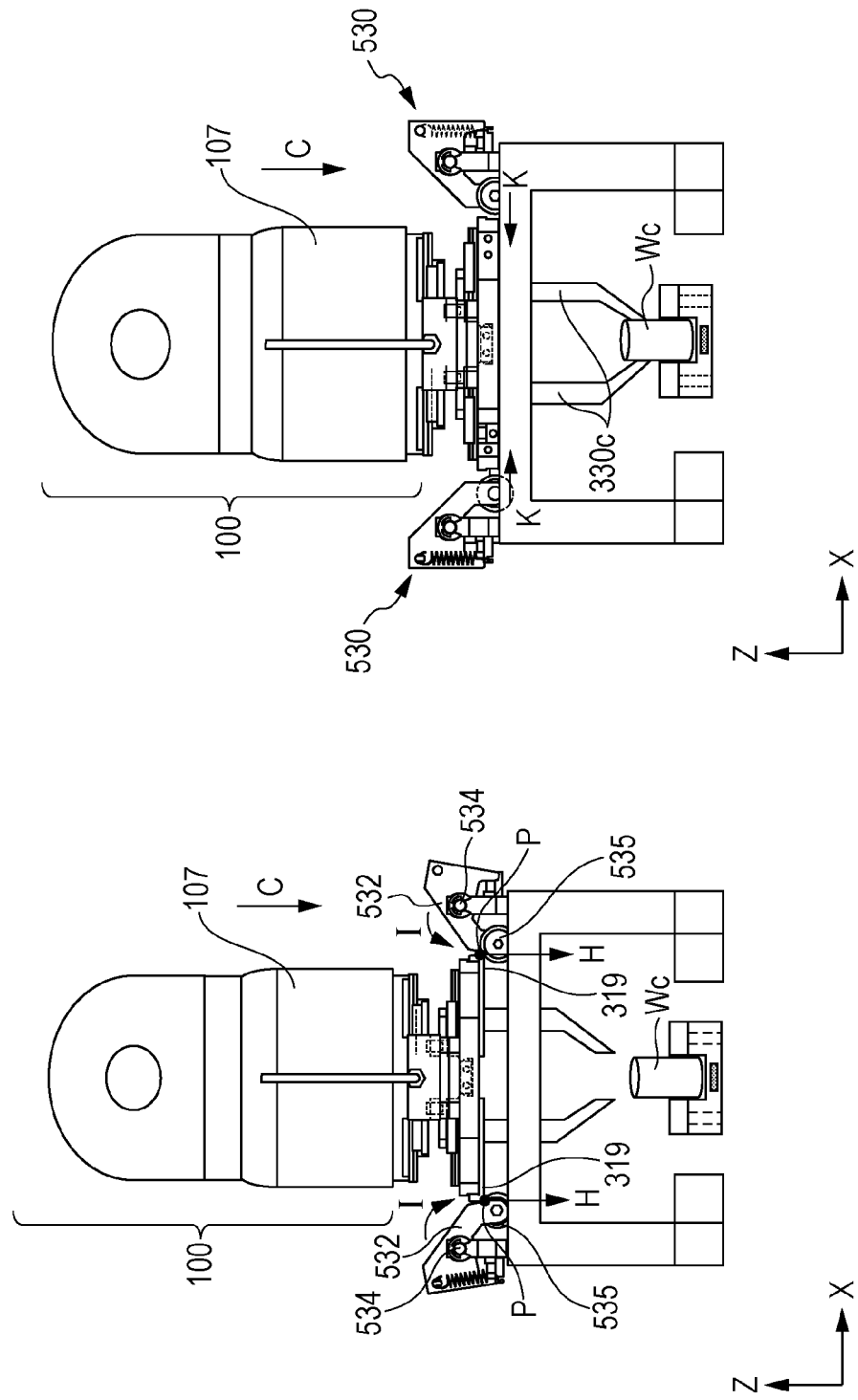

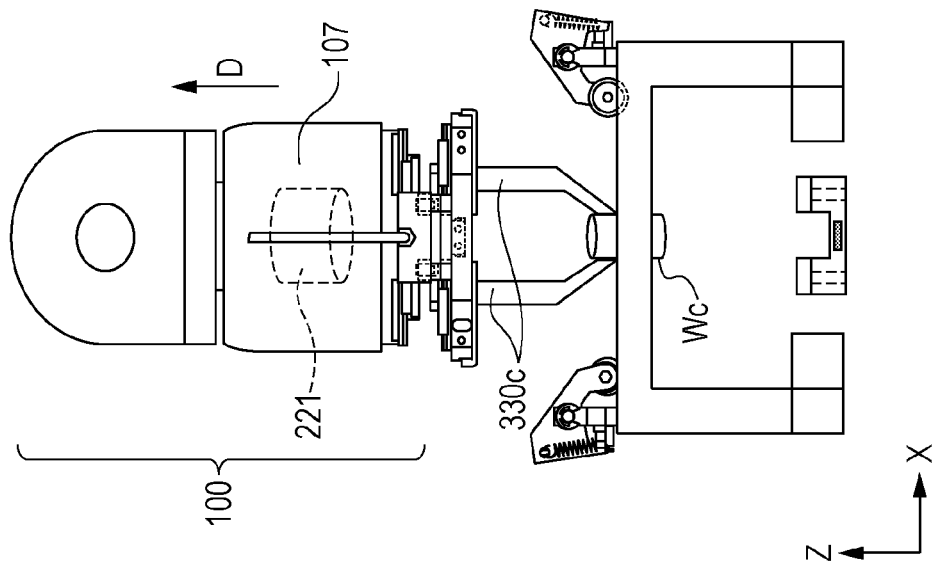
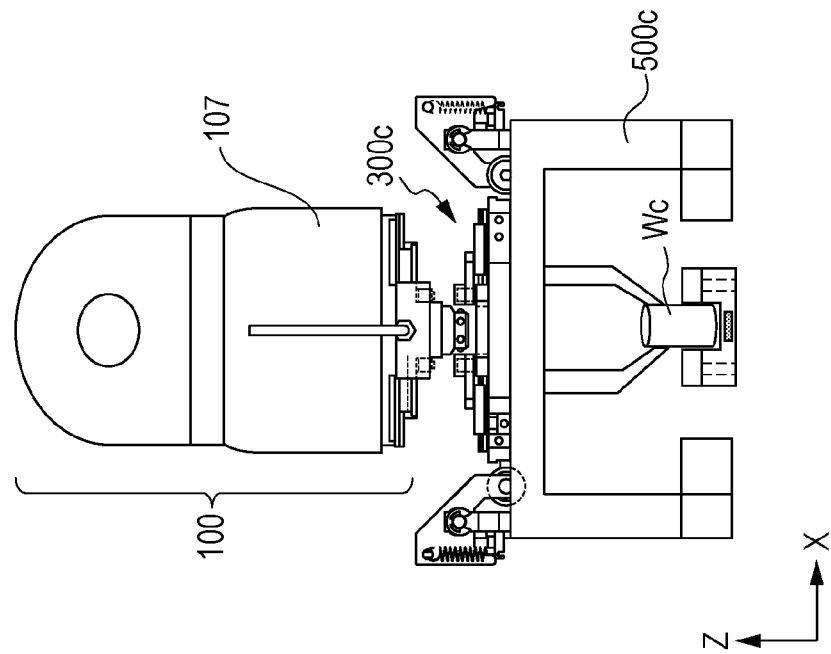

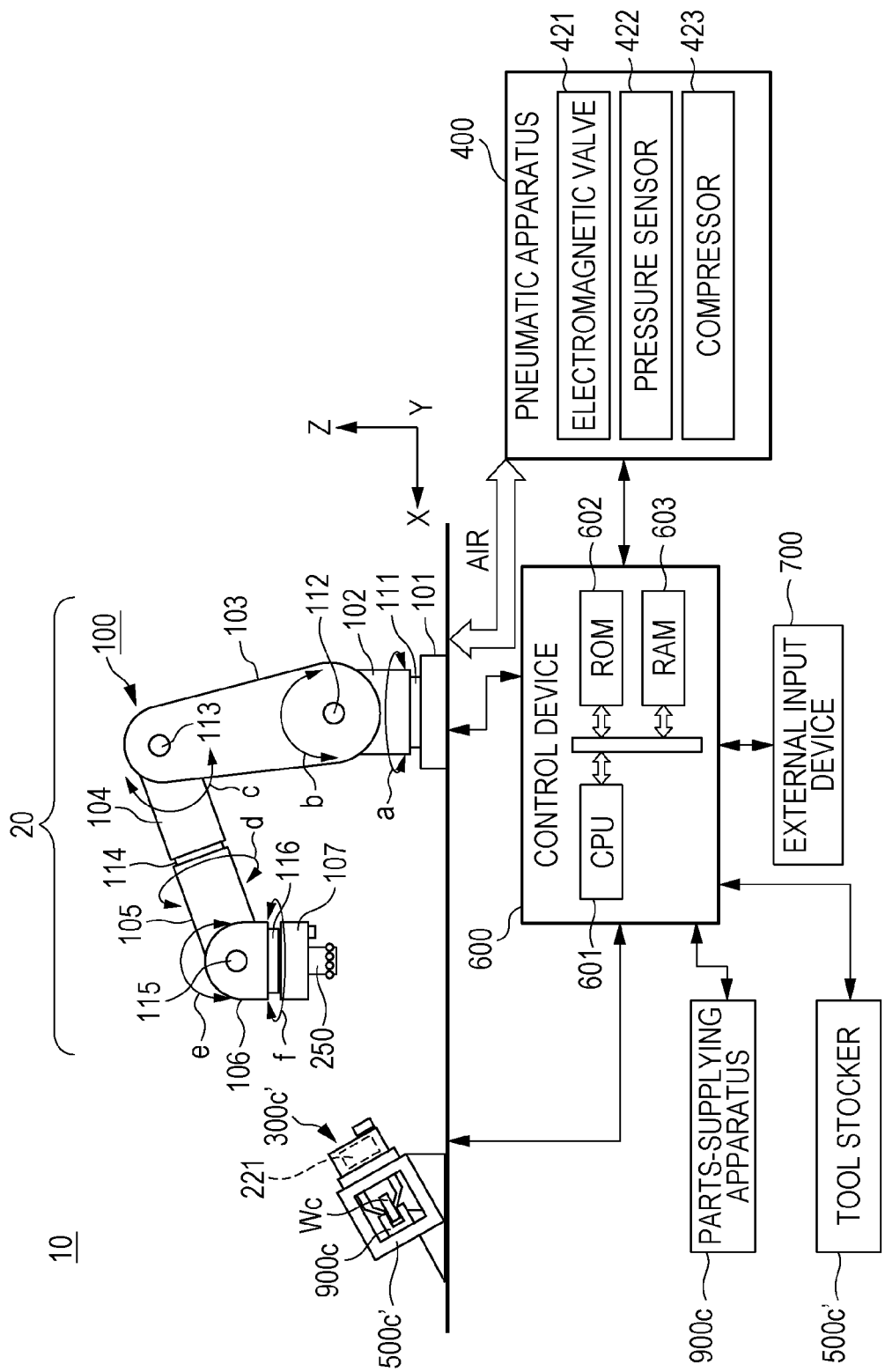

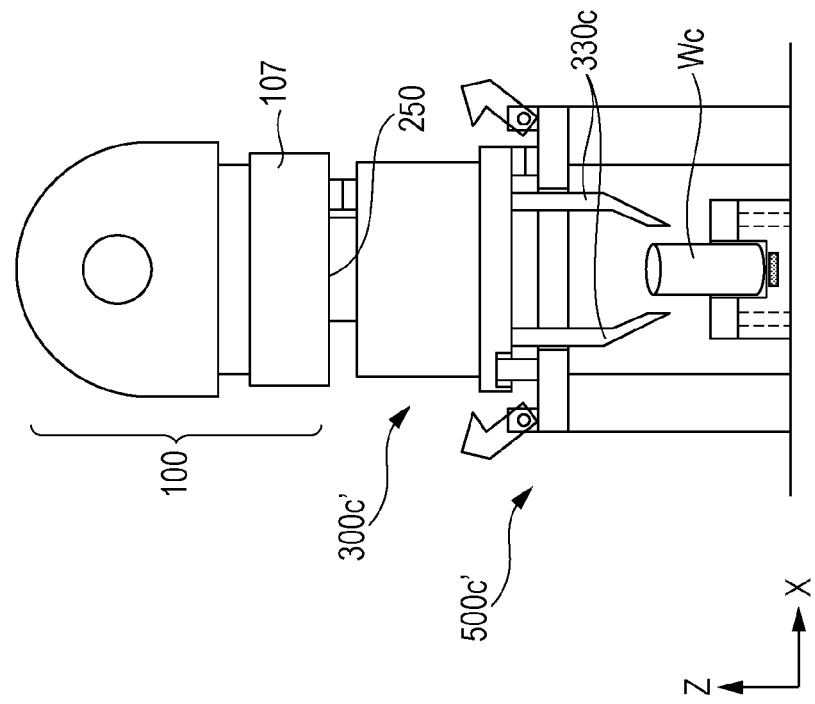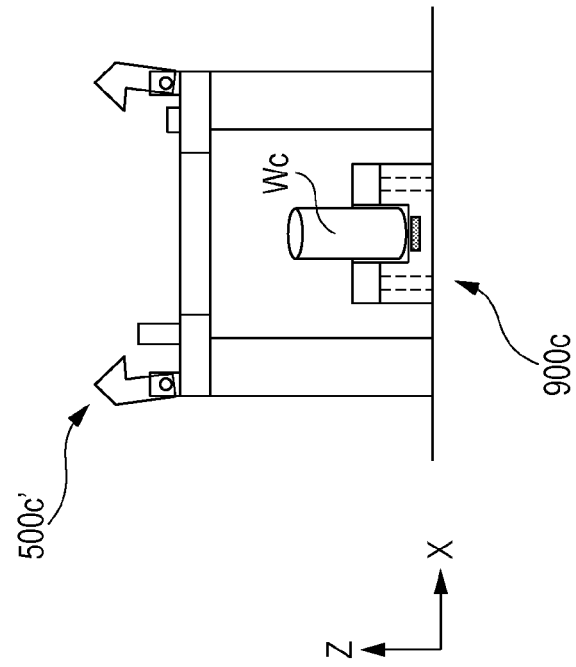

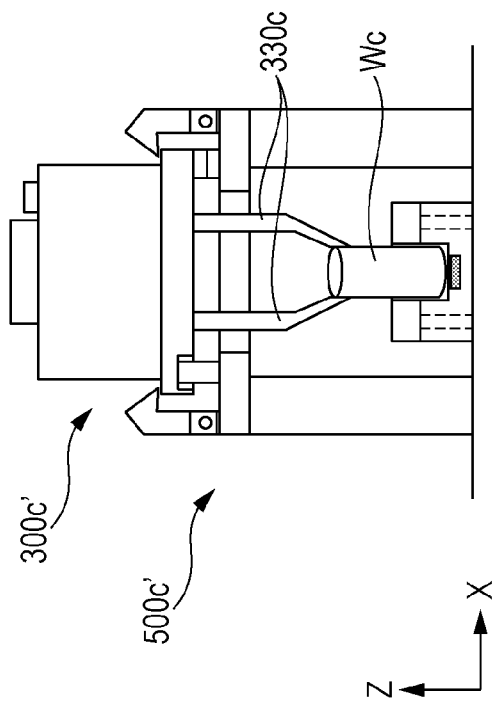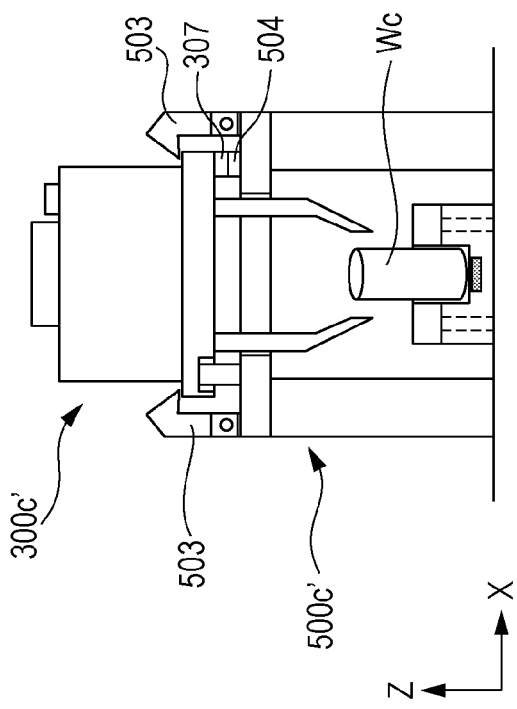

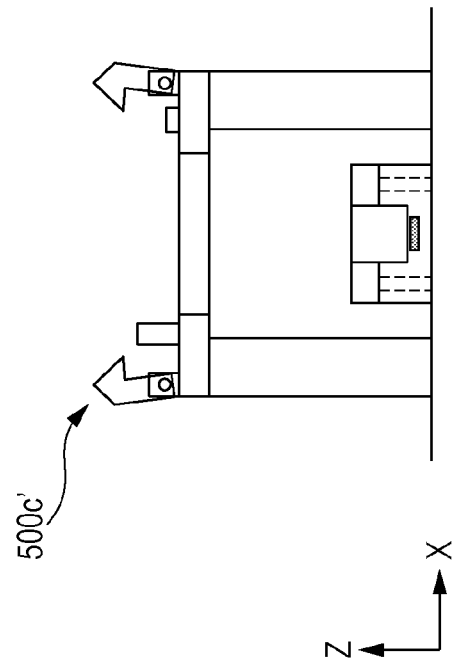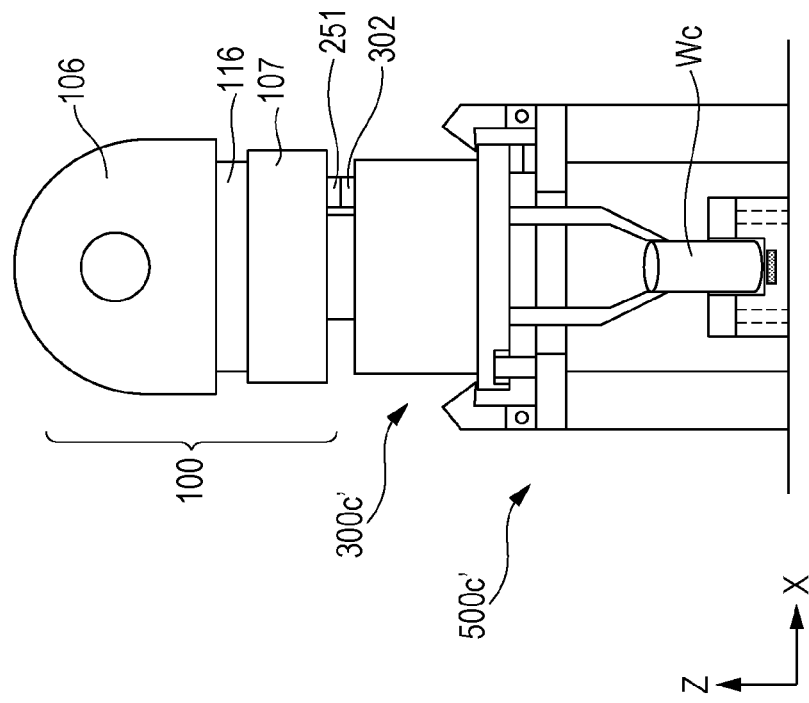

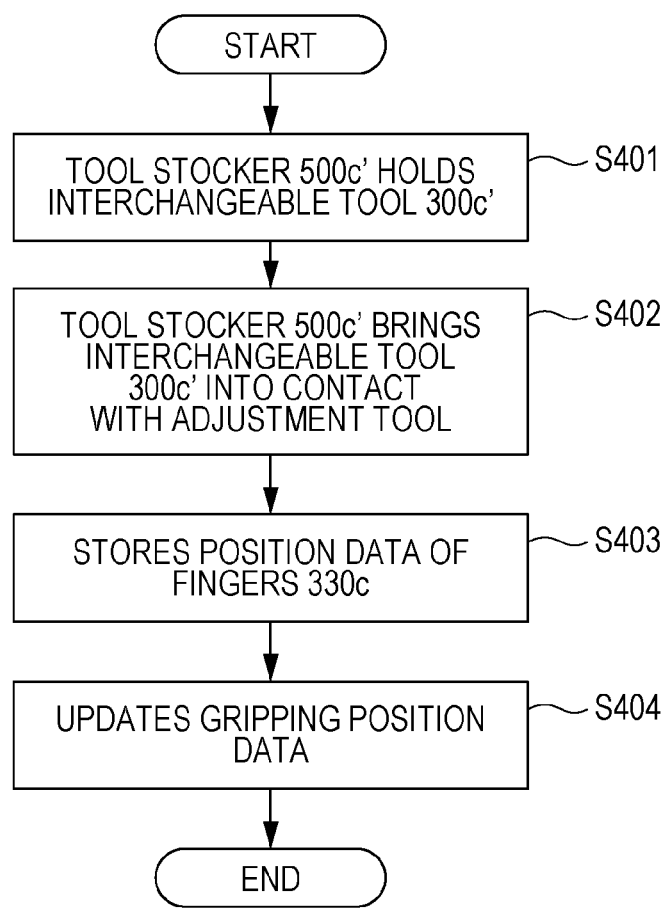

TOOL STOCKER, INTERCHANGEABLE TOOL, ROBOT APPARATUS, ROBOT SYSTEM, CONTROL METHOD OF ROBOT SYSTEM, AND STORAGE MEDIUM

CROSS-REFERENCE TO RELATED APPLICATIONS

This application is a continuation of U.S. application Ser. No. 16/160,908, filed Oct. 15, 2018, which claims the benefit of Japanese Patent Application No. 2017-202137 filed on Oct. 18, 2017, No. 2017-202818 filed on Oct. 19, 2017, No. 2017-230993 filed on Nov. 30, 2017, and No. 2018-097248 filed on May 21, 2018, which are hereby incorporated by reference herein in their entirety.

BACKGROUND OF THE INVENTION

Field of the Invention

The present disclosure relates to a tool stocker that holds an interchangeable tool for performing an operation on a target object and to a robot system that includes the tool stocker.

Description of the Related Art

In recent years, automation has been introduced in assembling and processing works or the like of small industrial products having complicated structures, such as cameras and printers. Parts used for such industrial products are often small precision components and come in a wide range of shapes.

On the other hand, a single robot apparatus is expected to manufacture multiple types of products in succession. In production sites, occasions for setting up the robot apparatus including replacing tools tend to increase to cope with the change of the type of workpiece or the work process. Changing the setting of the robot apparatus manually by an operator requires an effort and working time. This leads to an increasing demand for a so-called automated setup in which a software program for the robot apparatus implements the setup of the robot apparatus as much as possible.

In the automated setup, interchangeable tools are stored mainly in stockers. These stockers are desirably placed in the vicinity of a target object on which the robot apparatus performs operations so as to reduce the operating time of the robot apparatus.

A robot hand disclosed by Japanese Patent No. 5606423 uses finger members as a tool for an operation on a target object. The robot hand is configured to replace the fingers only with other fingers. The robot hand body is equipped with a finger base that can attach/detach the fingers. The fingers are attached to the robot hand in the following manner. The fingers are stored in a finger replacing apparatus that is placed on the floor surface, and a shaft of the fingers stored in the apparatus is inserted into a hole portion of the finger base. Subsequently, an attachment/detachment mechanism built in the finger replacing apparatus rotates the fingers to fix them to the finger base. The fingers can be detached by the reverse action.

According to Japanese Patent No. 5606423, when the fingers of the robot hand are replaced, a position at which the fingers are attached/detached is not flexibly changed since the finger replacing apparatus is made only for storing the finger. Accordingly, the robot arm must resort to the attaching/detaching position for replacement. This restricts the moving path of the robot arm and makes it difficult to generate moving paths of the robot arm so as to shorten operation time.

The sets of fingers are stored in one stocker. Thus, every time a set of fingers are replaced with another, the robot arm needs to return to the stocker for replacement, which deteriorates work efficiency.

SUMMARY OF THE INVENTION

The present disclosure provides a tool stocker that can provide more freedom in generating moving paths of a robot arm irrespective of an attaching/detaching position and thereby improve work efficiency.

The present disclosure provides a tool stocker that holds an interchangeable tool that can be attached to and detached from a robot arm and has a contact portion that performs a predetermined operation on a target object. The tool stocker includes a stocker-inclining member that inclines a contact surface of the tool stocker to a predetermined angle and the contact surface comes into contact with the interchangeable tool. The tool stocker further includes a position adjustment mechanism that adjusts an attaching/detaching position at which the interchangeable tool and the robot arm come into contact with each other.

Further features of the present disclosure will become apparent from the following description of exemplary embodiments (with reference to the attached drawings).

BRIEF DESCRIPTION OF THE DRAWINGS

FIG. 5 is a side view illustrating a state in which the tool stockers are arranged in the first embodiment.

FIGS. 20A to 20F are views each of which illustrates a state corresponding to each step in the flowchart in FIG. 19.

FIG. 21 is a view schematically illustrating a configuration of a robot system according to a third embodiment.

FIGS. 27A to 27F are views each of which illustrates a state corresponding to each step in the flowchart in FIG. 26.

FIG. 30 is a control flowchart for the robot system according to modification example 2 of the third embodiment.

DESCRIPTION OF THE EMBODIMENTS

Embodiments of the present disclosure will be described with reference to examples illustrated in the accompanying drawings. Note that the embodiments described below are examples and one skilled in the art can arbitrarily modify and alter minor configurations to the extent not departing from the scope of the invention.

First Embodiment

Figure 1:
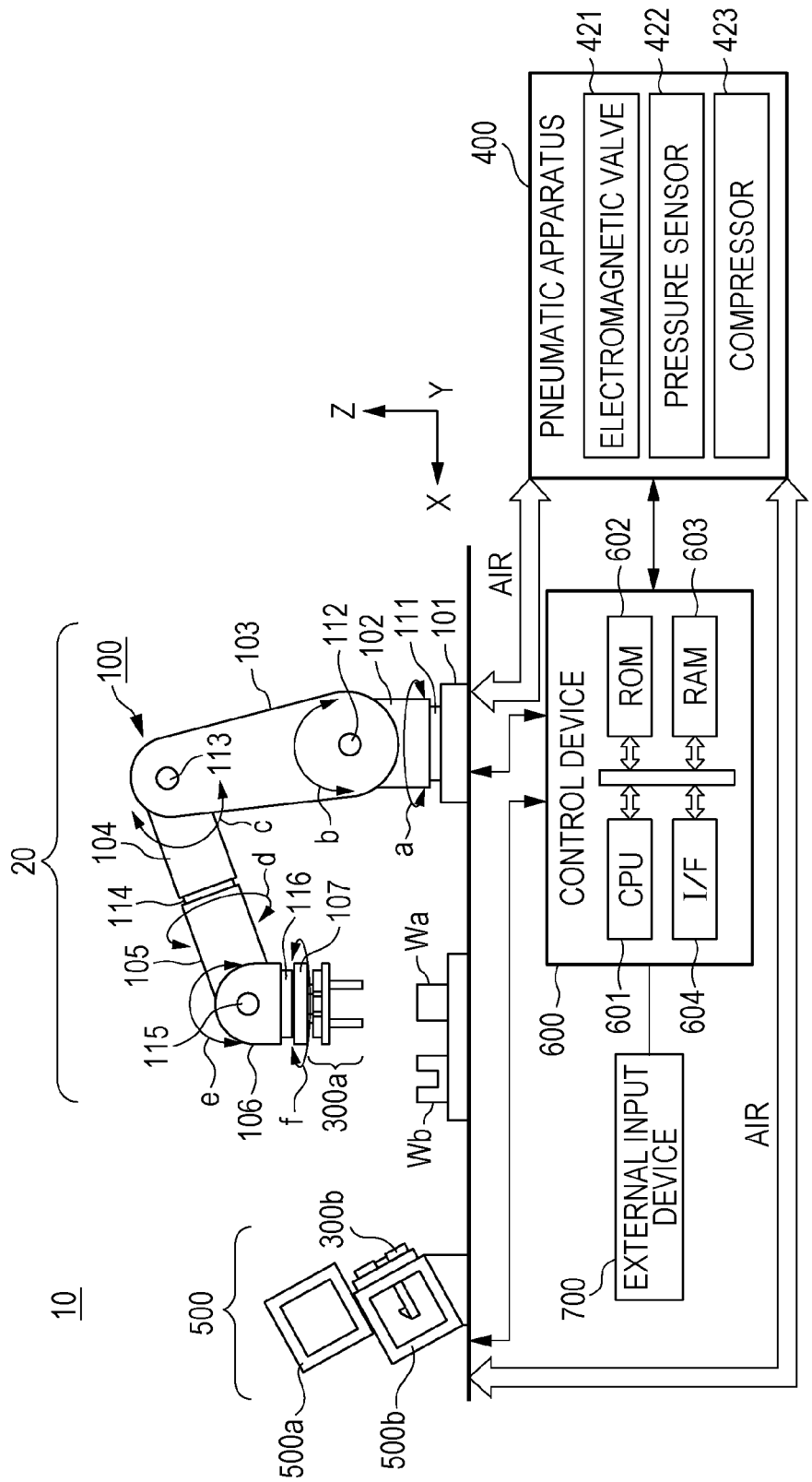
FIG. 1 is a view schematically illustrating a configuration of a robot system according to a first embodiment.

FIG. 1 is a view schematically illustrating a configuration example of a robot system that can implement the present disclosure. As illustrated in FIG. 1, a robot system 10 includes a robot apparatus 20, a tool stocker 500, a pneumatic apparatus 400, a control device 600, and an external input device 700. The pneumatic apparatus 400, the control device 600, and the external input device 700 are shown in the block diagram at the bottom of FIG. 1.

The robot apparatus 20 in FIG. 1 is constituted by a robot arm body 100 and an interchangeable tool 300a that is detachably attached to the end of the robot arm body 100. In place of the interchangeable tool 300a, an interchangeable tool 300b can be also attached to the robot arm body 100. Multiple types of interchangeable tools may be collectively referred to as "interchangeable tools 300". The robot apparatus 20 can perform operations on workpieces W (i.e., workpiece Wa or Wb), which are target objects, by using multiple types of interchangeable tools.

The robot arm body 100 includes a base 101, six links 102 to 107, and six joints 111 to 116 that join the links 102 to 107 to each other in such a manner that the respective links can turn in the directions of arrows a to f in FIG. 1. The joints 111 to 116 have corresponding robot arm motors 121 to 126 that can turn the links 102 to 107 (see FIG. 2). Each of the joints 111 to 116 has an encoder (not illustrated) that detects the angular position of the corresponding joint. The results are fed back to the control device 600.

As illustrated in FIG. 1, the base 101 and the link 102 of the robot arm body 100 are connected to each other by the joint 111. The movement range of the joint 111 is assumed to be, for example, approximately +/−180 degrees in the direction of arrow a from the initial position.

The link 102 and the link 103 of the robot arm body 100 are connected to each other by the joint 112. The movement range of the joint 112 is assumed to be, for example, approximately +/−80 degrees in the direction of arrow b from the initial position.

The link 103 and the link 104 of the robot arm body 100 are connected to each other by the joint 113. The movement range of the joint 113 is assumed to be, for example, approximately +/−70 degrees in the direction of arrow c from the initial position.

The link 104 and the link 105 of the robot arm body 100 are connected to each other by the joint 114. The movement range of the joint 114 is assumed to be, for example, approximately +/−180 degrees in the direction of arrow d from the initial position.

The link 105 and the link 106 of the robot arm body 100 are connected to each other by the joint 115. The movement range of the joint 115 is assumed to be, for example, approximately +/−120 degrees in the direction of arrow e from the initial position.

The link 106 and the link 107 of the robot arm body 100 are connected to each other by the joint 116. The movement range of the joint 116 is assumed to be, for example, approximately +/−240 degrees in the direction of arrow f from the initial position.

As illustrated in FIG. 1, the interchangeable tool 300a is attached to the link 107 that is located at the distal end of the robot arm body 100. The interchangeable tool 300 that is supported by the link 107 can move freely in the XYZ coordinate space in the drawings in accordance with operation of the robot arm body 100. The link 107 has a tool driving motor 221 (FIG. 2) for driving the interchangeable tool 300a. The tool driving motor 221, for example, opens/closes the interchangeable tool 300a so as to grip a target object.

In a case in which assembling a product involves different types of workpieces and different types of operations, various interchangeable tools 300 are selected in accordance with individual target objects W and work items. For example, multiple interchangeable tools having different contact portions, which come into contact with different types of target objects and accordingly have different lengths and shapes, are provided in advance. Appropriate operations can be performed on the target objects W by selecting appropriate interchangeable tools 300 in accordance with types of objects or types of works.

A tool stocker 500 is used to hold each interchangeable tool 300. For example, the interchangeable tool 300a is held by a tool stocker 500a, and the interchangeable tool 300b is held by a tool stocker 500b. Detailed description will be given later.

The pneumatic apparatus 400 supplies air to, or discharges air from, the robot arm body 100 and the tool stocker 500. The pneumatic apparatus 400 is constituted by an electromagnetic valve 421, a pressure sensor 422, and a compressor 423. The pneumatic apparatus 400 operates when the interchangeable tool 300 is attached to and detached from the robot arm body 100 and when the tool stocker 500 holds the interchangeable tool 300.

The control device 600 includes a central processing unit (CPU) 601, a read-only memory (ROM) 602 that stores a program, and a random-access memory (RAM) 603. The control device 600 further includes a communication interface (represented by I/F in the drawings) 604 and other components. The RAM 603 is used to temporarily store data, such as teaching points and control commands from the external input device 700.

An example of the external input device 700 is a device such as a teaching pendant (TP). However, the external input device 700 may be any other computer device (PC or server) that can edit a robot program. The external input device 700 can be connected to the control device 600 via a wired or wireless communication device. The external input device 700 provides a user interface functions for robot operation, displaying a status, or the like.

The CPU 601 receives, via a communication interface 604, teaching point data that are input by using, for example, the external input device 700. The CPU 601 can also generate a moving path for each of the shafts of the robot apparatus 20 in accordance with the teaching point data that have been input from the external input device 700, and the CPU 601 can transmit the moving path data, as target control values, to the robot apparatus 20 via the communication interface 604.

The control device 600 is also connected to the tool stocker 500 via the communication interface 604. This enables the control device 600 to control the robot apparatus 20 and the tool stocker 500 integrally. Moreover, the control device 600 is connected to the pneumatic apparatus 400 via the communication interface 604.

The pneumatic apparatus 400 supplies air to, or discharges air from, the link 107 of the robot arm body 100 and the tool stocker 500. This enables the interchangeable tool 300 to be attached to, or detached from, the robot arm body 100 and subsequently to be positioned in the tool stocker 500 for storage. A detailed description will be given later.

Figure 2:
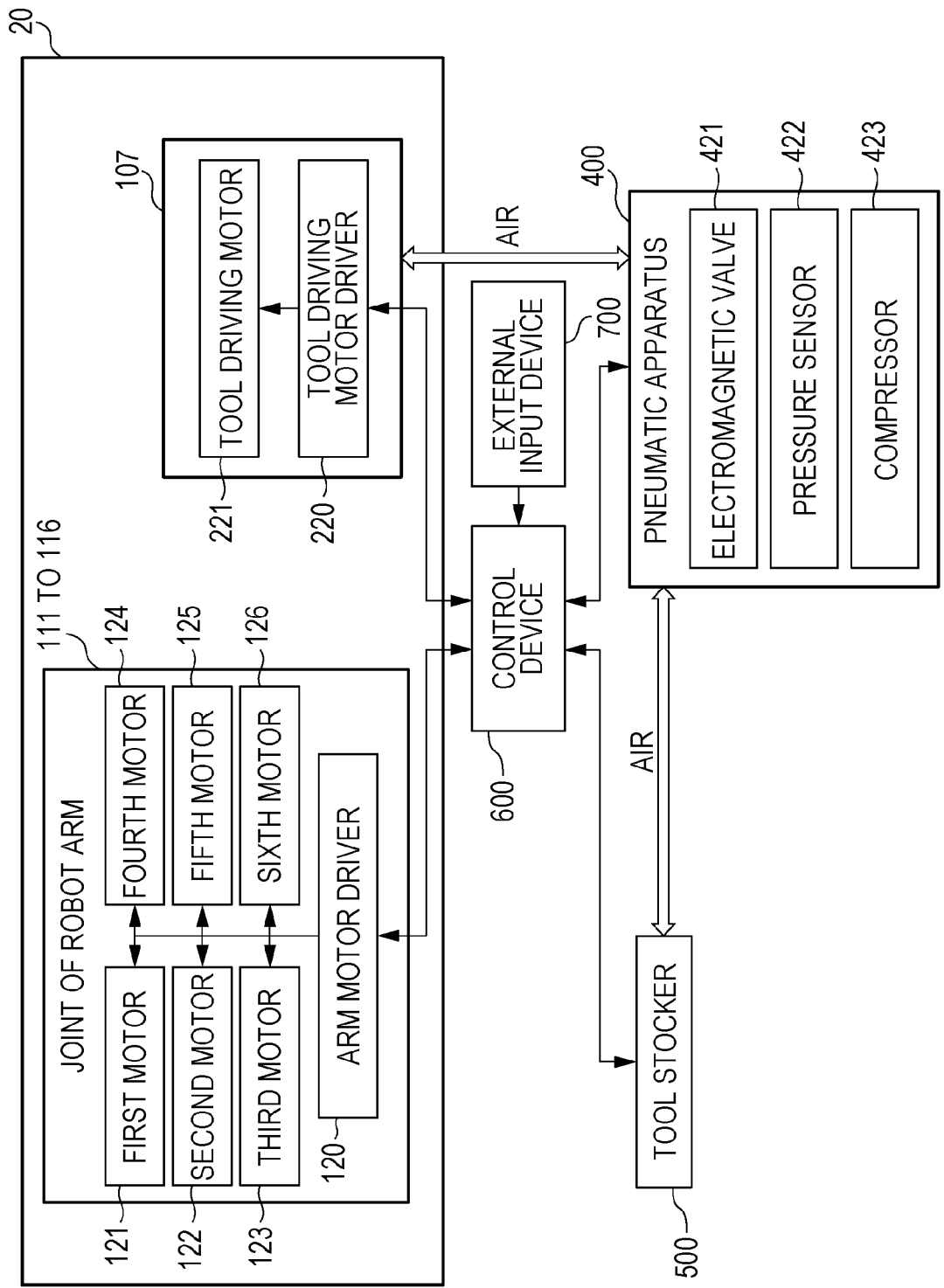
FIG. 2 is a block diagram illustrating control of the robot system according to the first embodiment.

FIG. 2 is a detailed block diagram illustrating a configuration of a control system 10 of the robot system in FIG. 1. The control device 600, which serves as a control section of the robot system 10, controls robot arm motors 121 to 126 that are installed in the respective joints 111 to 116 of the robot arm body 100. The control device 600 also controls a tool driving motor 221 installed in the link 107, the pneumatic apparatus 400, and the tool stocker 500.

An arm motor driver 120 controls each of the robot arm motors 121 to 126 on the basis of the control values obtained from the control device 600 and thereby controls the position of the robot arm body 100. Similarly, a tool driving motor driver 220 controls the tool driving motor 221 on the basis of the control values obtained from the control device 600 and thereby controls opening/closing of the interchangeable tool 300.

The pneumatic apparatus 400 drives the compressor 423 so as to compress or release the air within a tank (not illustrated) on the basis of instruction values from the control device 600. When the pressure sensor 422 detects a predetermined air pressure, the pneumatic apparatus 400 supplies air or discharges air by opening or closing the electromagnetic valve 421. The electromagnetic valve 421 is formed so as to be able to supply air to, or discharge air from, the link 107 and the tool stocker 500 separately.

Next, an attachment/detachment mechanism for the interchangeable tool 300 and the robot arm body 100 according to the present embodiment will be described with reference to FIGS. 3A to 3C.

Figure 3A:
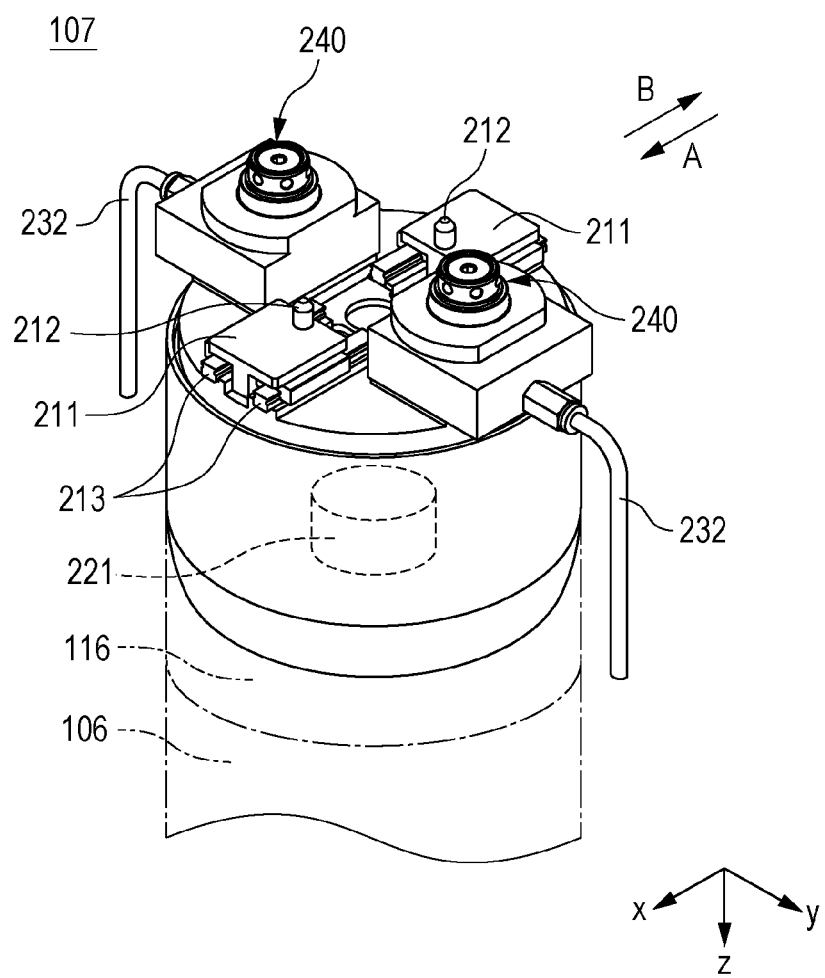
FIGS. 3A to 3C are views illustrating an attachment/detachment mechanism for a robot arm body and an interchangeable tool according to the first embodiment.

FIG. 3A is a perspective view of an attachment/detachment mechanism disposed in the link 107. FIG. 3B is a perspective view of the attachment/detachment mechanism disposed in the interchangeable tool 300. FIG. 3C is a view illustrating a state in which the interchangeable tool 300 is attached to the link 107.

Figure 3B:
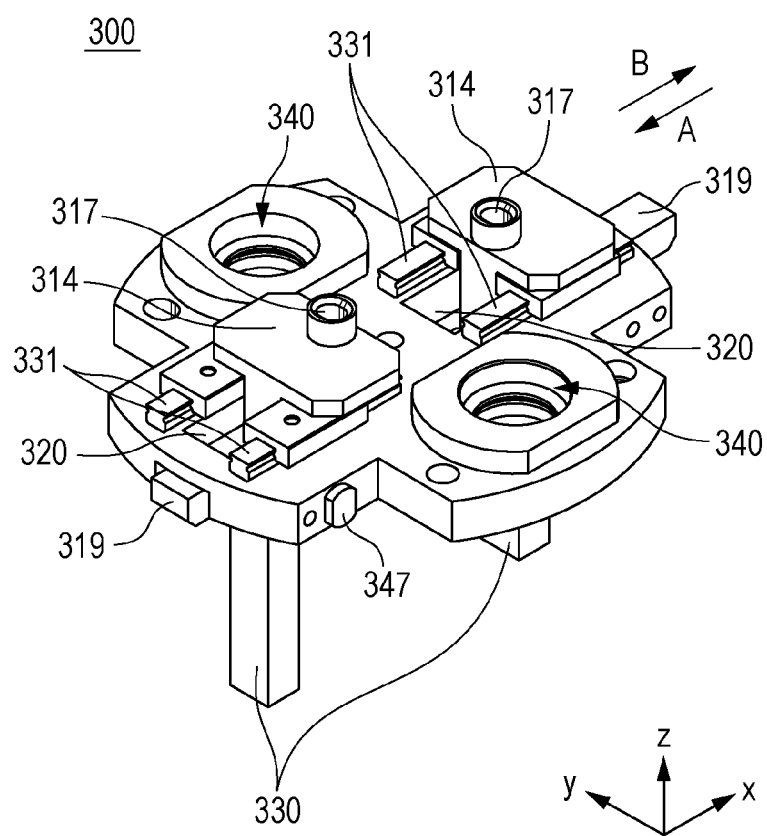

As illustrated in FIGS. 3A and 3B, a pair of drive bases 211 are mounted on a mounting surface of the link 107 on which the interchangeable tool 300 is mounted. A pair of the drive bases 211 are supported by a pair of slide guides 213 in such a manner that the drive bases 211 are movable in the directions of arrow A and arrow B. A pair of the drive bases 211 are formed such that the tool driving motor 221 moves the drive bases 211 closer to, or away from, each other by using a rack and pinion mechanism (not illustrated).

The interchangeable tool 300 has a pair of finger support bases 314. A pair of the finger support bases 314 are supported by a slide guide mechanism in such a manner that the finger support bases 314 can move closer to or away from each other in the directions of arrow A and arrow B, which is similar to a pair of the drive bases 211. A pair of the finger support bases 314 are joined to a pair of corresponding fingers 330, which serve as contact portions that come into contact with a target object. A pair of the finger support bases 314, which move closer to or away from each other, cause a pair of the fingers 330 to move closer to or away from each other so as to grip or release a target object.

A pair of the finger support bases 314 are disposed on a mounting surface of the interchangeable tool 300 that faces the link 107. The finger support bases 314 can move closer to or away from each other along the slide guides 331 in the directions of arrow A and arrow B in accordance with movement of a pair of the drive bases 211 of the link 107. The finger support bases 314 are integrally joined to the respective fingers 330 that pass through openings 320 and protrude from the surface of the interchangeable tool 300 opposite to the mounting surface. The fingers 330 serve as contact portions that come into contact with a target object. The finger support bases 314 that move closer to or away from each other can cause the fingers 330 to open or close and thereby to grip or release the target object.

Figure 3C:
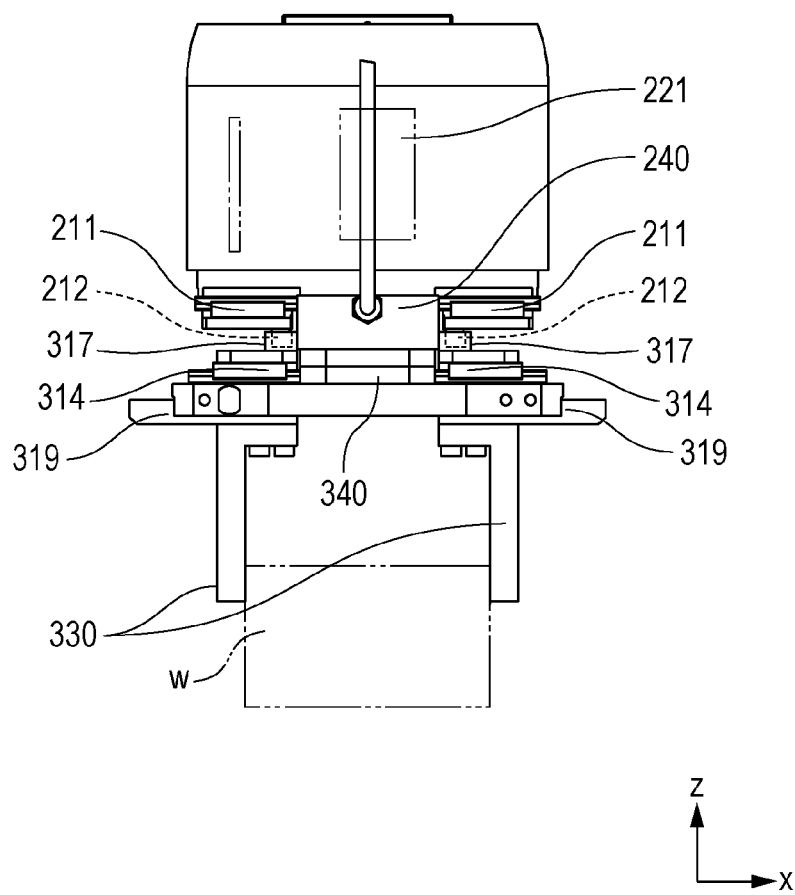

In the state in which the interchangeable tool 300 is attached to the link 107, drive transmission pins 212 disposed in the drive bases 211 engage respective drive transmission holes 317 disposed in the finger support bases 314 (FIG. 3C). The drive transmission pins 212 and the drive transmission holes 317 are mechanically connected to each other.

As illustrated in FIG. 3C, a pair of the drive bases 211 are moved closer to or away from each other in this state. This causes a pair of the finger support bases 314 to move closer to or away from each other, which causes a pair of the fingers 330 to move closer to or away from each other and thereby grip or release a target object W. The drive transmission pins 212 and the drive transmission holes 317 serve as a drive transmission portion that drives the fingers 330, which serve as the contact portions that come into contact with a target object.

The finger support bases 314 have respective protruding portions 319. The protruding portions 319 protrude when the respective finger support bases 314 move in the directions of arrow A and arrow B.

The link 107 has a pair of ball plangers 240, and the interchangeable tool 300 has a pair of engagement holes 340. The ball plangers 240 and the engagement holes 340 are disposed to maintain the state of attachment of the interchangeable tool 300 to the link 107. In the present embodiment, the ball planger 240 is a type of ball planger that uses air for engagement. The air is supplied to or discharged from the ball plangers 240 via a pair of pipes 232. A pair of the pipes 232 are connected to the above-described pneumatic apparatus 400. A pair of the ball plangers 240 are inserted into a pair of the engagement holes 340 of the interchangeable tool 300. Ball members of the ball plangers 240 are pushed out by air, and the interchangeable tool 300 and the link 107 engage each other. The ball plangers 240 and the engagement holes 340 serve as a fixing portion that maintains the state of attachment of the interchangeable tool 300 to the robot arm body 100.

Note that in the present embodiment, the ball members are moved by using air, but a spring or an electromagnetic valve may be used to cause the ball members to move and engage each of the engagement holes 340.

Other interchangeable tools 300 are also equipped with the above-described attachment/detachment mechanism. Accordingly, various interchangeable tools can be used to perform various appropriate operations on a target object. The fixing portion and the drive transmission portion are disposed on appropriate surfaces of the interchangeable tool 300 and the link 107. Accordingly, the interchangeable tool 300 can be attached or detached while the robot arm body 100 moves the link 107 closer to or away from the interchangeable tool 300 in a single direction.

Figure 4A:
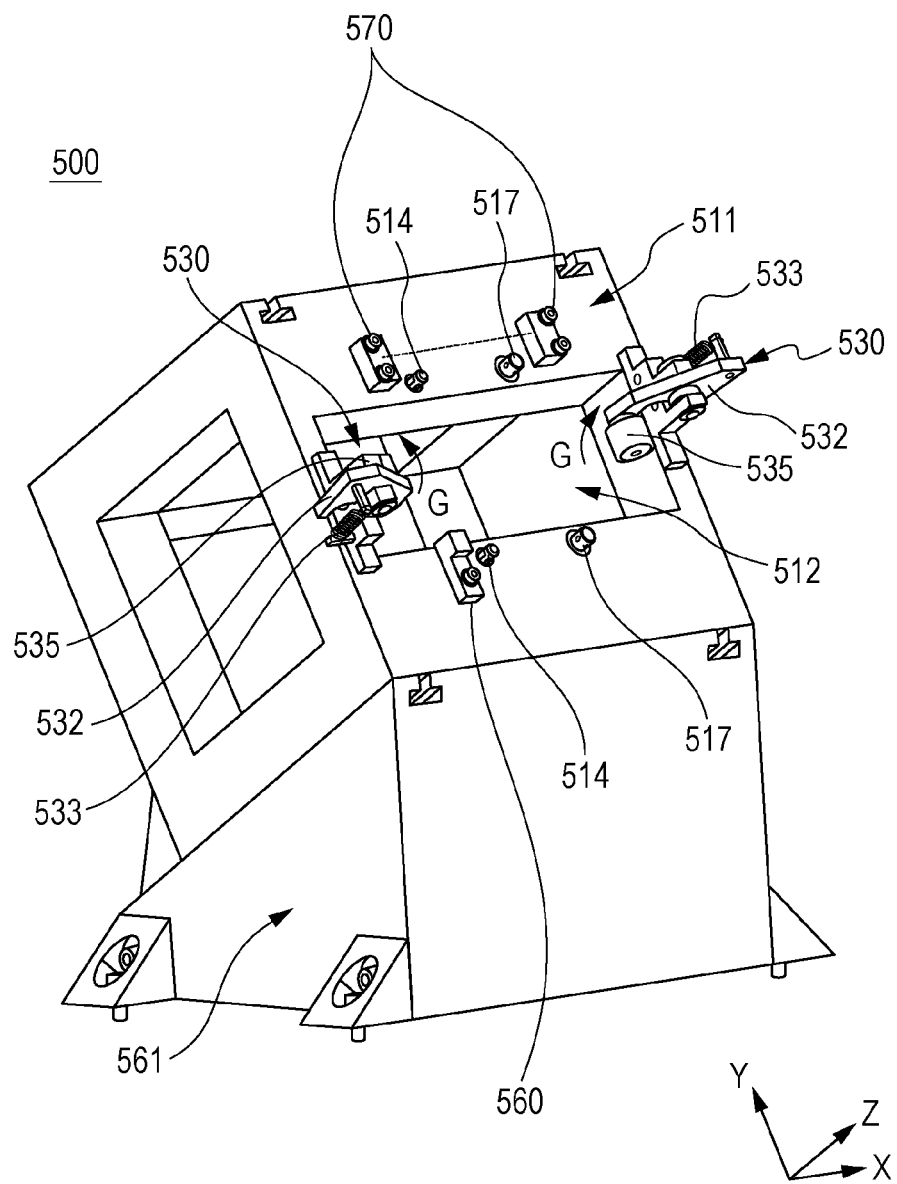
FIG. 4A to 4C are views illustrating a state in which the interchangeable tool is held by a tool stocker in the first embodiment.
Figure 4B:
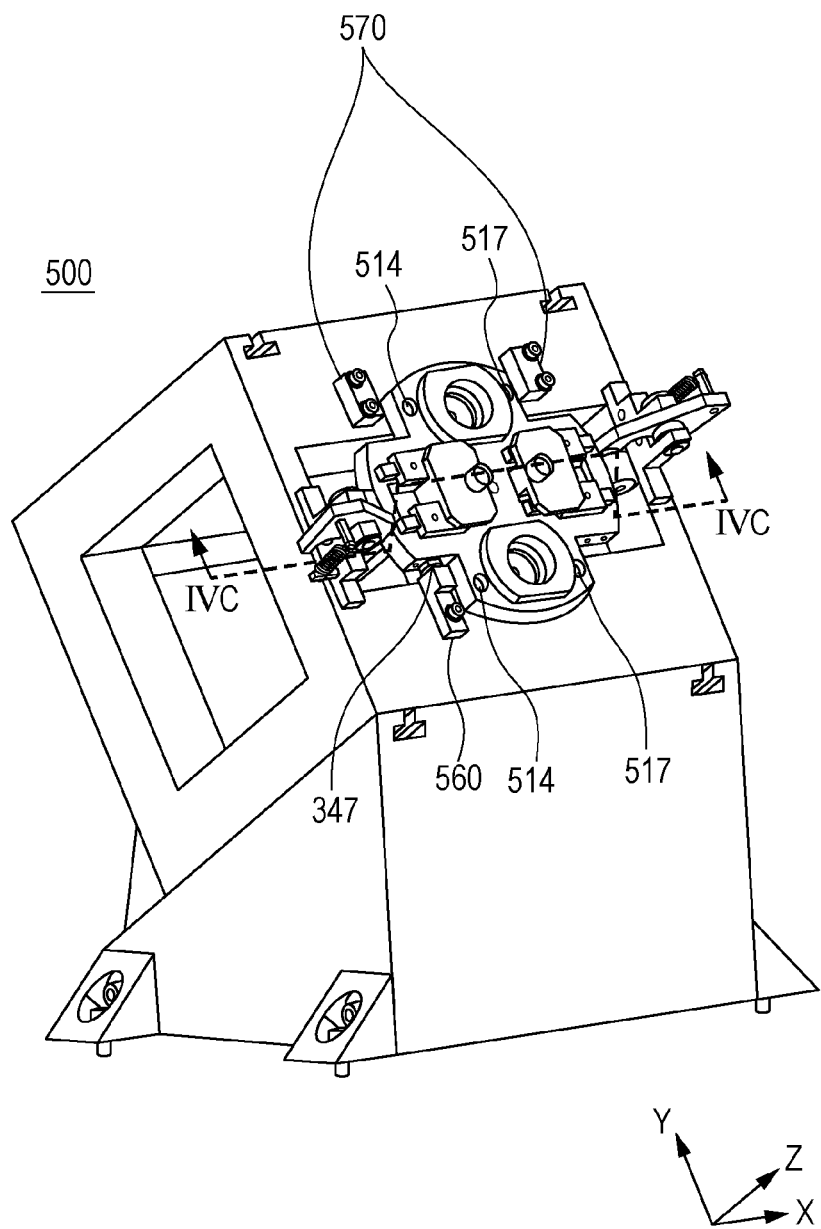
Figure 4C:
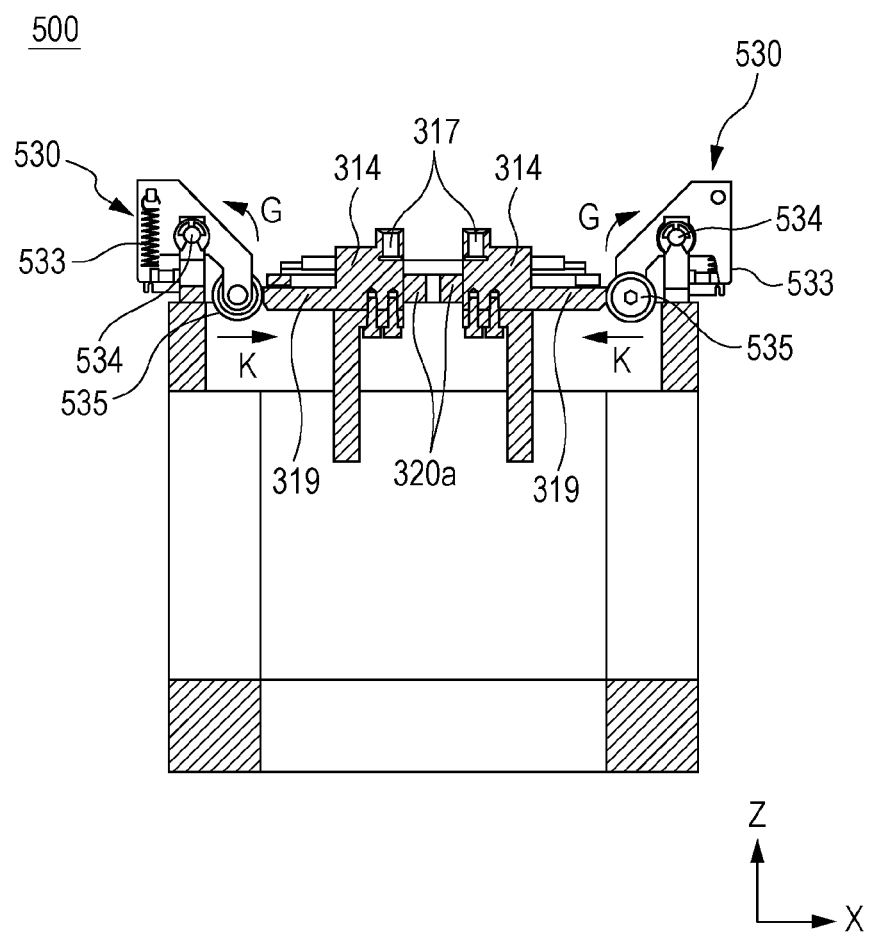

Next, the tool stocker 500 that holds the interchangeable tool 300 of the disclosure will be described with reference to FIGS. 4A to 4C. FIG. 4A is a perspective view of a tool stocker 500 that does not hold the interchangeable tool 300. FIG. 4B is a perspective view of the tool stocker 500 that holds the interchangeable tool 300. FIG. 4C is the cross-section that is cut along dash-dot-dot line IVC-IVC in FIG. 4B.

As illustrated in FIG. 4A, the tool stocker 500 has an opening 512 provided in a contact surface 511 that comes into contact with the interchangeable tool 300 when the tool stocker 500 holds the interchangeable tool 300. The fingers 330 are inserted into the opening 512. The tool stocker 500 is installed on a stocker-inclining member 561 in such a manner that the contact surface 511 is inclined with respect to a floor surface so as to face obliquely upward. The stocker-inclining member 561 maintains the surface of the interchangeable tool 300 that comes into contact with the link 107 in a state in which the surface faces obliquely upward.

Disposed on the contact surface 511 are a pair of pins 514, a pair of ball plangers 517, a pair of pressing mechanisms 530, an identification sensor 560, and presence/absence sensors 570 of a light transmissive type.

Each of the pins 514 includes a diameter expansion member that can expand and contract the diameter of the pin by using air. The pins 514 are connected to the pneumatic apparatus 400 (see FIG. 2) by piping (not illustrated), and the diameter expansion member is expanded or contracted by supplying or discharging air. A pair of the ball plangers 517 are formed similarly to the above-described ball plangers 240.

Each of the pressing mechanisms 530 is formed of a lever member 532 that is turnably disposed and a spring member 533. The spring member 533 engages an end of the lever member 532, thereby elastically urging the lever member 532 to turn in the direction of arrow G.

A roller 535 is attached to the lever member 532. The roller 535 comes into contact with each of the protruding portions 319. A pair of the lever members 532, which are urged to turn in the directions of arrow G by the spring members 533, press the protruding portions 319. The lever members 532 thereby position the finger support bases 314. A detailed description will be given below.

As illustrated in FIG. 4A, the lever member 532 is turned around a lever turning axis 534 in the direction of arrow G due to the spring member 533 pulling the lever member 532. The lever member 532 moves the roller 535 upward in the direction of arrow G simultaneously. When the tool stocker 500 does not hold the interchangeable tool 300, the tool stocker 500 stays in the state in FIG. 4A.

FIG. 4B is a view illustrating the state in which the tool stocker 500 holds the interchangeable tool 300. The interchangeable tool 300 has holes at positions corresponding to the pins 514 and the ball plangers 517. The diameter expansion members of the pins 514 expand outward and come into close contact with the respective holes, which thereby fixes the position of the interchangeable tool 300 in the X and Y directions. In addition, the ball plangers 517 engage the respective holes of the interchangeable tool 300 and expand outward, which thereby fixes the position of the interchangeable tool 300 in the Z direction. Thus, the pins 514 and the ball plangers 517 serve as a positioning mechanism to position the interchangeable tool 300 and retain the position.

As illustrated in FIG. 4C, in the state of the interchangeable tool 300 being held, the spring members 533 elastically urge the pressing mechanisms 530 to turn around the respective lever turning axes 534 in the directions of arrow G. The rollers 535 are brought into contact with the respective protruding portions 319 and press the protruding portions 319 continuously in the directions of arrow K. Since the protruding portions 319 are integral to the respective finger support bases 314, the finger support bases 314 are thereby brought into contact with abutting portions 320a that are formed at inner edges of the openings 320.

As a result, the finger support bases 314 and the drive transmission holes 317 are placed at appropriate positions, and the positions are maintained. Even if the interchangeable tool 300 are held by the tool stocker 500 in an inclined manner because of the stocker-inclining member 561, the interchangeable tool 300 is positioned appropriately. Accordingly, the positioning mechanism reduces the likelihood of the drive transmission holes 317 deviating from the drive transmission pins 212 of the link 107 when the interchangeable tool 300 is attached to the link 107.

Returning to FIG. 4A, the identification sensor 560 is a proximity sensor that outputs a signal when an object comes to a predetermined position. The interchangeable tool 300 has an identification portion 347 (FIG. 3B) disposed at a position opposing the identification sensor 560 when the interchangeable tool 300 is held by the tool stocker 500. When the interchangeable tool 300 is held on the tool stocker 500, the identification portion 347 comes close to the identification sensor 560 and reaches the predetermined position (FIG. 4B).

When this occurs, the identification sensor 560 transmits an "ON" signal to the control device 600, and the control device 600 determines that the interchangeable tool 300 is held by the corresponding tool stocker 500 appropriately. On the other hand, when an inappropriate interchangeable tool 300 is held and it does not have the identification portion 347 at the position opposing the identification sensor 560, the signal transmitted from the identification sensor 560 to the control device 600 remains in an "OFF" state, and the control device 600 recognizes that a wrong interchangeable tool 300 is held by the tool stocker 500.

The type of interchangeable tool 300 that is held by the tool stocker 500 can be determined by associating the combination of the positions of the identification portion 347 and the identification sensor 560 with the combination of the interchangeable tool 300 and the tool stocker 500.

The presence/absence sensors 570 are light transmissive sensors, and an optical path extends between the presence/absence sensors 570. Since the interchangeable tool 300 blocks the optical path between the presence/absence sensors 570 in the state in FIG. 4B, the control device 600 recognizes that the interchangeable tool 300 is held on the tool stocker 500.

On the other hand, in the state in FIG. 4A, the control device 600 recognizes that the interchangeable tool 300 is not held on the tool stocker 500 since the optical path between the presence/absence sensors 570 is not blocked.

Next, arrangement of the above-described tool stockers 500 will be described with reference to FIG. 5. FIG. 5 is a layout of the tool stockers 500 according to the present embodiment. The stocker-inclining member 561 has a surface that inclines with respect to a floor surface 565. The tool stocker 500 is installed on the surface of the stocker-inclining member 561 in such a manner that the contact surface 511 of the tool stocker 500 faces obliquely upward.

Two tool stockers 500a and 500b are installed on top of the stocker-inclining member 561 and are joined by fixing members 562. For convenience of description, in the image of FIG. 5, the tool stocker located at the bottom is referred to as the "tool stocker 500b", and the tool stocker located at the top is referred to as the "tool stocker 500a". The tool stockers 500a and 500b hold interchangeable tools 300a and 300b, respectively. Tools 564 to be used for assembling work by the robot apparatus 20 are disposed in the vicinity of the tool stockers 500.

As illustrated in FIG. 5, when the tool stocker 500a is disposed on top of the tool stocker 500b, the tool stocker 500a is joined to the tool stocker 500b in such a manner that the respective contact surfaces 511 are shifted from each other. In other words, the position of the contact surface 511 of the tool stocker 500a, which is represented by dotted line a, is not coincident with the position of the contact surface 511 of the tool stocker 500b, which is represented by dotted line b.

Figure 6:
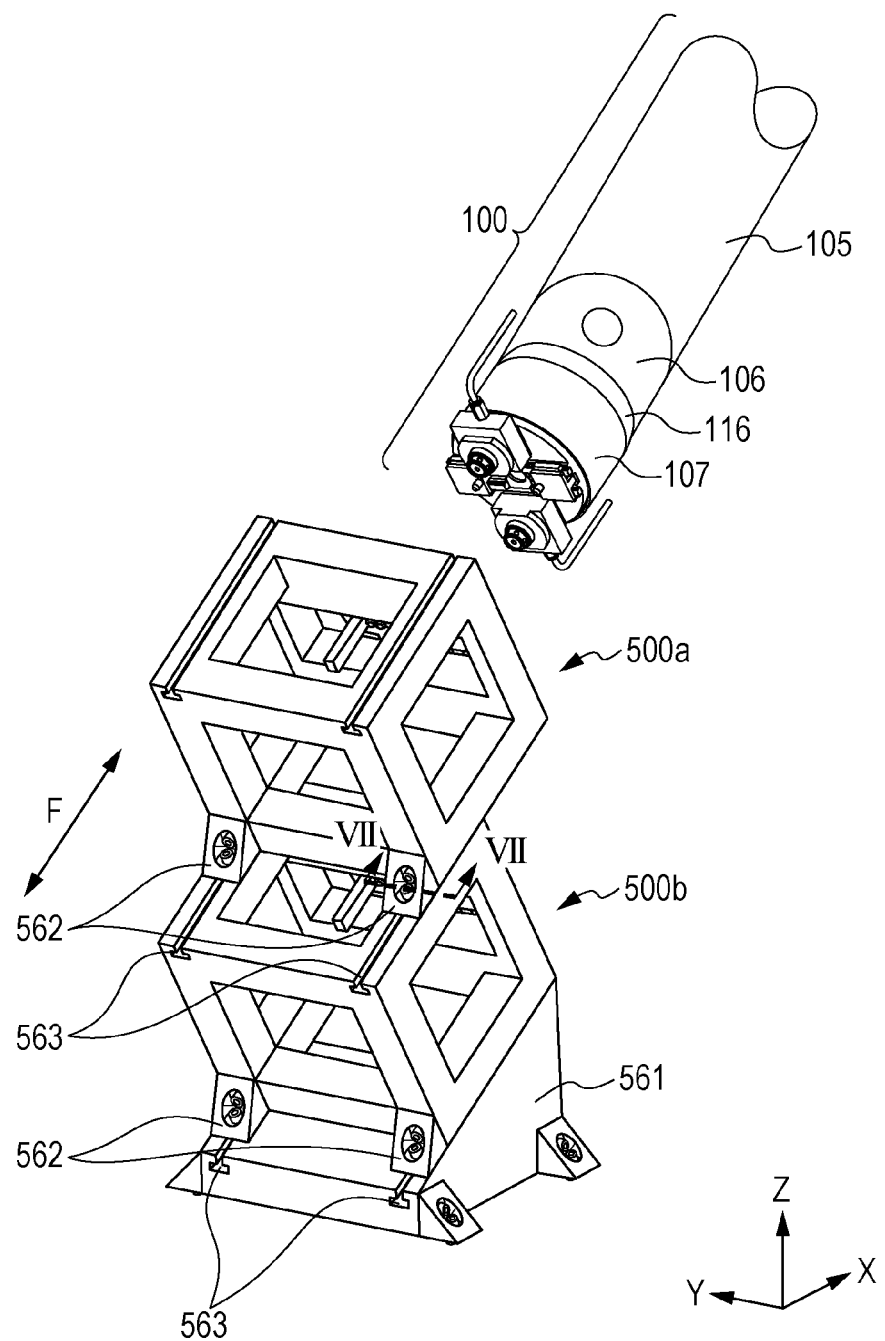
FIG. 6 is a perspective view illustrating a state in which the tool stockers are arranged in the first embodiment when viewed from behind the tool stockers.

FIG. 6 is a perspective view of the tool stockers 500 when viewed from behind the tool stockers 500. Inverse T-shaped grooves 563 are provided in the stocker-inclining member 561, the tool stocker 500a, and the tool stocker 500b. The fixing members 562 are movable along the inverse T-shaped grooves 563 in the direction of arrow F. A detailed description will be given below.

Figure 7:
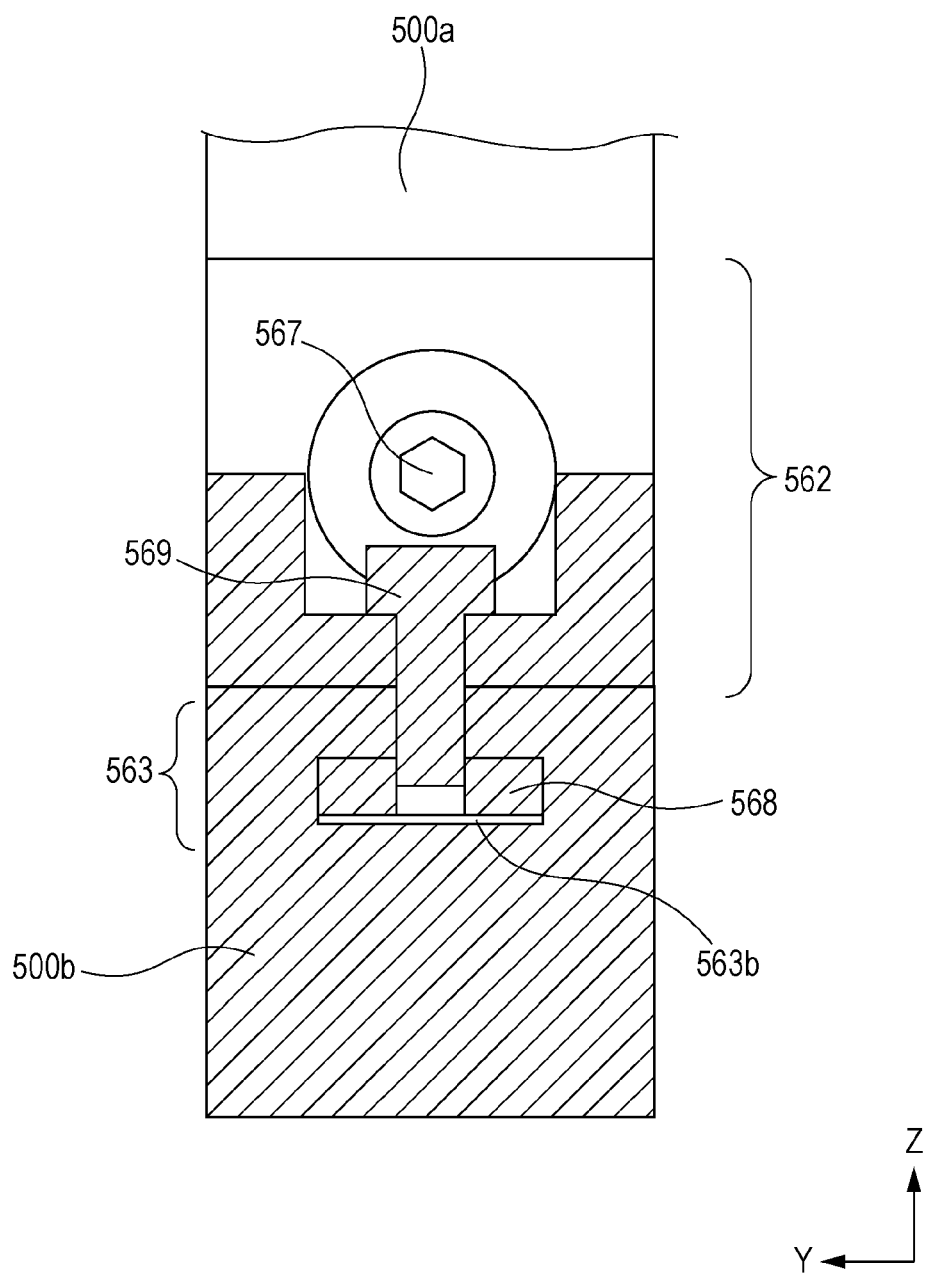
FIG. 7 is a cross-sectional view illustrating the tool stocker and a fixing member according to the first embodiment.

FIG. 7 is a cross-sectional view illustrating a fixing member 562 and a groove 563. FIG. 7 is a cross section that is cut along dash-dot-dot line VII-VII in FIG. 6 and is viewed from a YZ plane. The inverse T-shaped grooves 563 are provided in each of the tool stockers 500. The groove 563 illustrated in FIG. 7 is the one provided in the tool stocker 500b.

The fixing member 562 is fixed to the tool stocker 500a by using a bolt 567. A nut 568 is disposed in the groove 563 and guided by an expanded portion 563b so as to be able to slide along the groove 563 in the F direction in FIG. 6.

As illustrated in FIG. 7, the fixing member 562 and the tool stocker 500b is nipped by the bolt 569 and the nut 568. Loosening the bolt 569 and the nut 568 enables the fixing member 562 to slide along the groove 563.

The fixing member 562 can be fixed at an arbitrary position along the groove 563 by tightening the bolt 569 and the nut 568 thoroughly so as to screw the bolt 569 into the expanded portion 563b. Thus, the tool stocker 500a can be fixed at an arbitrary position. The attaching/detaching position of the interchangeable tool 300 and the robot arm body 100 can be thereby set at an arbitrary position in a direction in which the contact surface 511 and the mounting surface of the robot arm move closer to or away from each other. The mechanism that is constituted by the bolt and nut serves as a position adjustment mechanism.

The position adjustment mechanism is capable of changing the position of the contact surface 511 of each tool stocker and also changing the attaching/detaching position of the interchangeable tool 300 and the robot arm body 100. The bolts 567 and 569 and the nut 568 also serve as a coupling mechanism that joins the tool stocker 500a and the tool stocker 500b to each other. Note that although the above description is focused on the connection between the tool stocker 500a and the tool stocker 500b, a similar mechanism is applied to the fixing member 562 that joins the tool stocker 500b to the stocker-inclining member 561. Also note that instead of the mechanism using the bolt and nut, another mechanism, such as a rack and pinion or a slide guide, is applicable insofar as such a mechanism enables sliding movement in a single direction and fixation at an arbitrary position.

As described above, the tool stocker according to the present embodiment is installed in such a manner that the contact surface is inclined with respect to the supporting surface (i.e., floor surface) so as to face obliquely upward. In other words, the tool stocker is installed in such a manner that the contact surface faces the robot arm body 100 that has a range of motion extending above the level of the tool stocker. This is advantageous in an environment in which the robot arm is installed. A detailed description will be given below.

Example 1

Figure 8B:
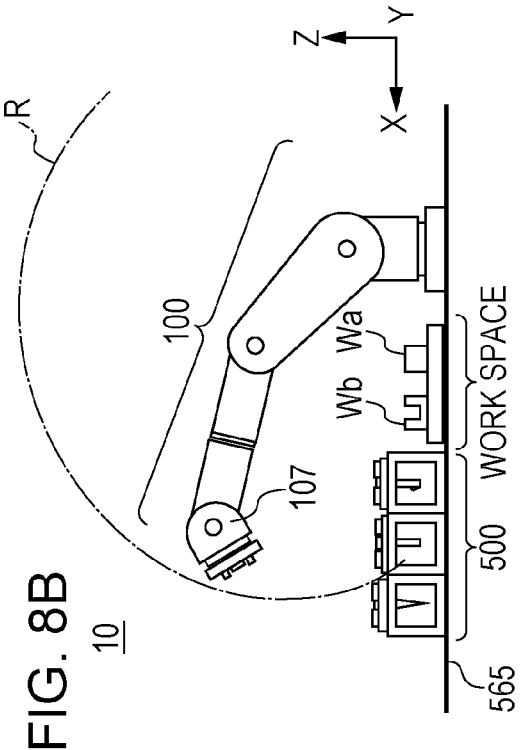
FIGS. 8A to 8D are views illustrating layout examples of the tool stockers in the first embodiment.
Figure 8D:
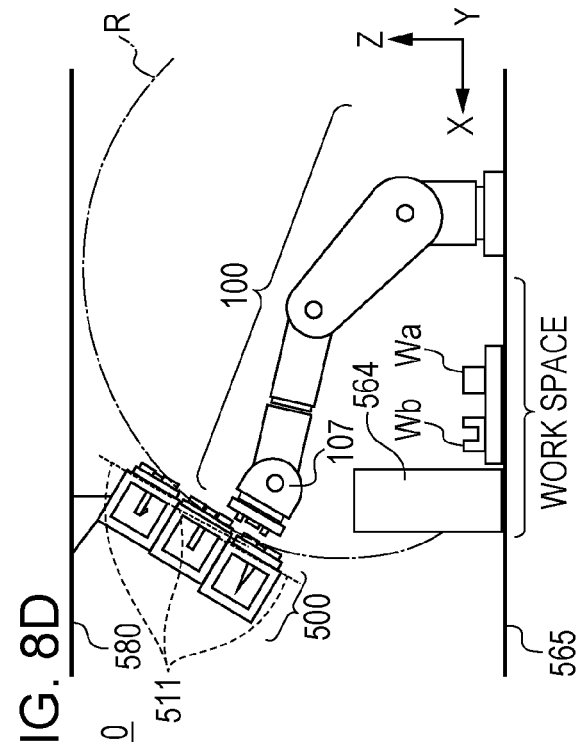
Figure 8A:
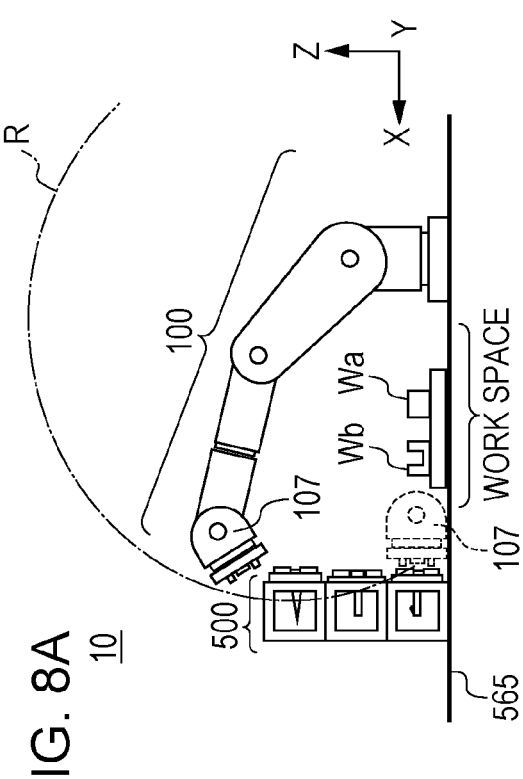

FIGS. 8A and 8B are comparative illustrations to be used for describing advantageous effects of the robot system 10 with tool stocker arrangement according to the present embodiment. FIG. 8A is a view illustrating a state in which the tool stockers 500 are stacked in the Z direction with respect to the floor surface 565 while the X direction is parallel to the direction of attaching and detaching the interchangeable tool 300 to and from the robot arm body 100. FIG. 8B is a view illustrating a state in which the tool stockers 500 are placed in a row parallel to the floor surface 565. Dash-dot line R in FIGS. 8A to 8D indicates the maximum range of motion of the robot arm body 100.

As illustrated in FIG. 8A, when the tool stockers 500 are stacked in the vertical direction with respect to the floor surface 565, in other words, in the Z direction, the attaching/ detaching direction is parallel to the X direction. In this case, the footprint of the tool stockers on the floor surface 565 can be reduced. However, when the link 107 takes the tool held by the bottommost tool stocker, the link 107 takes the tool with the position of the link 107 indicated by the dotted line in FIG. 8A. Consequently, a space for operations performed on the target objects Wa and Wb is not available near the tool stockers 500. As a result, the workspace in which the target object Wa and Wb are placed is inevitably disposed away from the attaching/detaching position of the interchangeable tool 300 and the robot arm body 100, which leads to longer operating time.

As illustrated in FIG. 8B, when the tool stockers 500 are disposed in a raw parallel to the floor surface 565, in other words, in the X direction, the attaching/detaching direction is parallel to the Z direction. In this case, a space occupied by the tool stocker 500 in the Z direction can be reduced. However, placing target objects at a high position in the gravity direction (for example, assembling work carried out on a place such as a wall) is not common because this requires assembling work to be carried out against the gravity. Accordingly, the workspace becomes inevitably narrower compared with the case in FIG. 8A.

Figure 8C:
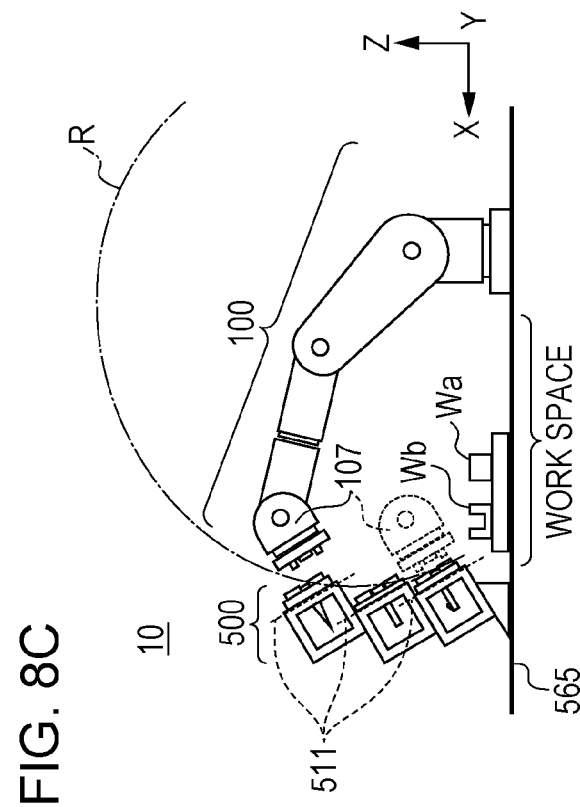

On the other hand, when the tool stockers 500 according to the present embodiment are arranged as illustrated in FIG. 8C, each contact surface 511 of the tool stockers 500 can be inclined and the position of each contact surface 511 is adjustable. Accordingly, the attaching/detaching position of the interchangeable tools 300 and the robot arm body 100 can be adjusted to fit the maximum range of motion of the robot arm body 100.

As a result, the link 107 can take the tool held by the bottommost tool stocker with the position of the link 107 indicated by the dotted line in FIG. 8C, and a space that cannot be used in the case in FIG. 8A becomes now available for the workspace.

In addition, the attaching/detaching position of the interchangeable tools 300 and the robot arm body 100 can be changed by arranging the tool stockers. The attaching/detaching position can be adjusted to fit the moving path of the robot arm body 100 by arranging the tool stockers. The moving path can be generated independent of the attaching/detaching position.

This relaxes constraints on the moving path of the robot arm body 100 and thereby provides more freedom and easiness to decide moving paths of the robot arm so as to shorten operation time.

Moreover, since the tool stockers are stacked in the Z direction, the footprint of the tool stockers on the floor surface 565 can be reduced compared with the case in FIG. 8B. Thus, a larger workspace for the robot arm body 100 is made available.

As described above, by using the tool stockers 500 according to the present embodiment, the attaching/detaching position of the interchangeable tool 300 and the robot arm body 100 can fit the range of motion of the robot arm body 100. This can make a larger workspace available and can provide more freedom in arranging target objects and tools disposed in the workplace as well as in deciding the moving paths of the robot arm body 100. This can improve work efficiency without sacrificing workspace.

As illustrated in FIG. 8D, the tool stockers 500 may be disposed on a ceiling 580. As described above, a pair of the pins 514 and a pair of the ball plangers 517 provided in the tool stocker 500 serve as the positioning mechanism. The positioning mechanism positions and fixes the interchangeable tool 300 and thereby prevents the interchangeable tool 300 from falling. In the case in FIG. 8D, a sill larger workspace is made available for disposing tools, such as large-size tools 564 as illustrated in FIG. 8C.

Modification Example 1

Next, modification examples of the first embodiment will be described. In the first embodiment, the pneumatic apparatus 400 supplies air to, or discharges air from, both the robot arm body 100 and the tool stocker 500. However, the disclosure can be implemented with a configuration in which the pneumatic apparatus 400 supplies air only to the tool stocker 500. A detailed description will be given below.

In the following description, part of a hardware configuration and a control system configuration that are different from those in the first embodiment will be described with reference to the drawings. In modification example 1, the ball planger 240 and the tool stocker 500 according to the first embodiment are altered partially. The elements similar to those in the first embodiment have similar configurations and operate similarly, and accordingly a detailed description on the elements will be omitted. In addition, members or control functions same as, or similar to, those in the first embodiment are denoted by the same reference symbols.

Figure 9:
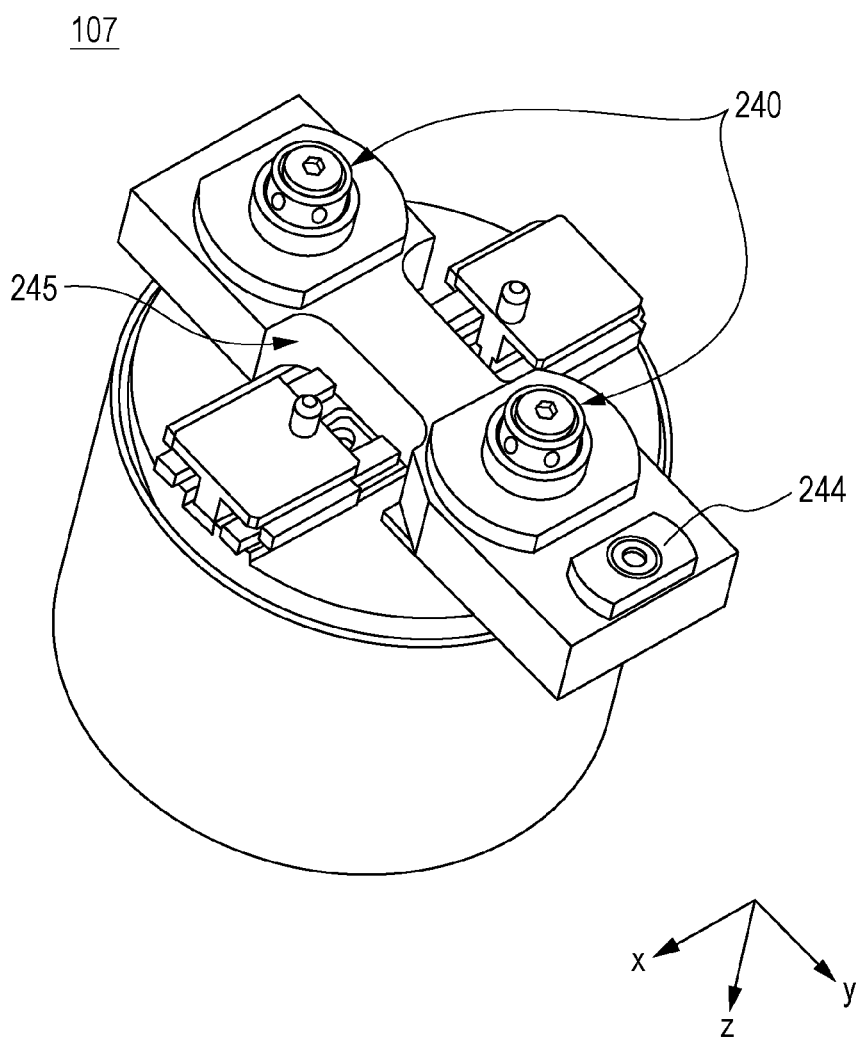
FIG. 9 is a view illustrating an attachment/detachment mechanism for the robot arm body and an interchangeable tool according to modification example 1 of the first embodiment.

As illustrated in FIG. 9, in the present modification example, a pair of the ball plangers 240 are joined to each other by a frame 245. In addition, a coupling portion 244 is disposed in the frame 245. The coupling portion 244 includes a built-in valve for supplying air to actuate a pair of the ball plangers 240.

Figure 10:
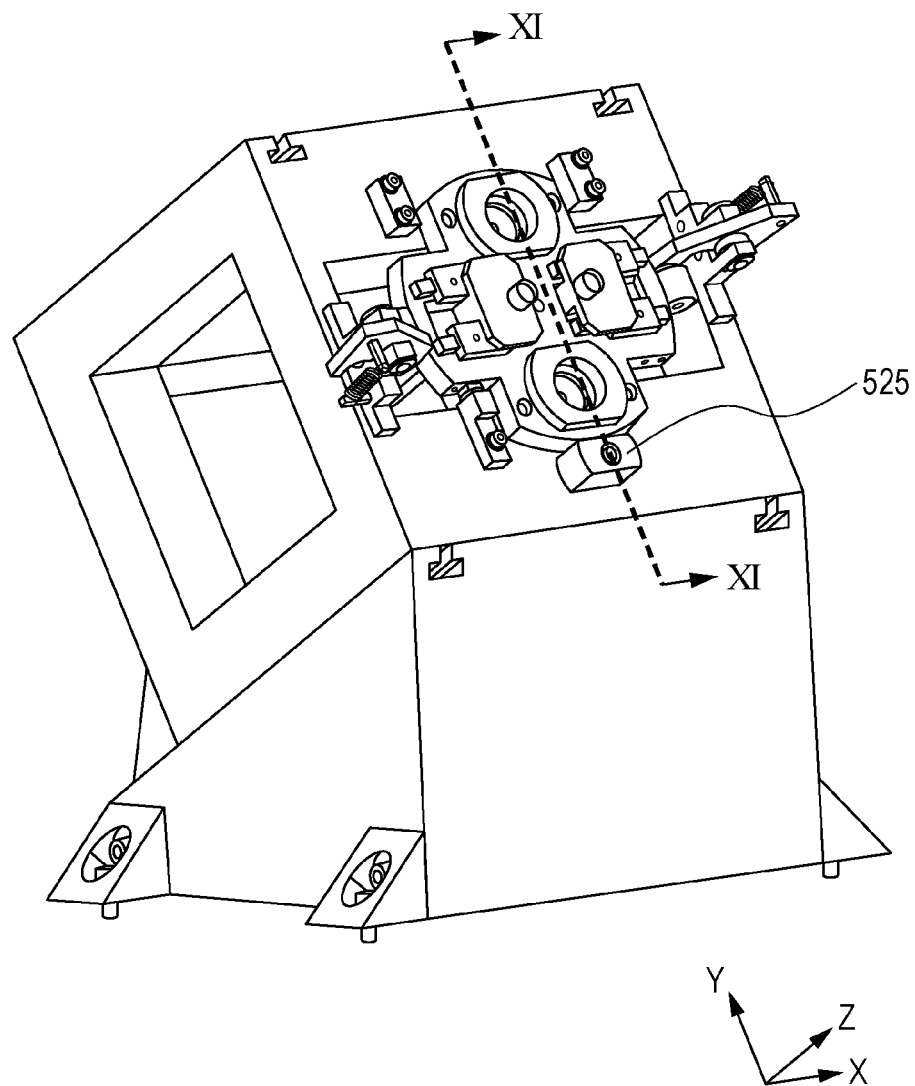
FIG. 10 is a view illustrating a state in which the interchangeable tool is held by a tool stocker according to modification example 1 of the first embodiment.

FIG. 10 is a perspective view illustrating a state in which the interchangeable tool 300 is held by a tool stocker 500 according to the present modification example. The main difference between the present modification example and the first embodiment is that in the present modification example, the tool stocker 500 has a coupling portion 525 that will be coupled to the coupling portion 244 having a valve through which air passes. The coupling portion 525 is connected to the pneumatic apparatus 400 via piping (not illustrated).

Figure 11:
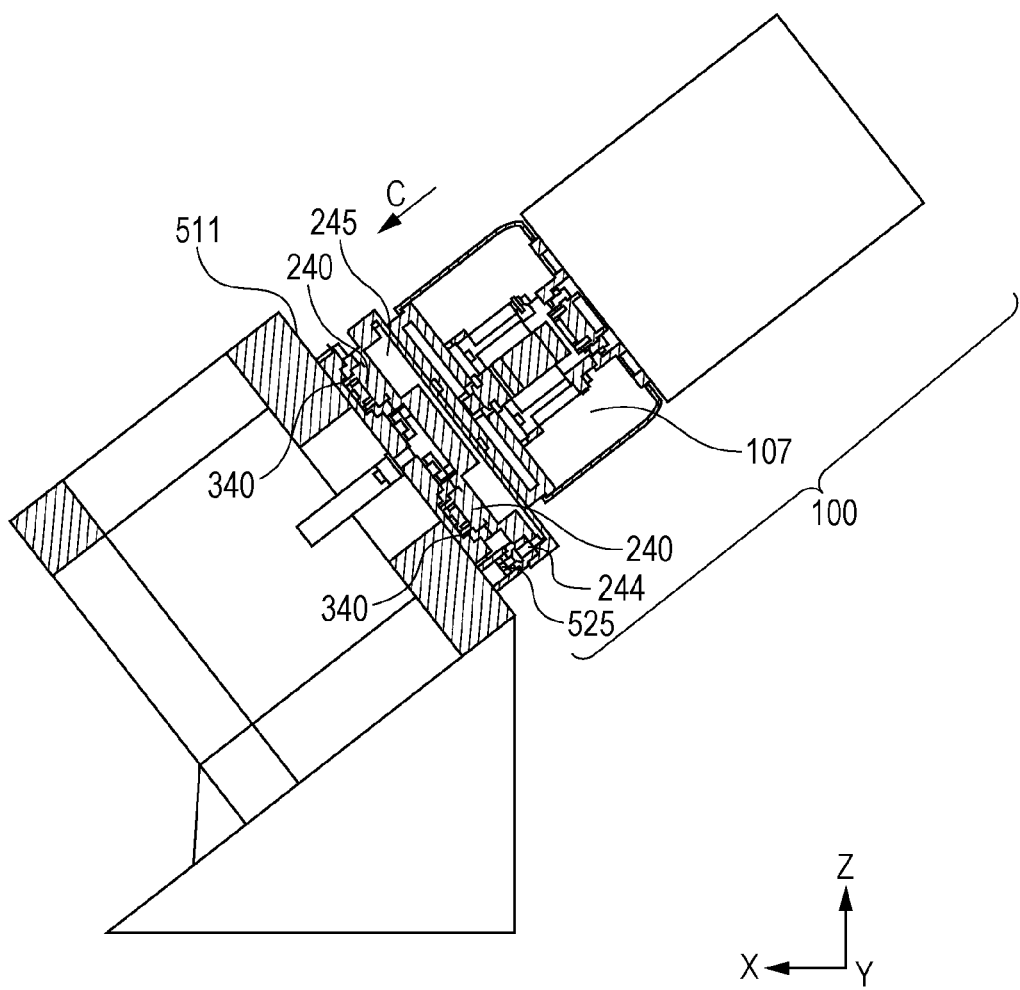
FIG. 11 is a cross-sectional view illustrating a state in which the robot arm body takes the interchangeable tool held by the tool stocker in modification example 1 of the first embodiment.

FIG. 11 is a cross-sectional view illustrating a state in which the robot arm body 100 takes the interchangeable tool 300 that is held on the tool stocker 500. FIG. 11 is a cross section that is cut along dash-dot-dot line XI-XI in FIG. 10. The robot arm body 100 moves the link 107 straight in the direction of arrow C. Subsequently, the ball plangers 240 are inserted into the engagement holes 340 of the interchangeable tool 300.

Simultaneously, the coupling portion 244 and the coupling portion 525 are coupled to each other. At this time, respective valves disposed in the coupling portions 244 and 525 open and thereby establish an air connection through which air is supplied to or discharged from the inside of the frame 245 via the piping. Supplying air to or discharging air from the ball plangers 240 moves the ball members and causes the ball members to engage or disengage the engagement holes 340. The interchangeable tool 300 is thereby attached to or detached from the link 107.

When the interchangeable tool 300 is attached or detached, the coupling portion 525 of the tool stocker 500 receives a force applied by the link 107. The coupling portion 525 is disposed on the contact surface 511 at a position close to the floor surface 565. This can reduce a moment that is generated by a force applied from the link 107 during attachment/detachment and is transferred to the floor surface 565. Accordingly, bending deformation of the tool stocker 500 can be suppressed.

The ball plangers are actuated by supplying or discharging air via the coupling portions 244 and 525, which eliminates the necessity of disposing pipes 232 for air delivery in the robot arm body 100 and can thereby reduce manufacturing cost. The piping is disposed in the tool stocker 500 instead of disposing in the robot arm body 100 that moves frequently. This can reduce the likelihood of damage occurring in the piping. Thus, air can be supplied and discharged reliably.

Modification Example 2

In the first embodiment and in modification example 1, the pressing mechanisms 530 is formed such that the spring members 533 urge the respective lever members 532 that are made turnable and the lever members 532 press the respective protruding portions 319 of the finger support bases 314 when the tool stocker 500 holds the interchangeable tool 300.

However, the pressing mechanisms 530 may be arbitrarily replaced with any other mechanisms that press the finger support bases 314 in predetermined directions. For example, a piston-cylinder actuated by air may be used as the pressing mechanisms 530. For example, each roller 535 is connected to a piston-cylinder that is actuated by air, and air is supplied to the cylinder and actuates the roller 535 in the pressing direction when the tool stocker 500 holds the interchangeable tool 300. This can provide the same effect as in the case of using the lever members.

Figure 12A:
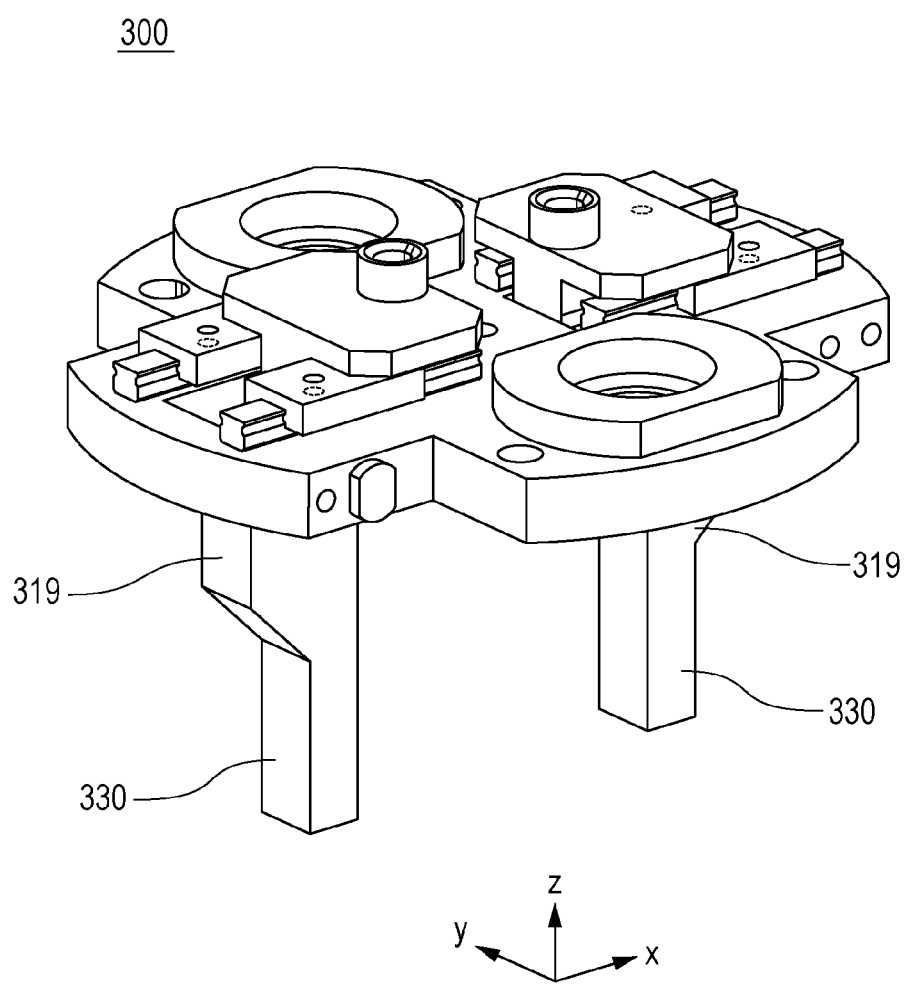
FIGS. 12A to 12C are schematic views illustrating an interchangeable tool and a tool stocker according to modification example 2 of the first embodiment.
Figure 12B:
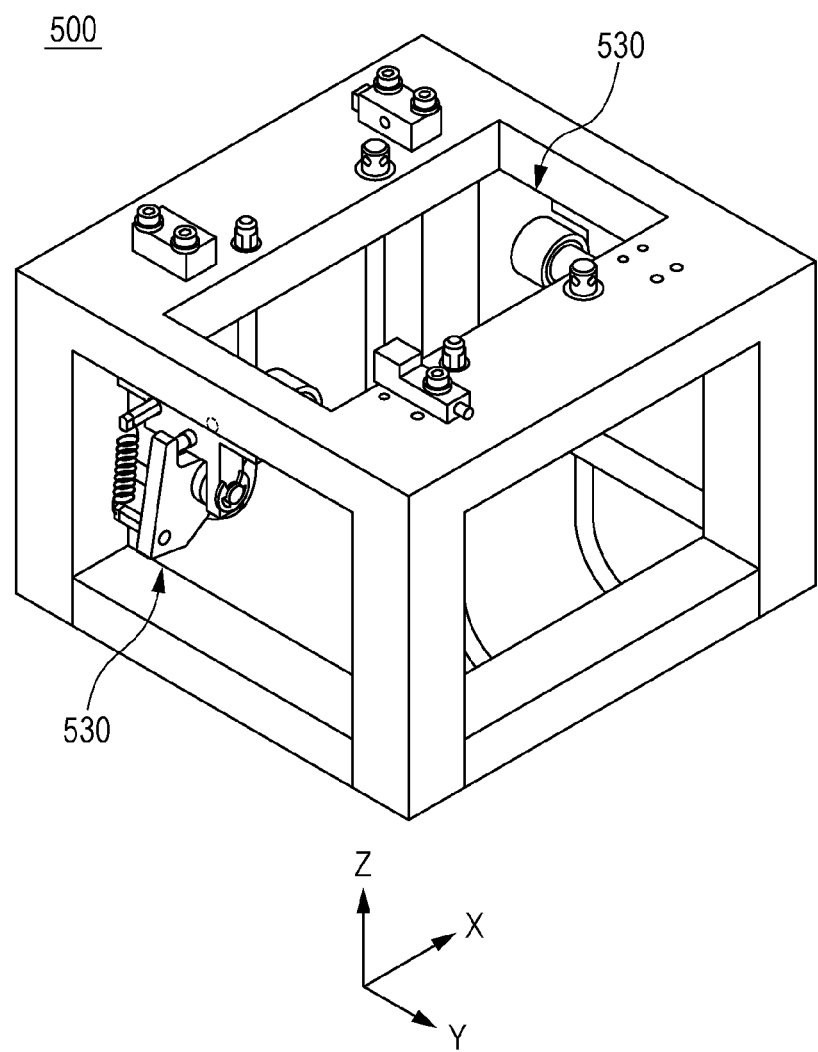
Figure 12C:
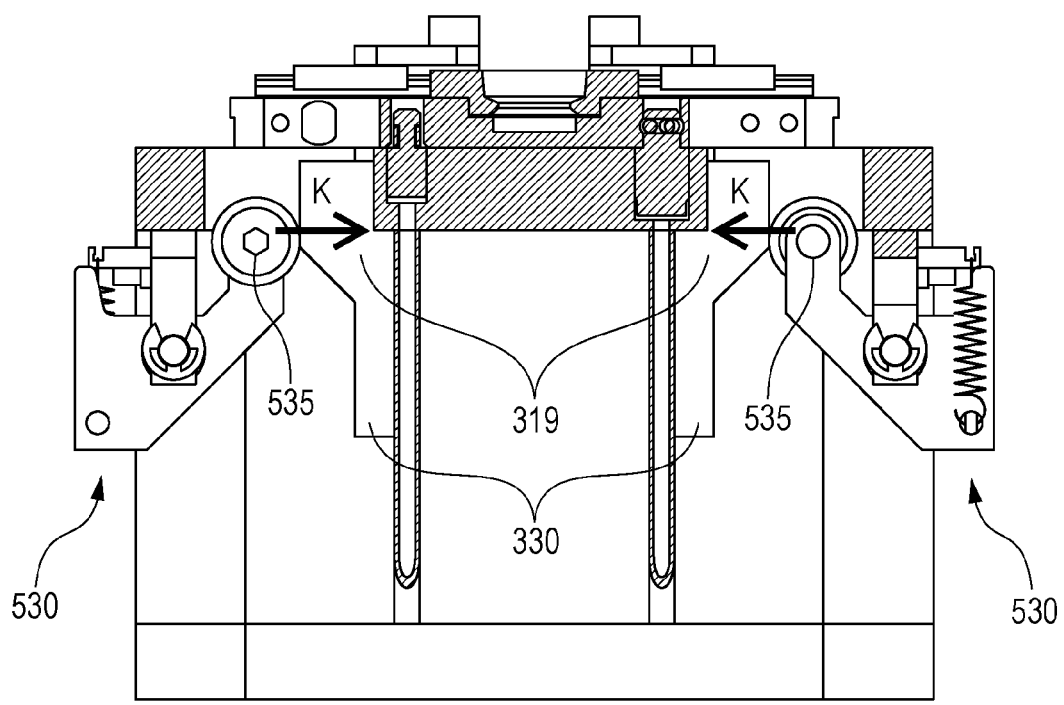

Moreover, as illustrated in FIGS. 12A to 12C, the pressing mechanisms 530 may be disposed below the level of the contact surface 511 in the tool stocker 500 instead of disposing the pressing mechanisms 530 on the contact surface 511. FIGS. 12A to 12C illustrate the interchangeable tool 300 and the tool stocker 500 in the case in which the pressing mechanisms 530 is disposed under the contact surface 511. FIG. 12A illustrates the interchangeable tool 300, and FIG. 12B illustrates the tool stocker 500. FIG. 12C is a cross-sectional view illustrating the state in which the interchangeable tool 300 is held by the tool stocker 500.

As illustrated in FIG. 12A, protruding portions 319 are integrally formed with respective fingers 330. As illustrated in FIG. 12B, the pressing mechanisms 530 are disposed under the contact surface 511 (at a position in the -Z direction).

As illustrated in FIG. 12C, the rollers 535 of the pressing mechanisms 530 come into contact with the respective protruding portions 319, thereby pressing the fingers 330 in the corresponding directions of arrow K. This can provide the same effect as in the case in which the pressing mechanisms 530 are disposed on the contact surface 511 (at a position in the +Z direction).

Figure 13A:
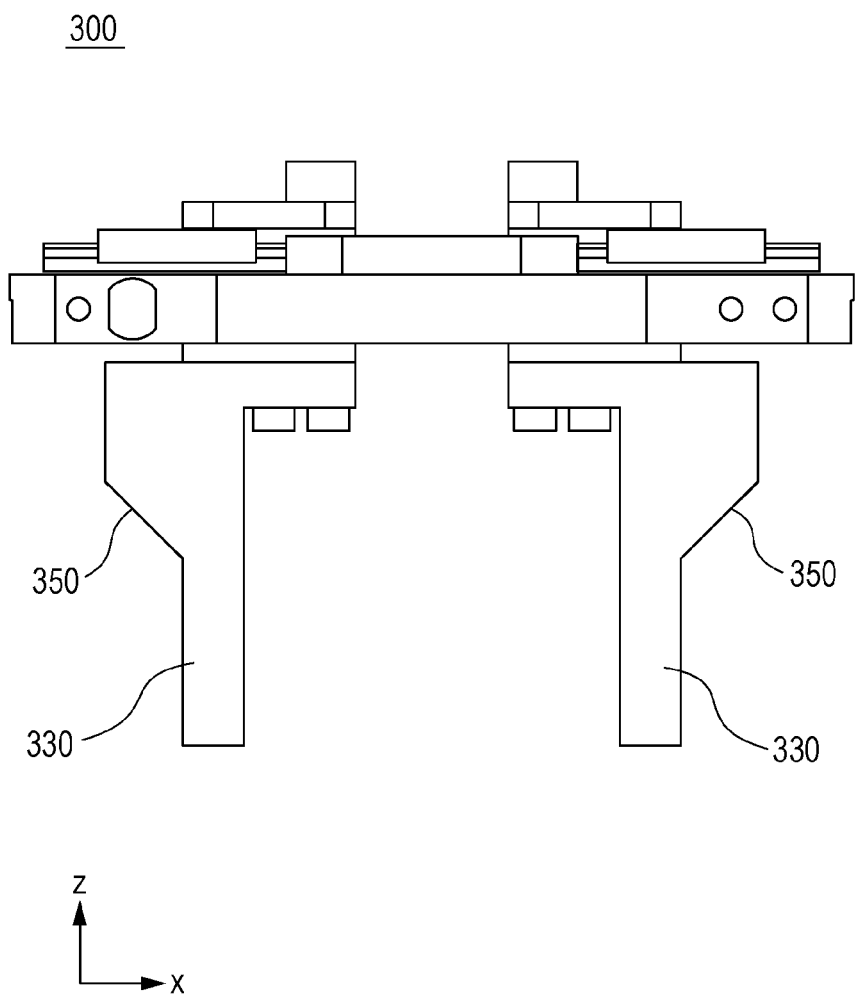
FIGS. 13A to 13B are schematic views illustrating the interchangeable tool and a tool stocker according to modification example 2 of the first embodiment.
Figure 13B:
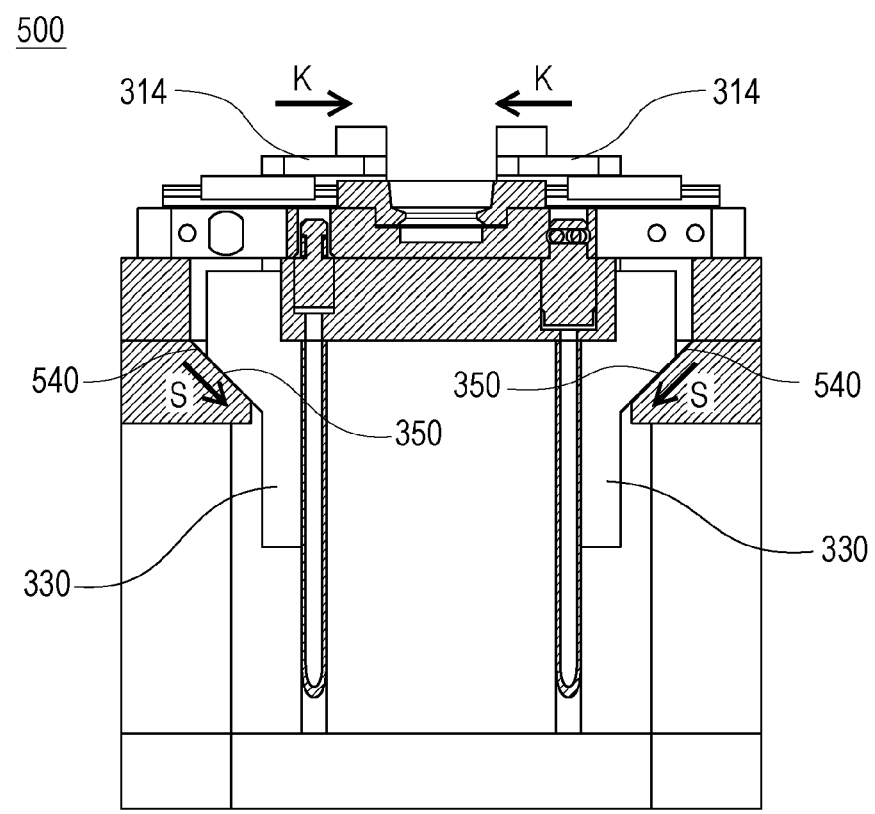

In addition, as illustrated in FIGS. 13A to 13B, tapered portions may be disposed in place of the pressing mechanisms 530. FIGS. 13A to 13B are cross-sectional views illustrating the interchangeable tool 300 and the tool stocker 500 in the case in which tapered members 540 are provided in place of the pressing mechanisms 530.

As illustrated in FIG. 13A, the fingers 330 of the interchangeable tool 300 have respective tapered contact portions 350 in place of the protruding portions 319. The tapered contact portions 350 come into contact with the corresponding tapered portions 540.

As illustrated in FIG. 13B, the tapered contact portions 350 of the interchangeable tool 300 come into contact with the corresponding tapered portions 540 of the tool stocker 500 when the tool stocker 500 holds the interchangeable tool 300.

The fingers 330 slide in the respective directions of arrow S due to tapered portions in contact with other tapered portions. The finger support bases 314 moves in the respective directions of arrow K simultaneously. The finger support bases 314 are positioned to appropriate positions by abutting the inner edges of the openings 320 of the interchangeable tool 300. The tapered contact portions 350 serve as a position regulating portion, and the tapered portions 540 serve as a positioning mechanism.

With this configuration, the finger support bases 314 can be positioned to appropriate positions and the positions can be maintained without using the lever members and the spring members. This can simplify the positioning mechanism to be disposed in the tool stocker 500, which leads to cost reduction.

Second Embodiment

In the first embodiment, the attaching/detaching position of the interchangeable tool 300 is fitted to the moving paths of the robot arm body 100 by arranging the tool stockers 500. Work efficiency is improved by increasing the degree of freedom of the moving paths of the robot arm body 100. However, in the present embodiment, work efficiency can be further improved by arranging workpieces on which the robot arm body 100 performs operations.

In the following description, part of a hardware configuration and a control system configuration that are different from those in the first embodiment will be described with reference to the drawings. The elements similar to those in the first embodiment have similar configurations and operate similarly, and accordingly a detailed description on the elements will be omitted. In addition, members or control functions same as, or similar to, those in the first embodiment are denoted by the same reference symbols.

Figure 14:
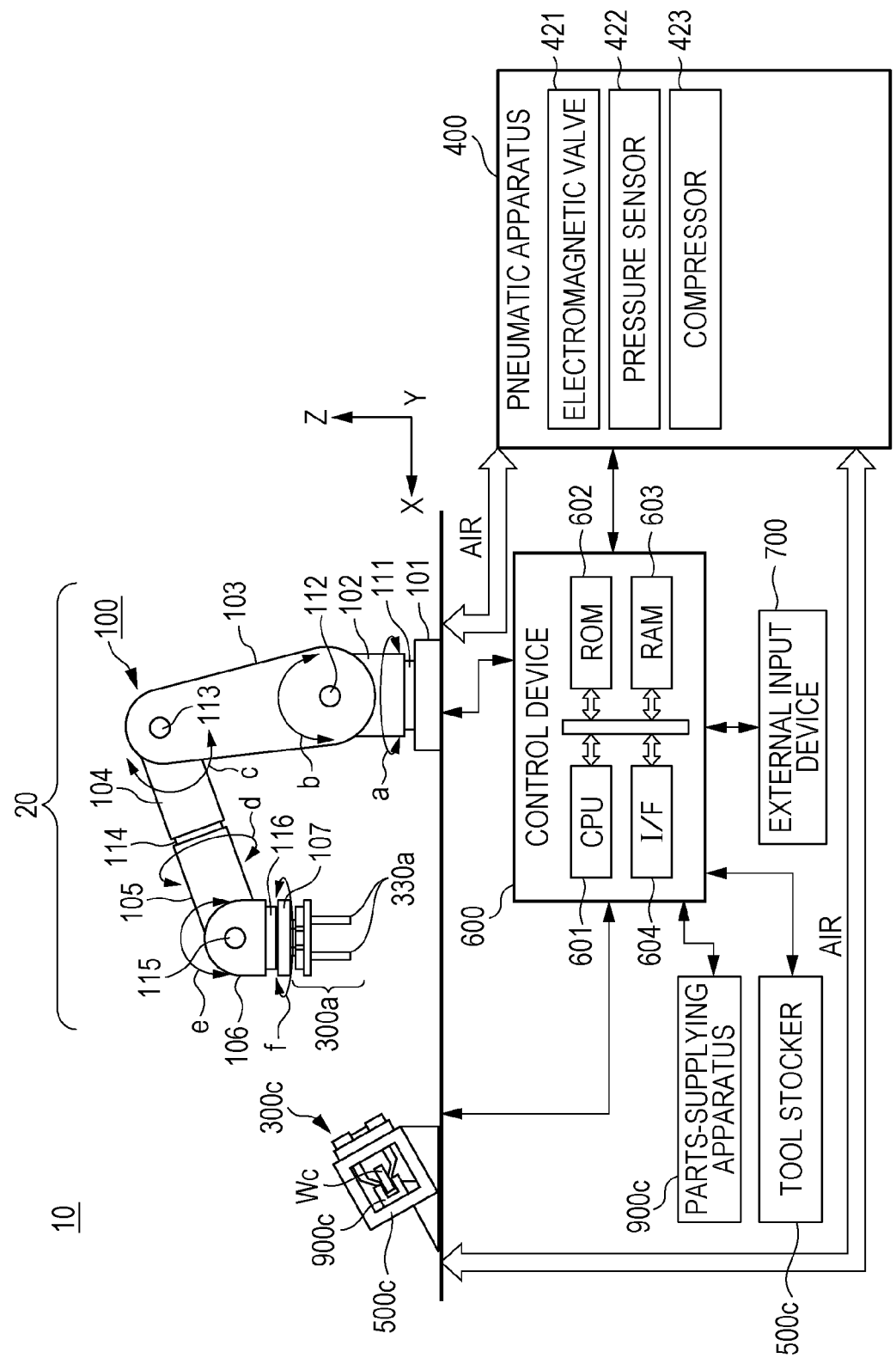
FIG. 14 is a view schematically illustrating a configuration of a robot system according to a second embodiment.

FIG. 14 is a view schematically illustrating a robot system 10 according to the present embodiment. The major difference between the first embodiment and the present embodiment is that a parts-supplying apparatus 900 is disposed in the tool stocker 500 in the present embodiment. A detailed description will be given below.

As illustrated in FIG. 14, the parts-supplying apparatus 900 conveys a workpiece Wc to a position at which the interchangeable tool 300c held by the tool stocker 500c can grip the workpiece Wc. The parts-supplying apparatus 900 that corresponds to the workpiece Wc is hereinafter referred to as the "parts-supplying apparatus 900c". The parts-supplying apparatus 900c is disposed directly under the tool stocker 500c.

Figure 15:
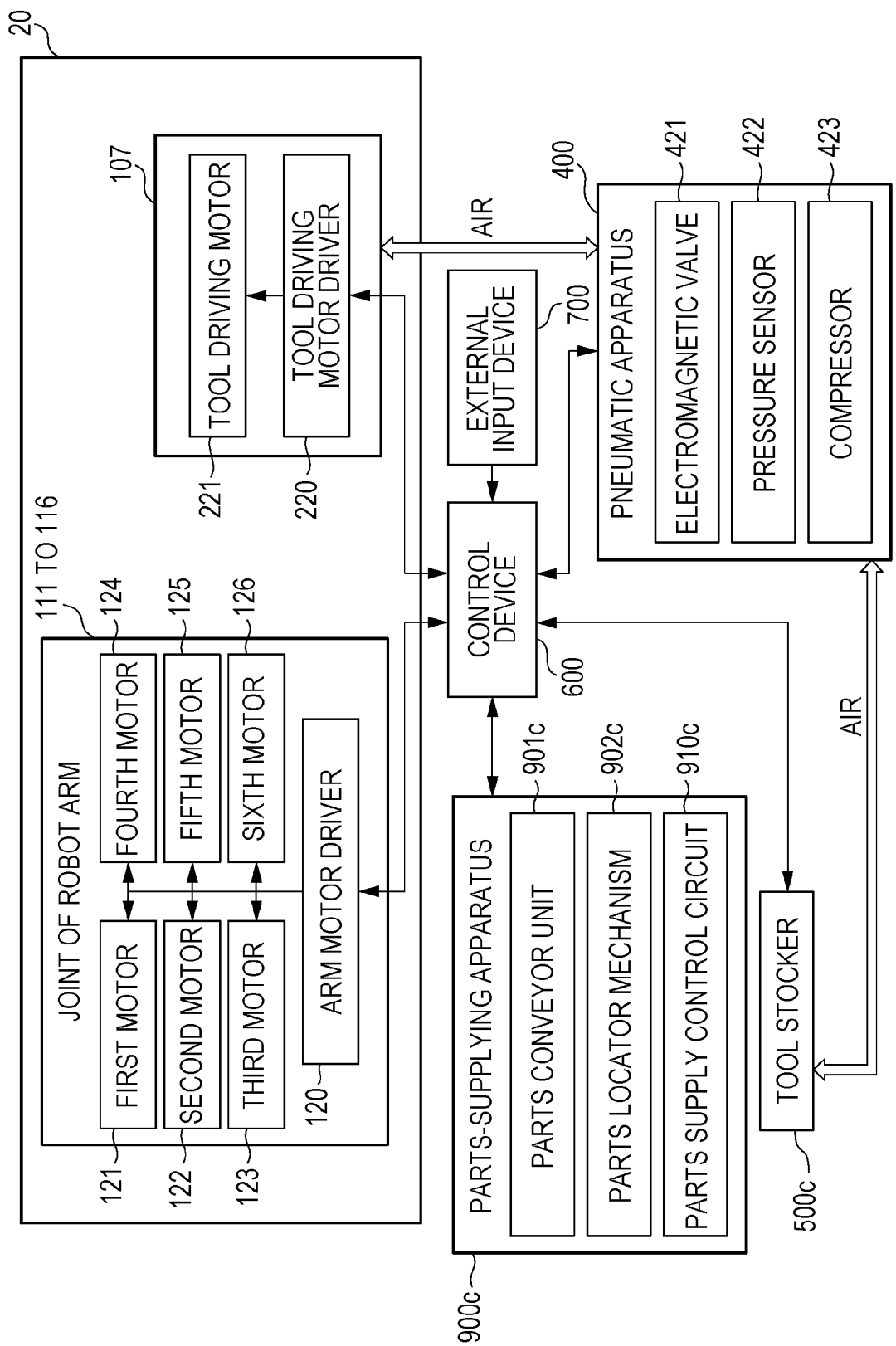
FIG. 15 is a block diagram illustrating control of the robot system according to the second embodiment.

FIG. 15 is a detailed block diagram illustrating a configuration of a control system of the robot system 10 in FIG. 1. The control device 600 according to the present embodiment not only controls the tool stocker 500 and the pneumatic apparatus, as in the first embodiment, but also controls the parts-supplying apparatus 900c.

The parts-supplying apparatus 900c includes a parts supply control circuit 910c, a parts conveyor unit 901c, and a parts locator mechanism 902c. In response to instruction values sent from the control device 600, the parts supply control circuit 910c drives and controls the parts conveyor unit 901c and the parts locator mechanism 902c. The parts supply control circuit 910c drives the parts locator mechanism 902c so as to set and place the workpiece Wc at any arbitrary position.

Figure 16:
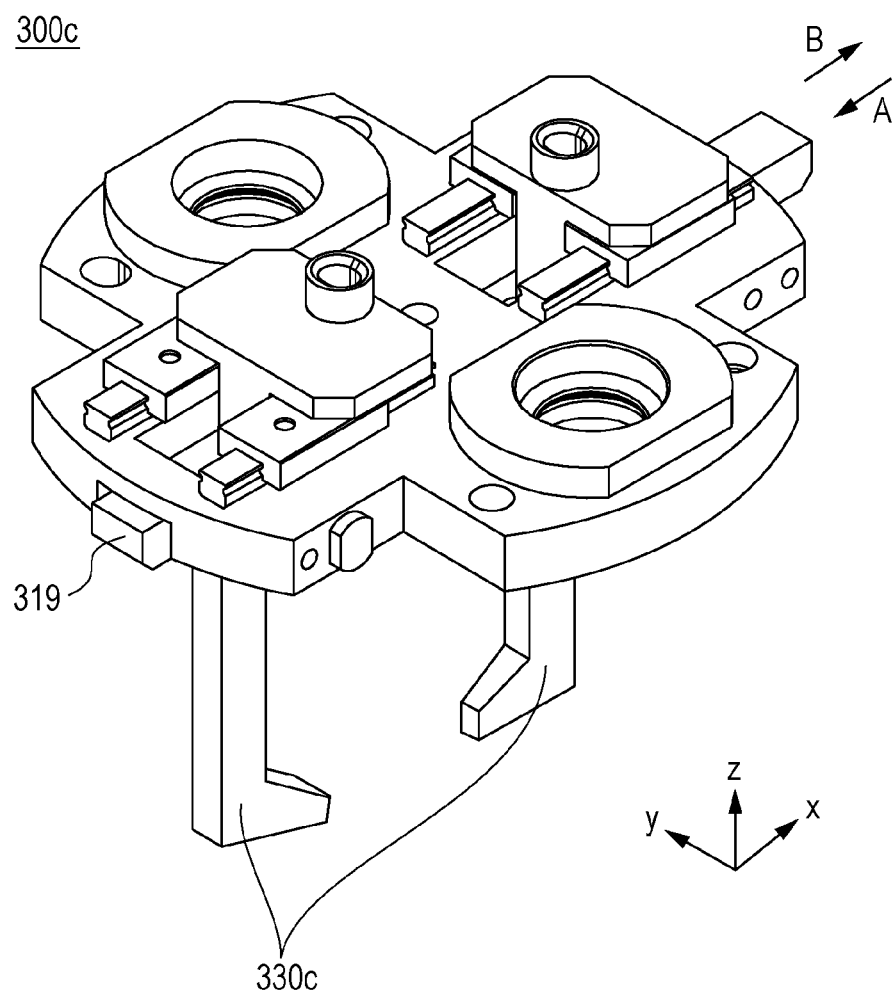
FIG. 16 is a detailed view illustrating an interchangeable tool according to the second embodiment.

FIG. 16 is a perspective view of the interchangeable tool 300c according to the present embodiment. As compared to the configuration in the first embodiment, the major difference resides in fingers 330c. The fingers 330 in the first embodiment are shaped like rectangular columns. The fingers 330c are also shaped like rectangular columns but have claw-shaped tips.

The attachment/detachment mechanism for the interchangeable tool 300a and the robot arm body 100, which has been described in the first embodiment with reference to FIGS. 3A to 3C, is also disposed in the interchangeable tool 300c. Accordingly, the interchangeable tool 300c can be attached to the robot arm body 100 readily.

Figure 17:
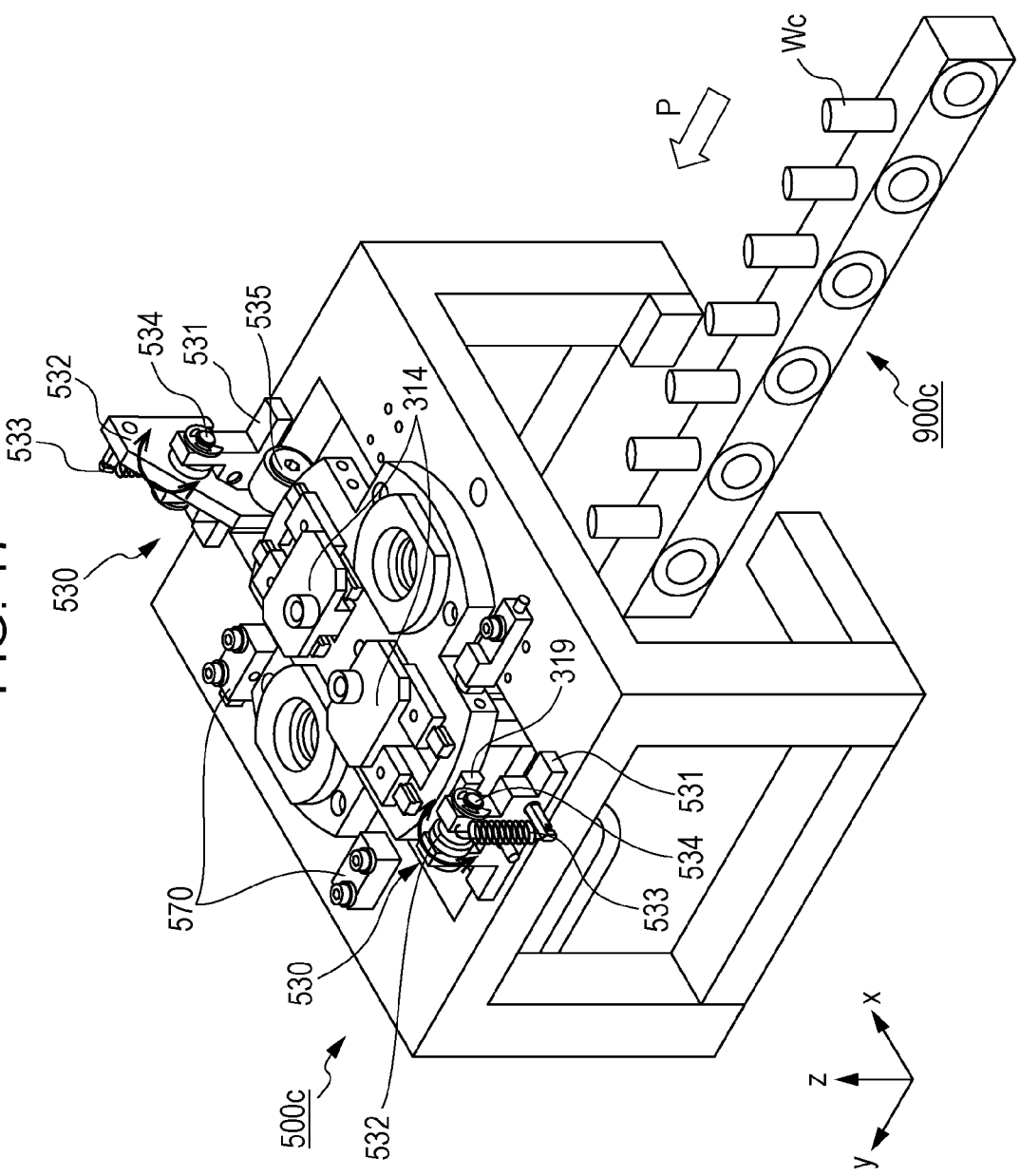
FIG. 17 is a view illustrating a state in which the interchangeable tool is held by the tool stocker in the second embodiment.

FIG. 17 is a perspective view illustrating the parts-supplying apparatus 900c and the tool stockers 500c according to the present embodiment. To simplify the description, the stocker-inclining member 561 that are used in the first embodiment and the position adjustment mechanism that includes the bolt 569 and the nut 568 are omitted. The stocker-inclining member 561 and the position adjustment mechanism may be provided to the parts-supplying apparatus 900c. Parts can be thereby supplied to the interchangeable tool 300c that is inclined and held by the tool stocker 500c as in the first embodiment.

As illustrated in FIG. 17, the workpiece Wc is a parallel pin shaped like a cylinder. The parts-supplying apparatus 900c is disposed directly under the tool stocker 500c. The parts-supplying apparatus 900c conveys workpieces Wc in a row in the direction of arrow P.

Figure 18:
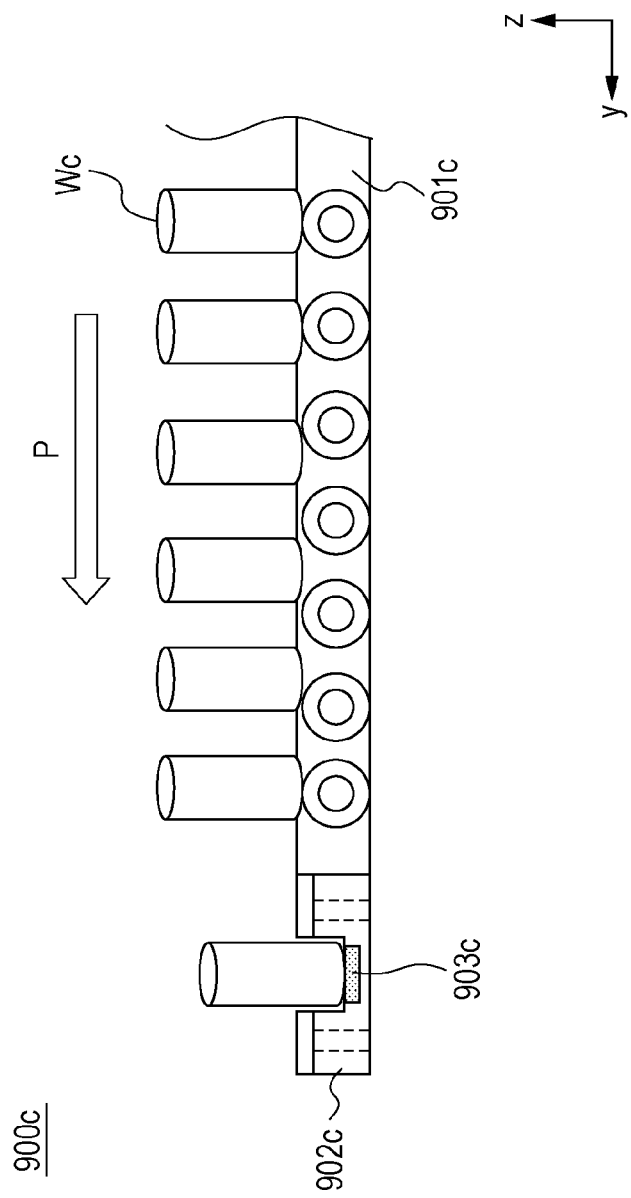
FIG. 18 is a view schematically illustrating a parts-supplying apparatus according to the second embodiment.

FIG. 18 is a view illustrating the parts-supplying apparatus 900c in detail. As illustrated in FIG. 18, the parts conveyor unit 901c of the parts-supplying apparatus 900c arranges workpieces Wc in a row and conveys the workpieces Wc in the direction of arrow P. In the present embodiment, a belt conveyor is used as the parts conveyor unit 901c.

Note that in the case in which the parts-supplying apparatus 900c is inclined, a slip prevention device, such as a pressure sensitive adhesive sheet, may be appropriately used in the parts conveyor unit 901c so as to prevent the workpieces Wc from falling off by their own weight.

As illustrated in FIG. 18, each of the workpieces Wc conveyed by the parts conveyor unit 901c is placed in the parts locator mechanism 902c. When a sensor 903c of the parts locator mechanism 902c detects a workpiece Wc, a signal is sent to the parts supply control circuit 910 to stop the parts conveyor unit 901c.

The sensor 903c, which detects presence or absence of a workpiece Wc in the parts locator mechanism 902c, is built in the parts locator mechanism 902c. The sensor 903c detects the weight of a workpiece Wc.

These points described above are major differences of the present embodiment compared with the first embodiment. In the present embodiment, when the tool stocker 500c holds the interchangeable tool 300c, the pressing mechanisms 530 press the protruding portions 319 and thereby position the fingers 330c to the appropriate positions and maintain the position. In other words, the interchangeable tool 300c grips a workpiece Wc and maintains the gripping state while the interchangeable tool 300c is held by the tool stocker 500c.

With this configuration, gripping of a workpiece and attachment/detachment of the interchangeable tool are performed simultaneously, which can reduce the number of steps that the robot arm body performs and thereby improve work efficiency.

Moreover, the workpiece Wc can be gripped without using the robot arm body 100. With this configuration, gripping accuracy can be improved since disturbance such as vibrations from the robot arm body 100 can be excluded. Note that the pressing mechanisms 530 are an example of the positioning mechanism. In addition, the protruding portions 319 are an example of the position regulating portion that regulates the respective positions of the contact portions.

Figure 19:
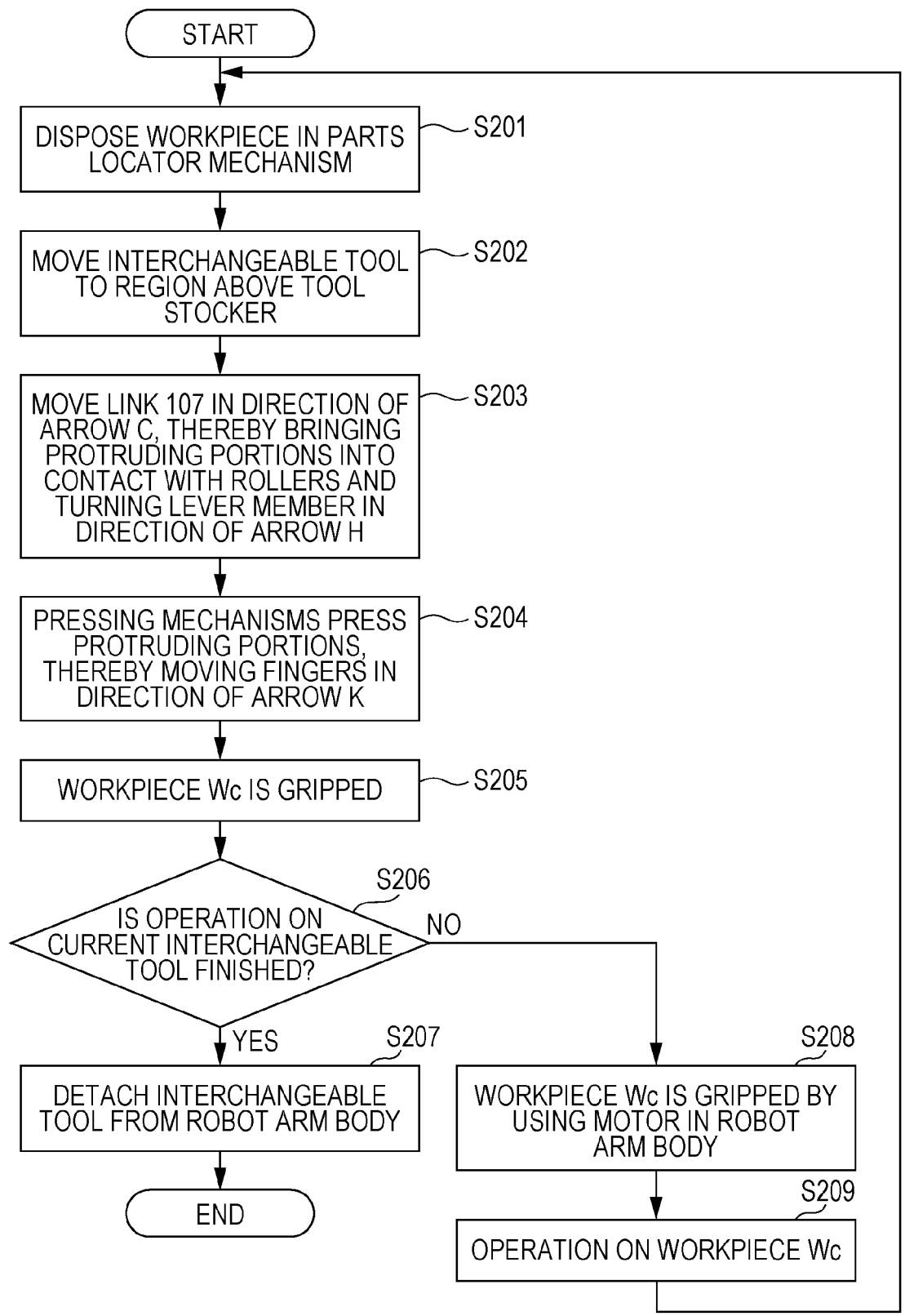
FIG. 19 is a control flowchart for the robot system according to the second embodiment.

FIG. 19 is a flowchart when the tool stocker 500c holds the interchangeable tool 300c according to the present embodiment while the interchangeable tool 300c grips a workpiece Wc. FIGS. 20A to 20F are views each of which illustrates a state corresponding to each step in FIG. 19. The processing flow of the flowchart illustrated in FIG. 19 is initiated when the control device 600 issues an instruction to operate with the interchangeable tool 300c.

As illustrated in FIG. 19, in step S201, a workpiece Wc is disposed in the parts locator mechanism 902c. Here, the workpiece Wc is set to a position at which the interchangeable tool 300c can grip the workpiece Wc in the state in which the interchangeable tool 300c is held by the tool stocker 500c (FIG. 20A).

As illustrated in FIG. 20A, when the interchangeable tool 300c is not held by the tool stocker 500c, each of the lever members 532 is turned around the lever turning axis 534 in the direction of arrow G due to the spring member 533 pulling the lever member 532 in the direction of arrow F, and the roller 535 is raised in the direction of arrow G simultaneously.

In step S202, the interchangeable tool 300c attached to the link 107 is moved to a region above the tool stocker 500c that corresponds to the interchangeable tool 300c (FIG. 20B).

In step S203, the link 107 is moved straight in the direction of arrow C, which thereby moves the fingers 330c closer to the tool stocker 500c. The protruding portions 319 are subsequently brought into contact with the respective rollers 535 at points P (FIG. 20C).

Further movement of the link 107 in the direction of arrow C causes the interchangeable tool 330c to press the lever members 532 at respective points P in the directions of arrow H. The lever members 532 turn around the respective lever turning axes 534 in the corresponding directions of arrow I.

In step S204, the pressing mechanisms 530 press the fingers 330c in the respective directions of arrow K, thereby causing the fingers 330c to grip the workpiece Wc and to maintain the gripping state (FIG. 20D). The spring members 533 and the lever members 532 are adjusted such that the pressure applied at this moment by the pressing mechanisms 530 becomes similar to the gripping pressure when the interchangeable tool 300c grips the workpiece Wc.

In step S206, whether the operation with the interchangeable tool 300c is finished or not is determined. If YES in step S206, the processing proceeds to step S207. If NO in step S206, the processing proceeds to step S208.

If YES in step S206, the operation with the interchangeable tool 300c is finished. Consequently, in step S207, the interchangeable tool 300c is released from the robot arm body 100 and held by the tool stocker 500c (FIG. 20E). At this moment, the interchangeable tool 300c is detached from the link 107 of the robot arm body 100 by using the attachment/detachment mechanism described in relation to FIGS. 3A to 3C in the first embodiment.

The interchangeable tool 300c is held by the tool stocker 500c with the interchangeable tool 300c gripping the workpiece Wc. When performing the next operation with the workpiece Wc, the workpiece Wc can be gripped simultaneously with the link 107 of the robot arm body 100 taking the interchangeable tool 300c.

If NO in step S206, the operation with the interchangeable tool 300c continues. Consequently, in step S208, the fingers 330c grips the workpiece Wc by driving the tool driving motor 221 in the link 107.

In step S209, the robot arm body 100 is moved in the direction of arrow D and takes out the workpiece Wc from the parts locator mechanism 902c for further operation on the workpiece Wc (FIG. 20F). The processing returns to step S201, and the next workpiece Wc is disposed in the parts locator mechanism 902c. The processing flow in FIG. 19 is repeated until the operation with the interchangeable tool 300c is finished.

As described above, according to the present embodiment, attachment of the interchangeable tool 300c and gripping of a workpiece Wc can be performed substantially simultaneously. This eliminates the necessity of the robot arm body 100 moving to a position at which a workpiece Wc is supplied and gripped after the interchangeable tool 300c is attached to the robot arm body 100. This reduces the time required for production and thereby improves work efficiency.

Moreover, the state of gripping the workpiece Wc by the fingers 330c can be achieved without using the tool driving motor 221 disposed in the robot arm body 100. When the workpiece Wc and the fingers 330c come into contact with each other, disturbance such as vibrations from the robot arm body 100 can be excluded, and thus gripping accuracy can be improved.

The present embodiment is effective for such a workpiece that frequency of gripping is low but high gripping accuracy is demanded. Workpieces that demand low frequency and high accuracy of gripping are disposed in such a manner as described with the workpiece Wc in the present embodiment, while workpieces that demand high frequency and low accuracy of gripping are disposed, for example, on a pallet.

Thus, the workpieces that demands high frequency and low accuracy of gripping are gripped and operated on by other interchangeable tools, while the workpieces that demands low frequency and high accuracy of gripping are gripped and operated on by using the method described in the present embodiment. As a result, the robot system can be controlled in accordance with the gripping frequency and gripping accuracy for a workpiece, and production efficiency can be thereby improved.

Third Embodiment

In the first embodiment and the second embodiment, as described above, the pressing mechanisms of the tool stocker cause the fingers to be positioned or cause the fingers to grip a workpiece. However, a motor for driving the interchangeable tool may be disposed in the interchangeable tool and the motor may drive the fingers. A detailed description will be given below.

In the following description, part of a hardware configuration and a control system configuration that are different from those in the first and second embodiments will be described with reference to the drawings. The elements similar to those in the first and second embodiments have similar configurations and operate similarly, and accordingly a detailed description on the elements will be omitted. In addition, members or control functions same as, or similar to, those in the first and second embodiments are denoted by the same reference symbols.

FIG. 21 is a view schematically illustrating a robot system 10 according to the present embodiment. The major difference between the present embodiment and the first and second embodiments reside in the attachment/detachment mechanism for the interchangeable tool 300 and the robot arm body 100, the structure of the interchangeable tool 300, and the structure of the tool stocker.

As illustrated in FIG. 21, an attachment/detachment mechanism 250 is disposed in the link 107 of the robot arm body according to the present embodiment, and the tool driving motor 221 is disposed in an interchangeable tool 300c'. In the following description, the interchangeable tool 300c used in the second embodiment is taken as an example of the interchangeable tool according to the present embodiment, which will be referred to as an "interchangeable tool 300c'" to avoid confusion.

The tool stocker 500c used in the second embodiment is also taken as an example of the tool stocker according to the present embodiment, which will be referred to as a "tool stocker 500c'".

Figure 22A:
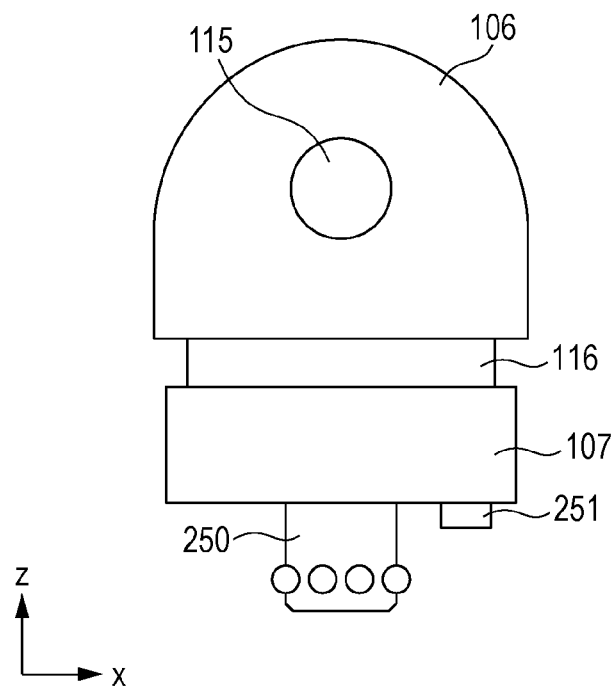
FIGS. 22A to 22B are views illustrating an attachment/detachment mechanism for the robot arm body and an interchangeable tool according to the third embodiment.
Figure 22B:
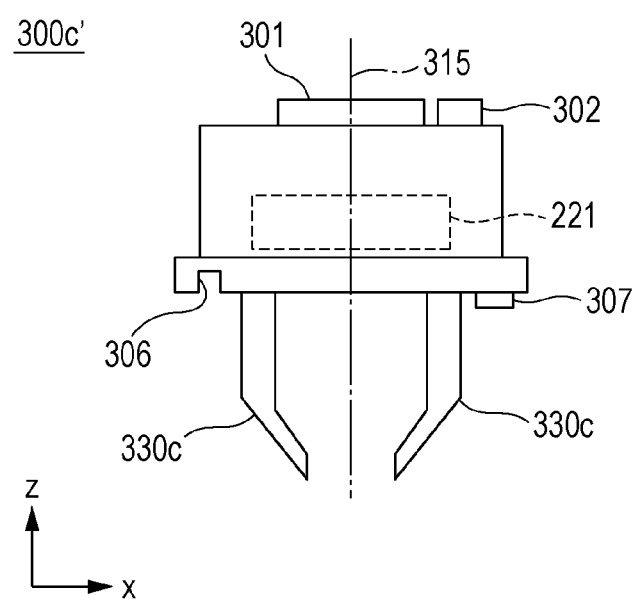

FIGS. 22A to 22B are diagrams illustrating the robot arm body 100 and the interchangeable tool 300c' according to the present embodiment. FIG. 22A illustrates a mounting portion of the robot arm body 100 to which an interchangeable tool is attached, and FIG. 22B illustrates the interchangeable tool 300c'.

As illustrated in FIG. 22A, the interchangeable tool 300c' is attached to the link 107 that is located at the end of the robot arm body 100. The link 107 has the attachment/detachment mechanism 250 that can attach/detach the interchangeable tool 300c' and also has an electrical connection portion 251 of the robot arm.

As illustrated in FIG. 22B, the interchangeable tool 300c' has a coupling mechanism 301 that can be coupled to the attachment/detachment mechanism 250 of the link 107 and also has an electrical connection portion 302 disposed on the surface of the interchangeable tool 300c' that comes into contact with the robot arm body 100.

Moreover, the interchangeable tool 300c' includes two fingers 330c that oppose each other with a central axis 315 interposed therebetween and the tool driving motor 221 that drives the fingers 330c.

In the present embodiment, the tool driving motor 221 is connected to the fingers 330c via a rack and pinion mechanism or reduction gears (not illustrated). By using such a mechanism, the tool driving motor 221 causes mutually opposing two fingers 330c to move closer to or away from each other with respect to the central axis 315. The fingers 330c can thereby grip or release a workpiece. The fingers 330c serve as contact portions that come into contact with a workpiece Wc.

Note that in place of the rack and pinion mechanism, any other power transmission mechanism, such as a cam mechanism, that transmits the power of the tool driving motor 221 to the fingers 330c may be used insofar as adopting such a mechanism does not depart from the scope of the invention.

The interchangeable tool 300c' has an electrical connection portion 307, which is another electrical connection portion disposed on the surface that comes into contact with the tool stocker 500c'. Details will be described later.

The interchangeable tool 300c' also has a positioning hole 306 for positioning of the interchangeable tool 300c' when mounted on the tool stocker 500c'.

Figure 23:
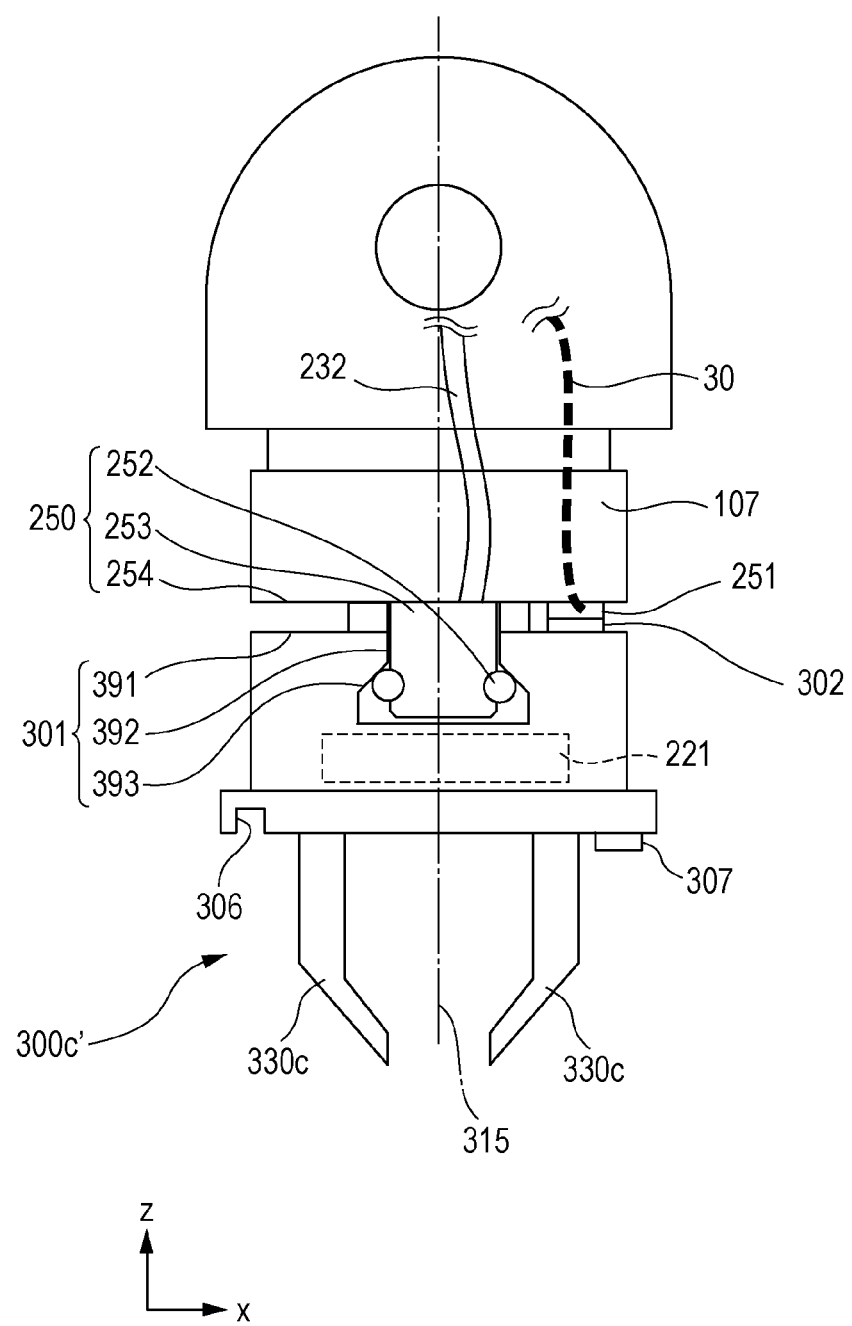
FIG. 23 is a view illustrating a state in which the interchangeable tool is attached to the robot arm body in the third embodiment.

FIG. 23 is a diagram illustrating the state in which the interchangeable tool 300c' is attached to the link 107 in the present embodiment.

As illustrated in FIG. 23, the attachment/detachment mechanism 250 of the link 107 has a seating face 254 of the robot arm, an engagement shaft 253, and a plurality of balls 252 disposed in the circumferential surface of the engagement shaft 253.

The coupling mechanism 301 of the interchangeable tool 300c' has a seating face 391 of the interchangeable tool, an engagement hole 392, and a tapered surface 393.

The engagement shaft 253 is connected to a pipe 232 that is disposed through the inside of the robot arm body 100 and connected to the pneumatic apparatus 400. The compressed air supplied or discharged by pneumatic apparatus 400 through the pipe 232 causes the balls 252 disposed in the engagement shaft 253 to move in the radial direction of the engagement shaft 253 toward the inner peripheral surface of the engagement hole 392.

When the balls 252 move outward in the radial direction while the engagement shaft 253 engages the engagement hole 392, the balls 252 abut the tapered surface 393 of the interchangeable tool 300c'.

The balls 252 press the tapered surface 393 and causes the seating face 391 of the interchangeable tool to press the seating face 254 of the robot arm. The interchangeable tool 300c' and the link 107 are thereby coupled to each other mechanically.

Note that the pneumatic apparatus is the same as that used in the first and second embodiments.

When the interchangeable tool 300c' and the link 107 are mechanically coupled to each other, the electrical connection portion 302 of the interchangeable tool is connected to the electrical connection portion 251 of the robot arm. The electrical connection portion 251 of the robot arm is connected to electric wiring 30 that is disposed through the inside of the links 101 to 107 and is connected to the control device 600.

The tool driving motor 221 receives electric power from the control device 600 through the wiring 30 once the connection is established between the electrical connection portion 302 of the interchangeable tool and the electrical connection portion 251 of the robot arm. Signals also can be transmitted and received via the wiring 30.

The control device 600 thereby controls the open and close positions of the fingers 330c, causes the fingers 330c to grip a target object, and performs any suitable operation on the target object that is gripped by the robot arm body 100.

Figure 24A:
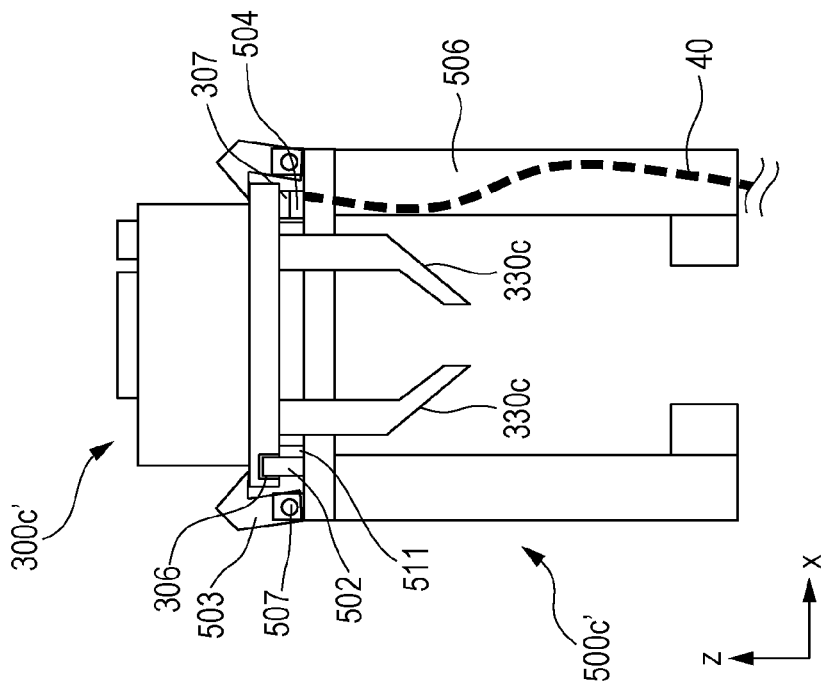
FIGS. 24A to 24B are views illustrating a state in which the interchangeable tool is held by the tool stocker in the third embodiment.
Figure 24B:
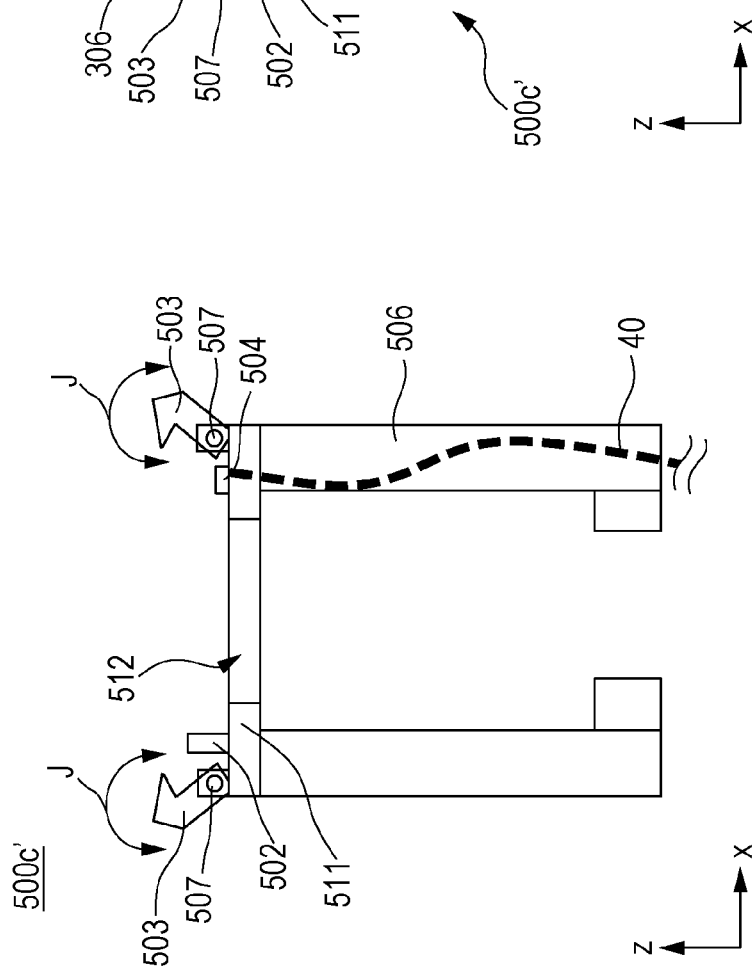

FIGS. 24A to 24B are diagrams illustrating the tool stocker 500c' according to the present embodiment. To simplify the description, as in the second embodiment, the stocker-inclining member and other members are omitted in the FIGS. 24A to 24B in the present embodiment. FIG. 24A is a diagram illustrating the tool stocker 500c' according to the present embodiment, and FIG. 24B is a diagram illustrating a state in which the tool stocker 500c' holds the interchangeable tool 300c'.

As illustrated in FIG. 24A, the tool stocker 500c' includes a contact surface 511, a positioning pin 502, tool holding devices 503, and an electrical connection portion 504 of the tool stocker. Respective tool holding device motors 507 move the tool holding devices 503 in the directions of arrow J.

The opening 512, which is similar to that in the first embodiment, is provided in the contact surface 511, and the interchangeable tool 300c' is held by the tool stocker 500c' with the fingers 330c inserted in the opening 512.

The contact surface 511 is supported by leg portions 506. Electric wiring 40 is disposed inside a leg portion 506. The electric wiring 40 connects the electrical connection portion 504 of the tool stocker to the control device 600.

FIG. 24B is a diagram illustrating the state in which the tool stocker 500c' holds the interchangeable tool 300c'.

As illustrated in FIG. 24B, the positioning pin 502 engages the positioning hole 306. In this state, the tool holding device motors 507 move the respective tool holding devices 503, which can position and mount the interchangeable tool 300c' onto the contact surface 511.

When the tool stocker 500c' holds the interchangeable tool 300c', the electrical connection portion 504 of the tool stocker is connected to the electrical connection portion 307. The interchangeable tool 300c' is thereby connected to the control device 600 via the wiring 40 that passes through the inside of the tool stocker 500c', and the interchangeable tool 300c' can receive electric power from the control device 600 and can transmit and receive signals to and from the control device 600.

Figure 25:
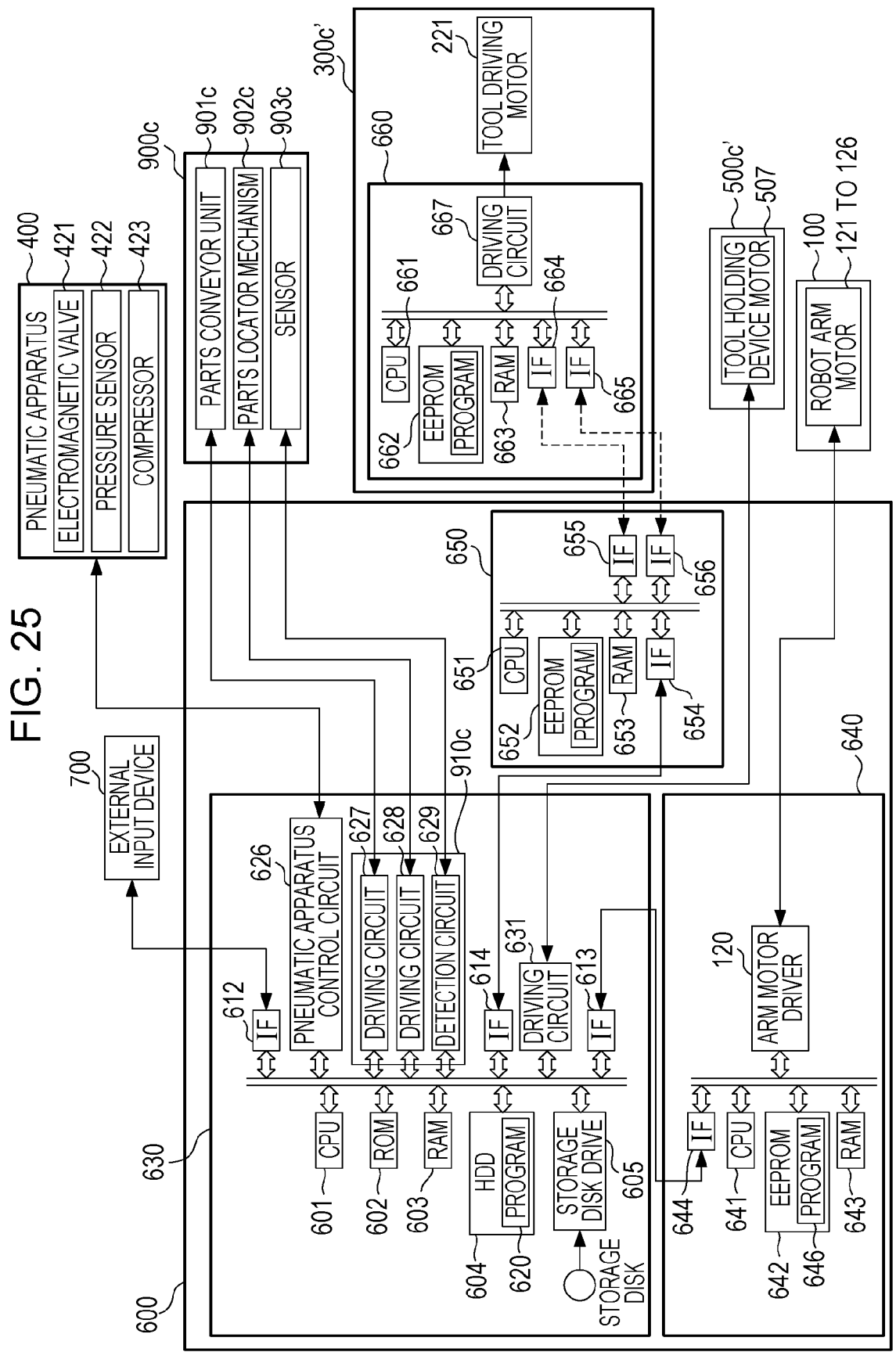
FIG. 25 is a block diagram illustrating control of the robot system according to the third embodiment.

FIG. 25 is a block diagram illustrating control of the robot system 10 according to the present embodiment. The control device 600 includes a system control unit 630, a robot arm control unit 640, and a connection path control unit 650.

The interchangeable tool 300c' has an interchangeable tool control unit 660 and the tool driving motor 221. The tool stocker 500c' has a tool holding device motor 507. The robot arm body 100 has motors 121 to 126 that drive the respective joints 111 to 116.

The parts-supplying apparatus 900c has the parts conveyor unit 901c, the parts locator mechanism 902c, and the sensor 903c. The parts-supplying apparatus 900c is the same as that used in the second embodiment.

In FIG. 25, only a single interchangeable tool control unit 660 is illustrated by way of example. However, a plurality of interchangeable tool control units 660 having the same configuration is to be provided for a plurality of interchangeable tools.

The system control unit 630 is formed of a computer and has the CPU 601 that serves as an arithmetic processing unit. The system control unit 630 also has, as a storage unit, the ROM 602, the RAM 603, and a hard disk drive (HDD) 604. Moreover, the system control unit 630 has a storage disk drive 605 and interfaces 612 to 614 of various types.

The CPU 601 is connected, via a data bus, to the ROM 602, the RAM 603, the HDD 604, the storage disk drive 605, and the interfaces 612 to 614. The ROM 602 contains system programs, such as a basic input output system (BIOS). The RAM 603 is a storage device that temporarily stores various data, such as results of arithmetic processing of the CPU 601.

The HDD 604 is also a storage device that stores various data such as data obtained externally and results of arithmetic processing of the CPU 601. The HDD 604 also stores a program 620 to cause the CPU 601 to perform an arithmetic processing, which will be described later. The CPU 601 performs steps of a robot control method in accordance with the program 620 recorded (stored) in the HDD 604.

The storage disk drive 605 can read out programs and various data that are recorded in a storage disk. Note that an external storage device (not illustrated), such as a rewritable nonvolatile memory and an external HDD, may be connected to the system control unit 630.

The external input device 700, which serves as an instruction unit, is connected to the interface 612. In accordance with a user's input, the external input device 700 designates teaching points to be taught to the robot arm body 100. In other words, the external input device 700 designates the target joint angles of the joints J1 to J6 (i.e., the target rotation angles of motors 121 to 126 of the respective joints 111 to 116). The teaching point data are output to the HDD 604 via an interface 612 and a data bus.

The HDD 604 can store the teaching point data designated by the external input device 700. The CPU 601 can read the teaching point data recorded (stored) in the HDD 604.

The system control unit 630 controls the pneumatic apparatus 400 that supplies compressed air to the attachment/detachment mechanism 250. Pneumatic actuators that are disposed at several positions in the robot system 10 are connected to the compressed air source via respective electromagnetic valves 421.

A pneumatic apparatus control circuit 626 controls electromagnetic valves 421, pressure sensors 422, and a compressor 423 in response to an instruction from the CPU 601, and thereby switches between a supply state and a discharge state of the compressed air that is supplied to the pneumatic actuators. The pneumatic actuators are the ball plangers that actuate balls 252 of the attachment/detachment mechanism 250.

The system control unit 630 also controls the parts-supplying apparatus 900c. The parts conveyor unit 901c is connected to a driving circuit 627. The driving circuit 627 supplies electric current to the parts conveyor unit 901c in response to an instruction from the CPU 601. The parts conveyor unit 901c is driven so as to convey workpieces Wc.

The parts locator mechanism 902c is connected to a driving circuit 628. The driving circuit 628 supplies electric current to the parts locator mechanism 902c in response to an instruction from the CPU 601.

A detection circuit 629 receives a signal relating to presence/absence of a part from the sensor 903c disposed in the parts locator mechanism 902c and outputs the signal to the CPU 601.

These driving circuit 627 to 629 are referred to as the "parts supply control circuit 910c". Note that the parts supply control circuit 910c is disposed in the parts-supplying apparatus 900c in the second embodiment, but the parts supply control circuit 910c may be disposed in the control device 600 as in the present embodiment.

A driving circuit 631 supplies electric current to the tool holding device motors 507 in response to an instruction from the CPU 601. The driving circuit 631 drives the tool holding devices 503 by driving the tool holding device motors 507.

The robot arm control unit 640 includes a CPU 641, an electrically erasable programmable read only memory (EEPROM) 642 and a RAM 643 both of which serve as a storage unit, an interface 644, and an arm motor driver 120. These elements are connected to each other via a data bus.

The CPU 641 performs arithmetic processing in accordance with a program 646. The EEPROM 642 is a storage device that stores the program 646. The RAM 643 is also a storage device that temporarily stores various data, such as results of the arithmetic processing of the CPU 641.

The interface 644 and an interface 613 are connected to each other via, for example, a cable, through which signals can be transmitted/received between the system control unit 630 and the robot arm control unit 640.

Note that the robot arm control unit 640 is disposed inside a housing of the control device 600. However, the location of the robot arm control unit 640 is not limited to the inside of the housing but may be disposed, for example, inside the robot arm body 100.

The CPU 601 calculates the moving path of the robot arm body 100 on the basis of the teaching point data and the robot program. The CPU 601 outputs, to the robot arm control unit 640 at predetermined time intervals, a signal of angle instruction values that represent respective rotation angles of the motors 121 to 126 that drive the corresponding joints 111 to 116. The CPU 601 thereby controls the robot arm body 100 so that the CPU 601 can move the link 107 disposed at the end of the robot arm body 100 to a desired location and a desired orientation.

The connection path control unit 650 includes a CPU 651, an EEPROM 652 and a RAM 653 both of which serve as a storage unit, and an interface 654 that is connected to the system control unit 630. The connection path control unit 650 also includes multiple interfaces 655 and 656 that are connected to an interchangeable tool control unit 660. These elements are connected to each other via a data bus.

The interface 654 is connected to an interface 614 by, for example, a cable, through which signals can be transmitted/received between the system control unit 630 and the connection path control unit 650. The connection path control unit 650 is disposed inside the housing of the control device 600. Note that the location of the connection path control unit 650 is not limited to the inside of the housing.

The interchangeable tool control unit 660 is connected to the system control unit 630 via the connection path control unit 650. The interchangeable tool control unit 660 is disposed in the interchangeable tool 300c'.

The interchangeable tool control unit 660 includes a CPU 661, an EEPROM 662 and a RAM 663 both of which serve as a storage unit, and interfaces 664 and 665, and a driving circuit 667, and these elements are connected to each other via a data bus.

The CPU 661 performs arithmetic processing in accordance with a program. The EEPROM 662 is a storage device that stores the program. The RAM 663 is also a storage device that temporarily stores various data such as results of the arithmetic processing of the CPU 661.

The driving circuit 667 supplies electric current to the tool driving motor 221 that drives the fingers 330c in accordance with an electric current instruction that the driving circuit 667 receives. The tool driving motor 221 drives the fingers 330c by receiving electric power from the driving circuit 667.

An interface 664 is connected to an interface 655 when the electrical connection portion 302 disposed in the interchangeable tool 300c' is connected to the electrical connection portion 251 disposed in the robot arm body 100.

The CPU 601 can send an instruction to the interchangeable tool control unit 660 via the connection path control unit 650 through the wiring 30 disposed inside the robot arm body 100. The CPU 601 can thereby control the interchangeable tool 300c'.

An interface 665 is connected to an interface 656 when the electrical connection portion 307 disposed in the interchangeable tool 300c' is connected to the electrical connection portion 504 disposed in the tool stocker 500c'.

The CPU 601 sends an instruction to the interchangeable tool control unit 660 via the connection path control unit 650 through the wiring 40 disposed in the tool stocker 500c'. The CPU 601 can thereby control the fingers 330c of the interchangeable tool 300c'.

In the present embodiment, the program 620 is stored in the HDD 604. The HDD 604 is an example of a computer-readable storage medium. However, the computer-readable storage medium is not limited to the HDD 604.

The program 620 may be stored in any suitable storage medium insofar as the storage medium is computer-readable. For example, a storage disk illustrated in FIG. 25 or an external storage device (not illustrated) may be used as a storage medium that supplies the program 620.

More specifically, the storage medium that can be used includes, but not limited to, a flexible disk, a hard disk, an optical disk, a magneto-optical disk, a CD-ROM, a CD-R, a magnetic tape, a nonvolatile memory, or a ROM.

Figure 26:
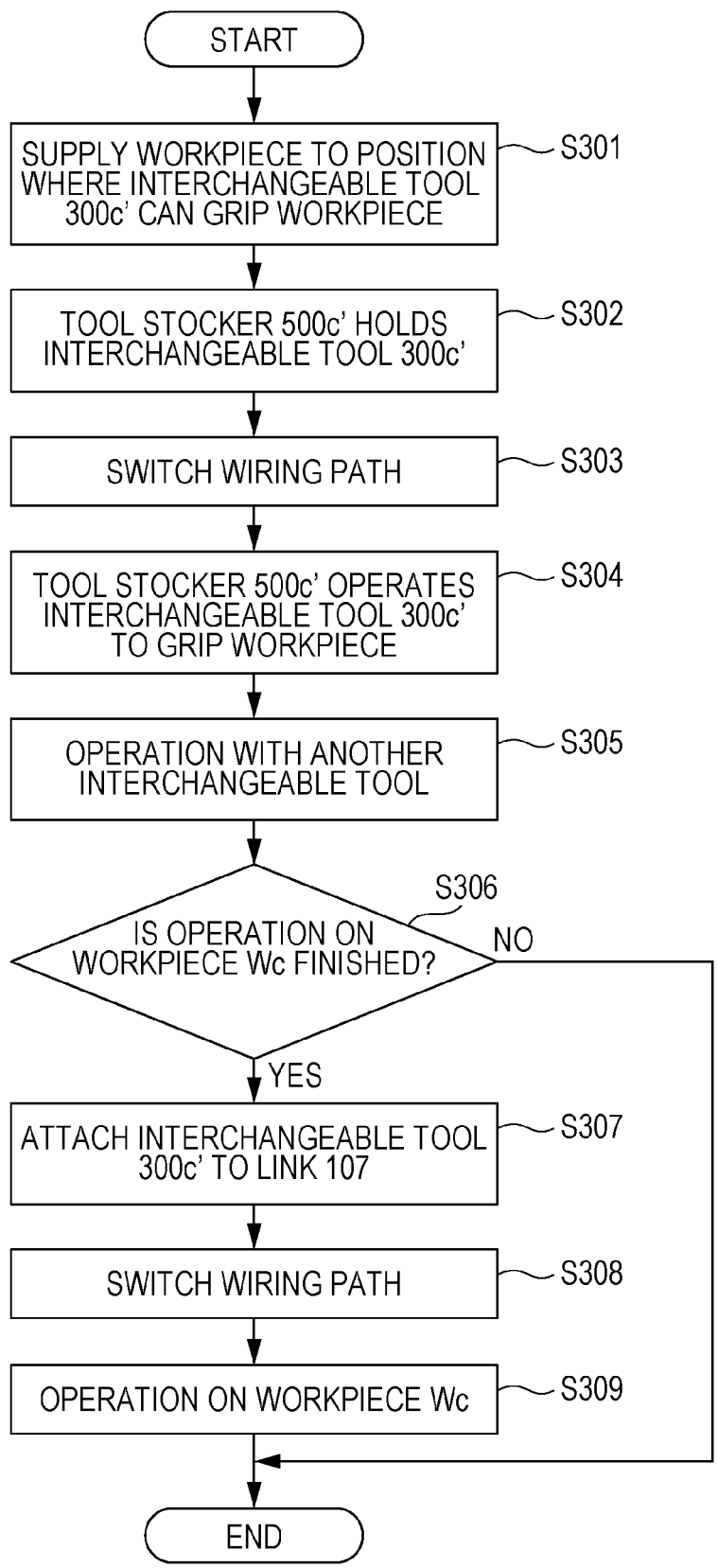
FIG. 26 is a control flowchart of the robot system according to the third embodiment.

Next, a control method of the robot system 10 will be described. FIG. 26 is a flowchart illustrating a processing flow of part of a control method of the robot system 10 according to the present embodiment. FIGS. 27A to 27F are views each of which illustrates a state corresponding to each step in FIG. 26.

A flow of processing that the control device 600, especially the CPU 601 of the control device 600, performs in the robot system 10 will be described below.

First of all, in step S301, the parts-supplying apparatus 900c is actuated and a workpiece Wc is disposed at a position at which the interchangeable tool 300c' can grip the workpiece Wc (FIG. 27A).

In step S302, the tool stocker 500c' holds the interchangeable tool 300c' that is attached to the link 107 (FIG. 27B). More specifically, the robot arm body 100 is controlled to move the interchangeable tool 300c' to a position at which the tool stocker 500c' can hold the interchangeable tool 300c'.

Here, the CPU 601 moves the fingers 330c away from each other by actuating the fingers 330c of the interchangeable tool 300c' before the interchangeable tool 300c' is moved to the position at which the tool stocker 500c' can hold the interchangeable tool 300c'.

After the robot arm body 100 moves the interchangeable tool 300c' to a position at which the tool stocker 500c' can hold the interchangeable tool 300c', a compressed air that has been supplied to the attachment/detachment mechanism 250 is discharged so as to detach the interchangeable tool 300c' from the attachment/detachment mechanism 250.

Subsequently, the tool stocker 500c' holds the interchangeable tool 300c' by actuating the tool holding devices 503 of the tool stocker 500c' (FIG. 27C). In the state in FIG. 27C, the electrical connection portion 307 of the interchangeable tool and the electrical connection portion 504 of the tool stocker are connected to each other.

In step S303, the CPU 601 instructs the connection path control unit 650 to switch the connection path for signals and electric power between the system control unit 630 and the interchangeable tool control unit 660 to a wiring path routing via the interface 656 and the interface 665.

In other words, the interchangeable tool 300c' held by the tool stocker 500c' receives electric power supplied from the system control unit 530 and exchanges signals with the system control unit 530 through the wiring 40 that is disposed inside the tool stocker 500c'. This enables the tool stocker 500c' to actuate the fingers 330c.

In step S304, the workpiece Wc is gripped by moving the fingers 330c of the interchangeable tool 300c' closer to each other (FIG. 27D).

After the workpiece Wc is gripped in the tool stocker 500c', the CPU 601 instructs the driving circuit 667 to maintain the gripped state, and the driving circuit 667 thereby maintains the gripped state by controlling the electric current output to the tool driving motor 221.

In step S305, another interchangeable tool is attached to the robot arm body 100 and the robot arm body 100 performs another operation.

When the operation in step S305 is finished, the CPU 601 advances the processing to step S306 and determines whether the next operation requires the workpiece Wc or not. If NO in step S306, the operation is finished. If YES in step S306, the processing proceeds to step S307.

In step S307, the interchangeable tool 300c' while gripping the workpiece Wc is attached to the link 107. When attaching the interchangeable tool 300c' to the link 107, a compressed air is supplied to the attachment/detachment mechanism 250 so as to couple the interchangeable tool 300c' to the attachment/detachment mechanism 250 (FIG. 27E). In the state in FIG. 27E, the electrical connection portion 302 of the interchangeable tool is connected to the electrical connection portion 251 of the robot arm.

In step S308, the CPU 601 instructs the connection path control unit 650 to switch the connection path for signals and electric power between the system control unit 630 and the interchangeable tool control unit 660 to a wiring path routing via the interface 655 and the interface 664.

In other words, the interchangeable tool 300c' coupled to the attachment/detachment mechanism 250 receives electric power supplied from, and exchanges signals with, the system control unit 630 through the wiring 30 that is disposed inside the robot arm body 100.

In step S309, the CPU 601 controls the robot arm body 100 and the interchangeable tool 300c' so as to convey the workpiece Wc to another location (FIG. 27F), where an operation is performed on the workpiece Wc that is gripped by the interchangeable tool 300c'.

As described above, in the robot system 10 according to the present embodiment, the tool stocker 500c' enables an interchangeable tool 300c' to grip a workpiece Wc independent of operation performed by using another interchangeable tool that is attached to the robot arm body 100.

Accordingly, the robot arm body 100 can take the interchangeable tool 300c' that has already gripped the workpiece Wc. This can save the time required for moving from a position at which the robot arm body 100 takes an interchangeable tool to a position at which the interchangeable tool grips a workpiece Wc. This can also save the time required for gripping the workpiece Wc.

As a result, the time required for a series of actions from changing the interchangeable tools to gripping a workpiece and operating on the workpiece can be substantially reduced.

Note that the interchangeable tool 300c' and the tool stocker 500c' in the third embodiment described above are examples. The number of the interchangeable tools 300c' and the tool stockers 500c' can be increased in accordance with the shape or orientation of a workpiece to operate on.

Also note that in the present embodiment, the tool driving motor 221 is actuated by using the electrical connection portions 307 and 504 while the interchangeable tool 300c' is held by the tool stocker 500c'. However, the tool driving motor 221 may be actuated, for example, by disposing a battery for driving the tool driving motor 221 in the interchangeable tool 300c' and by using wireless communication for connecting the control device 600 and the interchangeable tool control unit 660 to each other.

With this configuration, an instruction from the control device 600 can be output in the interchangeable tool control unit 660 via wireless communication, and the tool driving motor 221 can be actuated by using the battery while the interchangeable tool 300c' is held by the tool stocker 500c'.

Modification Example 1

Next, modification examples pertaining to the present embodiment will be described. As described above, the fingers 330 to grip a workpiece Wc are disposed in the interchangeable tool 300c'. However, in the present modification example, the interchangeable tool has a tool other than the fingers. A detailed description will be given below.

Figure 28A:
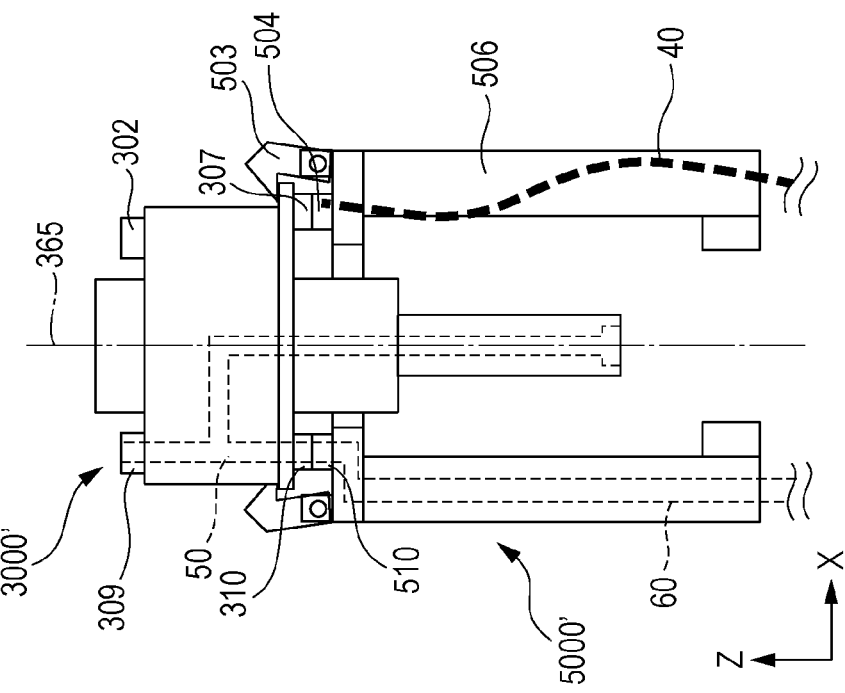
FIGS. 28A to 28B are views illustrating a state in which an interchangeable tool is held by a tool stocker according to modification example 1 of the third embodiment.
Figure 28B:
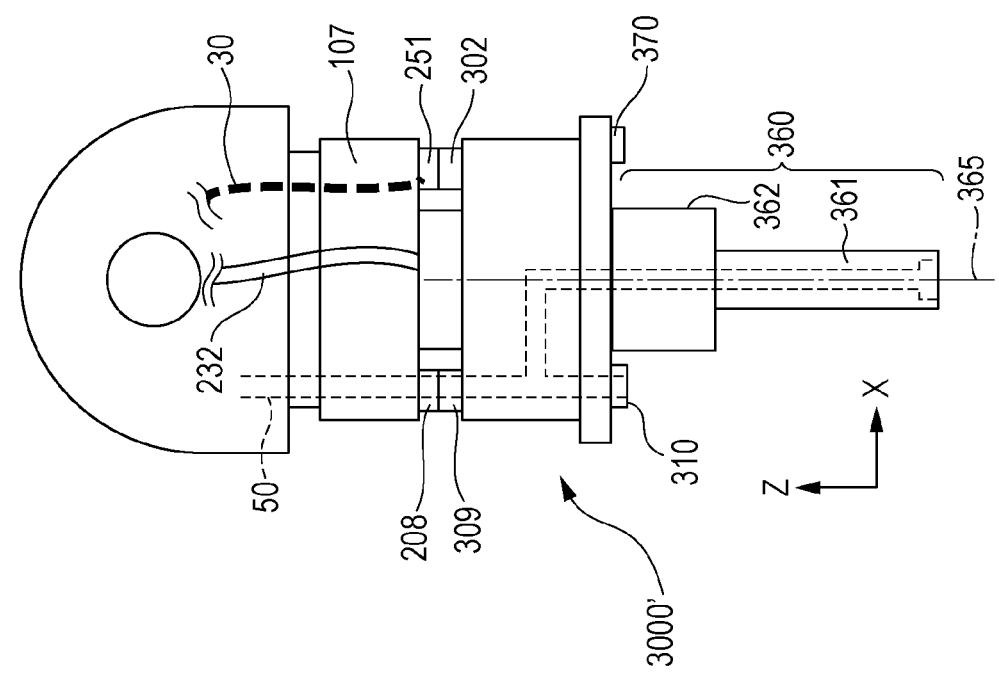

FIGS. 28A to 28B are views schematically illustrating an interchangeable tool 3000' according to the present modification example. FIG. 28A is a view illustrating the interchangeable tool 3000' attached to the link 107, and FIG. 28B is a view illustrating the interchangeable tool 3000' held by a tool stocker 5000'. In FIGS. 28A to 28B, the major difference compared to the configuration in the above embodiments is that a screw tightening tool 360 is provided in place of the fingers 330c.

As illustrated in FIG. 28A, the screw tightening tool 360, which is a tool for tightening a small screw, is constituted by a bit 361 that is shaped like a cylinder and adsorbs and retains a screw and a motor 362 that rotates the bit 361 around a central axis 365.

In addition, a pipe 50 is disposed in the interchangeable tool 3000' to allow air used to adsorb a screw to pass through. A fluid connection portion 208 is disposed on the mounting surface of the link 107 of the robot arm body 100. In addition, fluid connection portions 309 and 310 are disposed in the interchangeable tool 3000'.

The fluid connection portion 208 is connected to an external vacuum generator or the like, and the interchangeable tool 3000' can adsorb and retain a screw by producing a vacuum inside the cylinder of the bit 361.

When the interchangeable tool 3000' according to the present modification example is mechanically attached to the link 107, the electrical connection portion 302 of the interchangeable tool is connected to the electrical connection portion 251 of the robot arm, as is the case for the above embodiment.

Moreover, the link 107 according to the present modification example has a fluid connection portion 208 of the robot arm. When the interchangeable tool 3000' and the link 107 are mechanically coupled to each other, the fluid connection portion 309 of the interchangeable tool is connected to the fluid connection portion 208 of the robot arm. The interchangeable tool 3000' is thereby in air communication with the robot arm body 100.

A compressed air source can supply and discharge compressed air to and from the interchangeable tool 3000' through the pipe 50 that is disposed inside the robot arm body 100. Note that when the interchangeable tool 3000' is not attached to the link 107, the fluid connection portion 309 is isolated from the external environment.

FIG. 28B is a view illustrating the state in which the interchangeable tool 3000' according to the present modification example is held by the tool stocker 5000'.

The interchangeable tool 3000', which can be held by the tool stocker 5000', has the electrical connection portion 307 and a fluid connection portion 310.

The tool stocker 5000' according to the present modification example has the tool holding devices 503 that can fix the interchangeable tool 3000' as in the above embodiments.

When the interchangeable tool 3000' is fixed to the tool stocker 5000', the electrical connection portion 307 is connected to the electrical connection portion 504 of the tool stocker.

The interchangeable tool 3000' is thereby connected to the control device 600 via the wiring 40 that passes through the inside of the tool stocker 5000', and the interchangeable tool 3000' can receive electric power from the control device 600 and can transmit and receive signals to and from the control device 600 via the wiring 40. The interchangeable tool 3000' can drive the motor 362 while the interchangeable tool 3000' is held by the tool stocker 5000'.

A fluid connection portion 510 is disposed in the tool stocker 5000' and is connected to a pipe 60 disposed inside a leg 506.

The interchangeable tool 3000' is fixed to the tool stocker 5000', and thereby the fluid connection portion 310 of the interchangeable tool 3000' is connected to the fluid connection portion 510 of the tool stocker 5000'.

In the state in which the interchangeable tool 3000' is fixed to the tool stocker 5000', the compressed air source still can supply and discharge compressed air to and from the interchangeable tool 3000' through the pipe 60 that is disposed inside the tool stocker 5000'.

However, when the interchangeable tool 3000' is not fixed to the tool stocker 5000', the fluid connection portion 310 is isolated from the external environment.

With this configuration, the interchangeable tool 3000' can be connected to the electromagnetic valve 421 via the fluid connection portions 208, 309, 310, and 510. For example, a selector valve or the like can be used for multiple fluid connection portions described above.

A pneumatic apparatus control circuit 626 controls the electromagnetic valve 421 in response to an instruction from the CPU 601, and thereby switches between a supply state and a discharge state of the compressed air that is supplied to the screw tightening tool 360. The CPU 601 can thereby control the screw tightening tool 360 adsorbing and retaining a screw.

In other words, air can be supplied to the interchangeable tool 3000' from the robot arm body 100 or from the tool stocker 5000', and these two supply modes can be selected suitably.

Thus, the present embodiment can be applied to such an interchangeable tool as the screw tightening tool 360 that holds a component by using an actuator actuated by a fluid, such as compressed air, as a drive source.

This can reduce the time required for moving the robot arm to a parts supply position and the time required for gripping a part. As a result, the time required for assembling operation of an assembling apparatus can be substantially reduced.

Suction for adsorbing a screw is performed via the fluid connection portions and the pipe 50 or 60 that is disposed in the robot arm body 100 or in the tool stocker 5000'. This eliminates the necessity of piping that is disposed directly from the interchangeable tool 3000' to a compressed air source as is the case for a known tool for screw tightening.

When using the interchangeable tool 3000' that is attached to the robot arm body 100, the piping for screw adsorption can be disposed inside the robot arm body 100. This eliminates a problem associated with dragging the piping around and thereby increases the degree of freedom in positioning interchangeable tools in the robot system 10.

Modification Example 2

Figure 29:
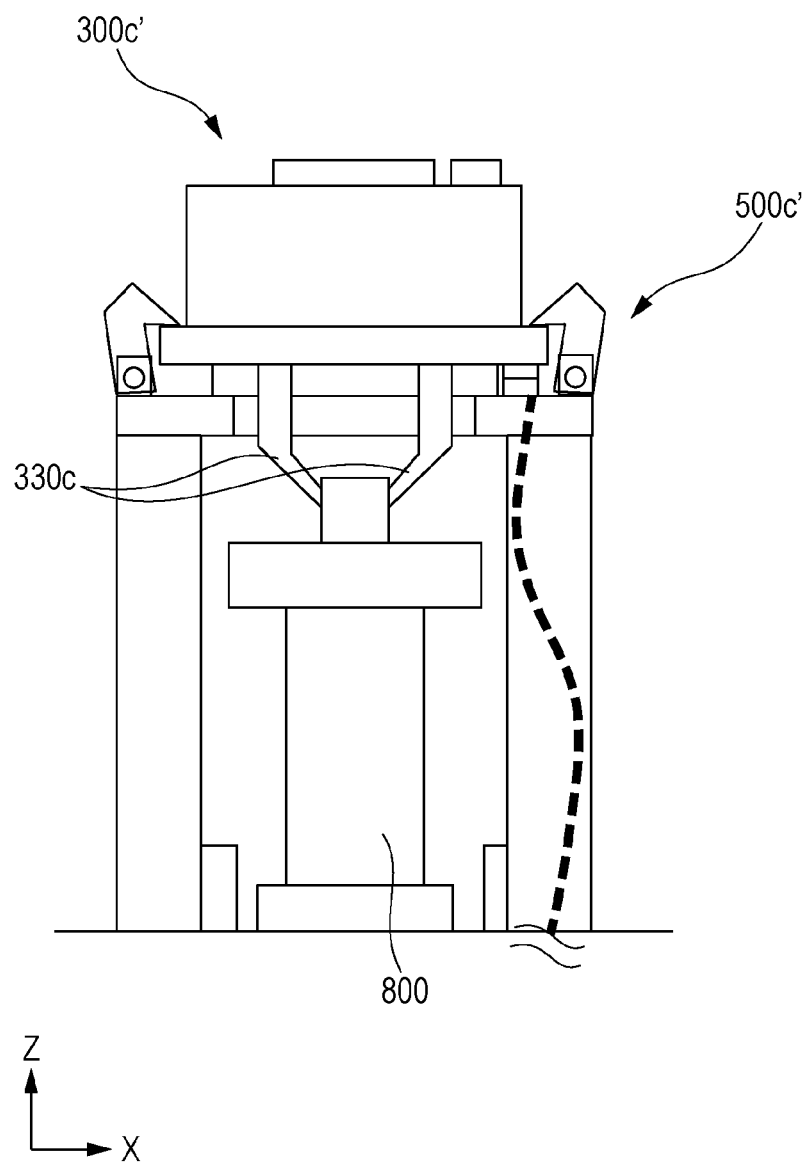
FIG. 29 is a view illustrating a state in which an interchangeable tool is held by the tool stocker in modification example 2 of the third embodiment.

In the above examples, the fingers 330c of the interchangeable tool 300c' grip a workpiece. However, instead of the fingers 330c gripping a workpiece, the fingers 330c may be adjusted for the gripping position while the interchangeable tool 300c' is held by the tool stocker 500c'. FIG. 29 is a view illustrating a state in which an adjustment tool 800 is disposed in place of the parts-supplying apparatus 900c. FIG. 30 is a flowchart for adjusting the gripping position of the fingers 330c.

As illustrated in FIG. 29, the adjustment tool 800 is disposed at a position at which the fingers 330c of the interchangeable tool 300c' can grip the adjustment tool 800 while the interchangeable tool 300c' is held by the tool stocker 500c'.

In step S401 in FIG. 30, the robot arm body 100 causes the interchangeable tool 300c' to be held by the tool stocker 500c'.

In step S402, the tool stocker 500c' actuates the fingers 330c of the interchangeable tool 300c' held by the tool stocker 500c' so as to bring the fingers 330c into contact with the adjustment tool 800.

In step S403, the control device 600 stores position data of the fingers 330c that are in contact with the adjustment tool 800. In step S404, gripping position data for a workpiece is updated accordingly.

Even if the gripping position of the fingers 330c deviates due to the interchangeable tool 300c' deteriorating over time, the interchangeable tool 300c' can be thereby adjusted every time the interchangeable tool 300c' is held by the tool stocker 500c'. Thus, the interchangeable tool 300c' can grip a workpiece properly, which enables a user to reduce the number of maintenance occasions.

To be specific, the processing steps of the control flow described in each of the above embodiments are performed by the control device 600. Accordingly, the control device 600 can be configured to perform the processing steps of the control flow in such a manner that a storage medium storing a control software program that can perform the above-described functions is provided to the CPU 601 and the CPU 601 reads out the program stored in the storage medium and executes the program. In this case, the program that is read out from the storage medium implements the functions of each of the above-described embodiments. Accordingly, the program per se and the storage medium that stores the program constitute the present disclosure.

In each of the embodiments, a case in which the ROM 602 or the RAM 603 serves as the computer-readable storage medium and stores the program has been described. However, the invention is not limited to this configuration. The program that realizes the disclosure may be stored in any suitable storage medium insofar as the storage medium is computer readable. For example, a HDD, an external storage device, a storage disk, or the like may be used as the storage medium that supplies the program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the above embodiments, the ball plangers actuated by air are used for the attachment/detachment mechanism for the interchangeable tool and the robot arm body and also used for part of the positioning mechanism for the interchangeable tool and the tool stocker. However, the ball plangers may be replaced by devices using magnetism, such as electromagnets.

In the above embodiments, the interchangeable tool grips a target object. However, when the interchangeable tool performs painting or welding, the fingers may be replaced with other members suitable for the usage.

In the first embodiment, the identification sensor 560, which is a proximity sensor, detects the identification portion 347 and thereby determines the type of interchangeable tool held by the tool stocker. However, the identification portion 347 may be replaced by a bar code and the identification sensor 560 may be replaced by a bar code reader.

In addition, in the first embodiment, two sensors, in other words, the presence/absence sensors 570 and the identification sensor 560, are provided. However, the identification sensor 560 may detect the presence/absence of the interchangeable tool 300 on the tool stocker 500 without providing the presence/absence sensors 570.

In the above embodiments, the robot arm body 100 is an articulated robot that has multiple joints. However, the number of the joints are not limited to that described in the above embodiments. In the above embodiments, the robot arm body 100 is a multiaxial robot arm. However, the configurations described above can be applied to a robot arm body 100 of different type, such as a parallel link robot arm.

The drive sources that drive the joints are not limited to motors as in the above embodiments. Devices such as artificial muscles may be adopted as the drive sources.

The above embodiments are applicable to an apparatus that can automatically perform actions such as expansion and contraction, bending and stretching, upward/downward movement, rightward/leftward movement, turning, or combination of these, on the basis of the information in the storage of the control device.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A tool stocker system configured to store an interchangeable tool attachable to and detachable from a robot, the tool stocker system comprising:
 a tool stocker in which the interchangeable tool is stored; and
 a moving mechanism configured to move a contact portion of the interchangeable tool,
 even after the robot becomes separated from the interchangeable tool, the interchangeable tool keeping a state of holding a target object is stored in the tool stocker,
 wherein the moving mechanism is configured to bring the contact portion into contact with the target object and the target object is held by the contact portion when the interchangeable tool is stored in the tool stocker, and wherein the moving mechanism includes a lever member provided rotatably and a spring member.

2. The tool stocker system according to claim 1, further comprising a supply unit configured to supply the target object to a position where the target object comes into contact with the contact portion in the state where the interchangeable tool is stored in the tool stocker.

3. The tool stocker system according to claim 2, wherein the supply unit includes a belt conveyor.

4. The tool stocker system according to claim 3, wherein the supply unit includes a positioning mechanism configured to position the target object.

5. The tool stocker system according to claim 2, wherein a first sensor is built in the supply unit, and presence or absence of the target object is detected by detecting a weight of the target object by the first sensor.

6. The tool stocker system according to claim 5, wherein a second sensor is provided on the tool stocker, and presence or absence of the interchangeable tool is detected depending on whether the interchangeable tool is located at a position of being detectable by the second sensor or not.

7. The tool stocker system according to claim 6, wherein a third sensor is provided on the tool stocker, and a type of the interchangeable tool is detected depending on whether an identification portion detectable by the third sensor is provided on the interchangeable tool or not.

8. The tool stocker system according to claim 1, wherein the moving mechanism positions the contact portion at a predetermined position when the interchangeable tool is stored in the tool stocker.

9. The tool stocker system according to claim 1, wherein the moving mechanism is a pressing mechanism configured to move the contact portion by pressing the contact portion and is stored in the tool stocker.

10. The tool stocker system according to claim 1,
wherein the interchangeable tool includes a driving apparatus configured to drive the contact portion of the interchangeable tool, and
wherein the interchangeable tool includes a first electrical connection portion to be electrically connected to the robot to drive the driving apparatus and a second electrical connection portion to be electrically connected to the tool stocker to drive the driving apparatus.

11. The tool stocker system according to claim 10, further comprising a control apparatus configured to control the tool stocker system,
wherein the control apparatus is configured to either control the driving apparatus via the first electrical connection portion or control the driving apparatus via the second electrical connection portion, depending on a predetermined operation.

12. The tool stocker system according to claim 11, wherein the control apparatus is configured to switch a first power source configured to supply power by the first electrical connection portion and a second power source configured to supply power by the second electrical connection portion depending on the predetermined operation.

13. The tool stocker system according to claim 11, wherein the control apparatus is configured to drive the driving apparatus via the second electrical connection portion and bring the contact portion into contact with the target object.

14. The tool stocker system according to claim 11, further comprising an adjustment jig configured to adjust a position of the contact portion,
wherein the control apparatus is configured to drive the driving apparatus via the second electrical connection portion and bring the contact portion into contact with the adjustment jig in a state where the interchangeable tool is stored in the tool stocker.

15. The tool stocker system according to claim 11,
wherein the interchangeable tool includes a first interchangeable tool and a second interchangeable tool,
wherein the predetermined operation includes a first operation to be executed by the robot and the first interchangeable tool and a second operation to be executed by the tool stocker and the second interchangeable tool,
wherein the control apparatus is configured to control the robot, and
wherein the control apparatus is configured to execute the second operation by the tool stocker and the second interchangeable tool while the control apparatus is executing the first operation by the robot and the first interchangeable tool.

16. The tool stocker system according to claim 10,
wherein the contact portion absorbs and holds the target object by air, and
wherein the interchangeable tool includes a first fluid connection portion to be air-connected to the robot arm to supply the air and a second fluid connection portion to be air-connected to the tool sticker to supply the air.

17. The tool stocker system according to claim 10, wherein the contact portion rotates the target object in a state where the contact portion is holding the target object.

18. The tool stocker system according to claim 17, wherein the contact portion is a screw tightening tool.

19. The tool stocker system according to claim 10, wherein a cable to supply electric power to the second electrical connection portion is arranged inside the tool stocker.

20. A method of controlling the tool stocker system according to claim 1,
wherein, even after a control device causes the interchangeable tool to be stored in the tool stocker by using the robot and causing the robot to become separated from the interchangeable tool, the interchangeable tool keeping the state of holding the target object is stored in the tool stocker.

21. A computer-readable storage medium storing a control program for causing a computer to execute the control method according to claim 20.

22. The control method according to claim 20, wherein the robot is attached to the interchangeable tool in a state in which the interchangeable tool stored in the tool stocker holds the target object.

23. The control method according to claim 20, wherein, by attaching the robot to the interchangeable tool in a state in which the interchangeable tool stored in the tool stocker holds the target object, the attaching the robot to the interchangeable tool, together with the holding the target object, is performed.

24. A method of manufacturing an article using the robot system including the tool stocker system according to claim 1 and the robot.

25. The tool stocker system according to claim 1, wherein a pressing force by the moving mechanism to the contact portion is substantially equal to a holding force of holding the target object by the interchangeable tool.

26. A robot system including a robot, an interchangeable tool attachable to and detachable from a robot, and a tool stocker system configured to store the interchangeable tool, wherein the tool stocker system includes
- a tool stocker in which the interchangeable tool is stored; and
- a moving mechanism configured to move a contact portion of the interchangeable tool, wherein, even after the robot becomes separated from the interchangeable tool, the interchangeable tool keeping a state of holding a target object is stored in the tool stocker, wherein the moving mechanism is configured to bring the contact portion into contact with the target object and the target object is held by the contact portion when the interchangeable tool is stored in the tool stocker, and wherein the moving mechanism includes a lever member provided rotatably and a spring member.

27. A control method of controlling the robot system according to claim 26,
wherein, even after a control device causes the interchangeable tool to be stored in the tool stocker by using the robot and causing the robot to become separated from the interchangeable tool, the interchangeable tool keeping the state of holding the target object is stored in the tool stocker.

* * * * *